(12) United States Patent
Choi et al.

(10) Patent No.: US 10,136,145 B2
(45) Date of Patent: Nov. 20, 2018

(54) METHOD AND APPARATUS FOR MANAGING BUFFER FOR ENCODING AND DECODING MULTI-LAYER VIDEO

(71) Applicant: SAMSUNG ELECTRONICS CO., LTD., Suwon-si (KR)

(72) Inventors: Byeong-doo Choi, Suwon-si (KR); Chan-yul Kim, Bucheon-si (KR); Min-woo Park, Yongin-si (KR); Jin-young Lee, Hwaseong-si (KR); Yong-jin Cho, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 99 days.

(21) Appl. No.: 15/109,767

(22) PCT Filed: Jan. 5, 2015

(86) PCT No.: PCT/KR2015/000042
§ 371 (c)(1),
(2) Date: Jul. 5, 2016

(87) PCT Pub. No.: WO2015/102439
PCT Pub. Date: Jul. 9, 2015

(65) Prior Publication Data
US 2016/0323592 A1     Nov. 3, 2016

Related U.S. Application Data

(60) Provisional application No. 61/923,352, filed on Jan. 3, 2014.

(51) Int. Cl.
*H04N 19/31*      (2014.01)
*H04N 19/30*      (2014.01)
(Continued)

(52) U.S. Cl.
CPC ............ *H04N 19/31* (2014.11); *H04N 19/30* (2014.11); *H04N 19/423* (2014.11);
(Continued)

(58) Field of Classification Search
CPC .... H04N 19/31; H04N 19/597; H04N 19/513; H04N 19/46; H04N 19/30; H04N 19/423
See application file for complete search history.

(56) References Cited

U.S. PATENT DOCUMENTS 8,335,265 B2     12/2012   Hannuksela et al.
2010/0027615 A1   2/2010   Pandit et al.
(Continued)

FOREIGN PATENT DOCUMENTS

CN     101399991 A     4/2009
CN     103430539 A     12/2013
(Continued)

OTHER PUBLICATIONS

Communication dated Mar. 26, 2015, issued by the International Searching Authority in counterpart International Application No. PCT/KR2015/000042 (PCT/ISA/220, 210, 237)
(Continued)

*Primary Examiner* — Anand S Rao
*Assistant Examiner* — Joseph W Backer
(74) *Attorney, Agent, or Firm* — Sughrue Mion, PLLC

(57) ABSTRACT

Provided is a multi-layer video decoding method for efficiently obtaining, from a bitstream, information indicating a maximum size of a decoded picture buffer (DPB) regarding a layer set including a plurality of layers.

14 Claims, 31 Drawing Sheets

(51) Int. Cl.
*H04N 19/423* (2014.01)
*H04N 19/46* (2014.01)
*H04N 19/513* (2014.01)
*H04N 19/597* (2014.01)

(52) U.S. Cl.
CPC ........... *H04N 19/46* (2014.11); *H04N 19/513* (2014.11); *H04N 19/597* (2014.11)

(56) References Cited

U.S. PATENT DOCUMENTS

| | | |
|---|---|---|
| 2011/0019747 A1 | 1/2011 | Hannuksela et al. |
| 2012/0230409 A1 | 9/2012 | Chen et al. |
| 2013/0051478 A1 | 2/2013 | Wu et al. |
| 2013/0235927 A1 | 9/2013 | Win et al. |
| 2013/0279575 A1 | 10/2013 | Wang |
| 2014/0226727 A1 | 8/2014 | Wu et al. |
| 2014/0269899 A1 | 9/2014 | Park et al. |
| 2015/0124877 A1 | 5/2015 | Choi et al. |

FOREIGN PATENT DOCUMENTS

| | | |
|---|---|---|
| JP | 2013187905 A | 9/2013 |
| WO | 2012/122176 A1 | 9/2012 |
| WO | 2013001796 A1 | 1/2013 |
| WO | 2013077665 A1 | 5/2013 |
| WO | 2013162311 A1 | 10/2013 |

OTHER PUBLICATIONS

Communication dated Aug. 3, 2018, issued by The State Intellectual Property Office of P.R. China in counterpart Chinese Application No. 201580011878.8.

FIG. 6B

| LAYER | layer_format | | |
|---|---|---|---|
| | resolution | Bit_depth | Color_format |
| FIRST LAYER | 640x480 | 8 | 4:2:0 |
| SECOND LAYER | 640x480 | 8 | 4:2:0 |
| THIRD LAYER | 1280x960 | 10 | 4:2:2 |
| FOURTH LAYER | 1280x960 | 10 | 4:2:2 |

FIG. 7A

| | Descriptor |
|---|---|
| 701 — vps_extension( ) { | |
| ... | |
| for( i = 1; i <numOutputLayerSets; i++ ) { | |
|   if( i > vps_number_layer_sets_minus1 ) { | |
|     output_layer_set_idx_minus1[ i ] | u(v) |
|     lsIdx = output_layer_set_idx_minus1[ i ] + 1 | |
|     for( j = 0 ; j < NumLayersInIdList[lsIdx] − 1; j++) | |
|       output_layer_flag[ i ][ j ] | u(1) |
|   } | |
|   if(vps_sub_layers_max_minus1_present_flag) | |
| 702     max_sub_layers_output_layer_set_minus1[ i ] | u(3) |
|   profile_level_tier_idx[ i ] | u(v) |
| } | |
| ... | |
| } | |

FIG. 7B

| | |
|---|---|
| 711 — dpb_size( ) { | Descriptor |
| 712 — if( vps_sub_layers_max_minus1_present_flag) { | |
| 713 { for( i = 1; i <numOutputLayerSets; i++ ) { | |
| sub_layer_flag_info_present_flag[ i ] | u(1) |
| 714 — for( j = 0; j <= max_sub_layers_output_layer_set_minus1[ i ]; j++ ) { | |
| 715 { if( j > 0 && sub_layer_flag_info_present_flag[ i ] ) | |
| sub_layer_dpb_info_present_flag[ i ][ j ] | u(1) |
| 716 — if( sub_layer_dpb_info_present_flag[ i ][ j ] ) { | |
| for( k = 0; k < NumSubDpbs[ i ]; k++ ) { | |
| 717 { max_vps_dec_pic_buffering_minus1[ i ][ k ][ j ] | ue(v) |
| max_vps_num_reorder_pics[ i ][ j ] | ue(v) |
| max_vps_latency_increase_plus1[ i ][ j ] | ue(v) |
| } | |
| ... } | |
| } | |
| } | |
| 718 — } else { | |
| for( i = 1; i < NumOutputLayerSets; i++ ) { | |
| sub_layer_flag_info_present_flag[ i ] | u(1) |
| 719 — for( j = 0; j <= vps_max_sub_layers_minus1; j++ ) { | |
| if( j > 0 && sub_layer_flag_info_present_flag[ i ] ) | |
| sub_layer_dpb_info_present_flag[ i ][ j ] | u(1) |
| if( sub_layer_dpb_info_present_flag[ i ][ j ] ) { | |
| for( k = 0; k < NumSubDpbs[ i ]; k++ ) { | |
| max_vps_dec_pic_buffering_minus1[ i ][ k ][ j ] | ue(v) |
| max_vps_num_reorder_pics[ i ][ j ] | ue(v) |
| max_vps_latency_increase_plus1[ i ][ j ] | ue(v) |
| } | |
| } | |
| } | |
| } | |
| } | |

PARTITION MODE (1500)

PREDICTION MODE (1510)

TRANSFORMATION UNIT SIZE (1520)

CODING UNIT (1010)

US 10,136,145 B2

METHOD AND APPARATUS FOR MANAGING BUFFER FOR ENCODING AND DECODING MULTI-LAYER VIDEO

CROSS REFERENCE TO RELATED APPLICATIONS

This is a National Stage Entry of International Application No. PCT/KR2015/000042 filed Jan. 5, 2015, which claims priority to U.S. Provisional Patent Application No. 61/923, 352 filed Jan. 3, 2014, the contents of all of which are incorporated herein by reference in their entirety.

TECHNICAL FIELD

The present disclosure relates to methods of decoding and encoding a multi-layer video, and more particularly, to a method and apparatus for managing a buffer for decoding and encoding a multi-layer video.

BACKGROUND ART

Generally, image data is encoded by a codec according to a certain data compression standard, for example, moving picture expert group (MPEG) standard, and then stored in a storage medium in a form of a bitstream or transmitted through a communication channel.

Scalable video coding (SVC) is a video compression method for suitably adjusting and transmitting an amount of data in accordance with various communication networks and terminals. The SVC provides a video encoding method adaptively used in various transmission networks and various receiving terminals using one video stream.

Also, recently, a multiview video coding technology for 3-dimensional (3D) video coding is widely provided according to supply of 3D multimedia devices and 3D multimedia content.

According to such general SVC or multiview video coding, a video is encoded according to an encoding method limited based on a certain size of a block.

DETAILED DESCRIPTION OF THE INVENTION

Technical Problem

A method and apparatus for managing a buffer for decoding and encoding a multi-layer video, according to an embodiment, prevents an overflow of a reconstructed picture buffer by signaling information indicating a maximum size of the reconstructed picture buffer according to multi-layer sets, and efficiently manages a size of the reconstructed picture buffer.

Of course, the technical problems of the present disclosure are not limited thereto, and other technical problems will become apparent to one of ordinary skill in the art from the following description.

DESCRIPTION OF THE DRAWINGS

FIG. 6B is a diagram illustrating an example of determining a layer format group.

FIG. 7A illustrates an example of a syntax related to a size of a buffer for decoding a multi-layer video, according to an embodiment.

FIG. 7B illustrates another example of a syntax related to a size of a buffer for decoding a multi-layer video, according to an embodiment.

BEST MODE

Figure 1A:
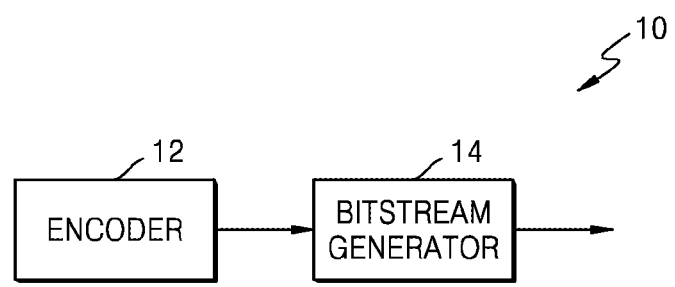
FIG. 1A is a block diagram of a structure of a multi-layer video encoding apparatus according to an embodiment.

According to an aspect of an embodiment, a multi-layer video decoding method includes: obtaining, from a bitstream, information indicating a maximum size of a decoded picture buffer (DPB) regarding a layer set including a plurality of layers; determining a size of the DPB regarding the layer set based on the obtained information indicating the maximum size of the DPB; and storing a decoded picture of the layer set in the DPB having the determined size, wherein the obtaining of the information indicating the maximum size of the DPB regarding the layer set includes, when the layer set includes a plurality of temporal sub-layers, obtaining the information indicating the maximum size of the DPB according to the temporal sub-layers included in the layer set, wherein the obtaining of the information indicating the maximum size of the DPB according to the temporal sub-layers includes, when a number of temporal sub-layers included in a layer that includes most temporal sub-layers from among the plurality of layers included in the layer set is N and information about N exists in the bitstream, obtaining the information indicating the maximum size of the DPB according to the temporal sub-layers while increasing an index from 0 to N, and when information about N does not exist in the bitstream and a number of temporal sub-layers included in a layer that includes most temporal sub-layers from among one or more layers included in the multi-layer is M, obtaining the information indicating the maximum size of the DPB according to the temporal sub-layers while increasing an index from 0 to M.

Information indicating a maximum size of a DPB regarding a temporal sub-layer of a first index from among the plurality of temporal sub-layers included in the layer set may indicate a maximum size of a DPB, which is equal to or larger than a maximum size of a DPB regarding a temporal sub-layer of a second index that is a lower level than the first index.

The multi-layer video decoding method may further include: determining whether information indicating a maximum size of a sub-DPB regarding a layer format group included in the layer set is obtainable from the bitstream; and obtaining the information indicating the maximum size of the sub-DPB when it is determined that the information indicating the maximum size is obtainable.

The multi-layer video decoding method may further include: determining a size of the sub-DPB regarding the layer format group included in the layer set; and storing a decoded picture of the layer format group in the sub-DPB having the determined size.

The obtaining of the information indicating the maximum size of the sub-DPB may include, when the layer set comprises the plurality of temporal sub-layers, obtaining the information indicating the maximum size of the sub-DPB regarding the layer format group according to the temporal sub-layers comprised in the layer set.

The obtaining of the information indicating the maximum size of the DPB may include obtaining the information indicating the maximum size of the DPB from a video parameter set (VPS) extension region of a raw bytes sequence payload (RBSP) of each network abstraction layer (NAL) from the bitstream including high efficiency video coding (HEVC) NAL units.

According to an aspect of another embodiment, a multi-layer video decoding apparatus includes: an obtainer configured to obtain, from a bitstream, information indicating a maximum size of a decoded picture buffer (DPB) regarding a layer set including a plurality of layers; a DPB having a size regarding the layer set, which is determined based on the obtained information indicating the maximum size of the DPB; and a decoder configured to store a decoded picture of the layer set in the DPB having the determined size, wherein the obtainer obtains, when the layer set includes a plurality of temporal sub-layers, information indicating a maximum size of a sub-DPB according to the temporal sub-layers included in the layer set, and when the information indicating the maximum size of the sub-DPB is obtained according to the temporal sub-layers, when a number of temporal sub-layers included in a layer that includes most temporal sub-layers from among the plurality of layers included in the layer set is N and information about N exists in the bitstream, the information indicating the maximum size of the DPB according to the temporal sub-layers is obtained while increasing an index from 0 to N, and when information about N does not exist in the bitstream and a number of temporal sub-layers included in a layer that comprises most temporal sub-layers from among one or more layers included in the multi-layer is M, the information indicating the maximum size of the DPB according to the temporal sub-layers is obtained while increasing an index from 0 to M.

Information indicating a maximum size of a DPB regarding a temporal sub-layer of a first index from among the plurality of temporal sub-layers included in the layer set may indicate a maximum size of a DPB, which is equal to or larger than a maximum size of a DPB regarding a temporal sub-layer of a second index that is a lower level than the first index.

The obtainer may determine whether information indicating a maximum size of a sub-DPB regarding a layer format group included in the layer set is obtainable from the bitstream, and further obtain the information indicating the maximum size of the sub-DPB regarding the layer format group when it is determined that the information indicating the maximum size is obtainable.

The DPB may include at least one sub-DPB determined based on the information indicating the maximum size of the sub-DPB, and a decoded picture of the layer format group may be stored in the determined at least one sub-DPB.

The obtainer may obtain the information indicating the maximum size of the DPB from a video parameter set (VPS) extension region of a raw bytes sequence payload (RBSP) of each network abstraction layer (NAL) from the bitstream including high efficiency video coding (HEVC) NAL units.

According to an aspect of another embodiment, a multi-layer video encoding method includes: determining a plurality of layer sets each including at least one layer from among a plurality of encoded layers; determining a maximum size of a decoded picture buffer (DPB) regarding each of the determined plurality of layer sets; and generating information indicating the maximum size of the DPB regarding each of the determined plurality of layer sets, wherein the generating of the information indicating the maximum size of the DPB regarding each of the determined plurality of layer sets includes, when the plurality of layer sets each includes a plurality of temporal sub-layers, generating the information indicating the maximum size of the DPB according to the temporal sub-layers comprised in the each of the plurality of layer sets, wherein the generating of the information indicating the maximum size of the DPB according to the temporal sub-layers includes, when a number of temporal sub-layers included in a layer that includes most temporal sub-layers from among the at least one layer included in each of the layer sets is N and information about N exists in the bitstream, generating the information indicating the maximum size of the DPB according to the temporal sub-layers while increasing an index from 0 to N, and when the information about N does not exist in the bitstream and a number of temporal sub-layers included in a layer that includes most temporal sub-layers from among one or more layers included in the multi-layer is M, generating the information indicating the maximum size of the DPB according to the temporal sub-layers while increasing an index from 0 to M.

According to an aspect of another embodiment, a multi-layer video encoding apparatus includes: a decoder configured to generate a plurality of encoded layers by encoding a multi-layer video; and a bitstream generator configured to determine a plurality of layer sets each including at least one layer from among the plurality of encoded layers, determine a maximum size of a decoded picture buffer (DPB) regarding each of the determined plurality of layer sets, and generate information indicating the maximum size of the DPB regarding each of the determined plurality of layer sets, wherein the bitstream generator generates, when the plurality of layer sets each includes a plurality of temporal sub-layers, the information indicating the maximum size of the DPB according to the temporal sub-layers included in the each of the plurality of layer sets, and when a number of temporal sub-layers included in a layer that includes most temporal sub-layers from among the at least one layer included in each of the layer sets is N and information about N exists in the bitstream, the information indicating the maximum size of the DPB according to the temporal sub-layers while increasing an index from 0 to N, and when the information about N does not exist in the bitstream and a number of temporal sub-layers included in a layer that includes most temporal sub-layers from among one or more layers included in the multi-layer is M, the information indicating the maximum size of the DPB according to the temporal sub-layers while increasing an index from 0 to M.

According to an aspect of another embodiment, a computer-readable recording medium has recorded thereon a program, which when executed by a computer, performs the multi-layer video encoding method.

MODE OF THE INVENTION

Hereinafter, a multi-layer video encoding apparatus, a multi-layer video decoding apparatus, a multi-layer video encoding method, and a multi-layer video decoding method, according to embodiments, will be described with reference to FIGS. 1A through 7B.

Also, a video encoding apparatus, a video decoding apparatus, a video encoding method, and a video decoding method based on coding units of a tree structure, according to embodiments, will be described with reference to FIGS. 8 through 20.

Also, embodiments to which the multi-layer video encoding method, the multi-layer video decoding method, the video encoding method, and the video decoding method according to embodiments of FIGS. 1A through 20 are applicable will be described with reference to FIGS. 21 through 27. Hereinafter, an 'image' may indicate a still image of a video or a moving picture, i.e., the video itself.

First, a multi-layer video encoding apparatus, a multi-layer video encoding method, a multi-layer video decoding apparatus, and a multi-layer video decoding method, according to embodiments, will be described with reference to FIGS. 1A through 7B.

FIG. 1A is a block diagram of a structure of a multi-layer video encoding apparatus according to an embodiment of the present disclosure.

Referring to FIG. 1A, a multi-layer video encoding apparatus 10 according to an embodiment of the present disclosure includes an encoder 12, a bitstream generator 14, and a decoded picture buffer (DPB) 14.

The multi-layer video encoding apparatus 10 according to an embodiment may encode a plurality of video streams according to a scalable video coding method by classifying the video streams according to layers. The video stream encoding apparatus 10 may encode base layer images and enhancement layer images as different layers.

For example, a multiview video may be encoded according to a scalable video coding method. Left-view images may be encoded as base layer images, and right-view images may be encoded as enhancement layer images. Alternatively, center-view images, left-view images, and right-view images may be respectively encoded, wherein the center-view images may be encoded as base layer images, the left-view images may be encoded as first enhancement layer images, and the right-view images may be encoded as second enhancement layer images. An encoding result of the base layer images may be output as a base layer stream, and encoding results of the first and second enhancement layer images may be respectively output as first and second enhancement layer streams.

Also, when there are at least three enhancement layers, base layer images and first through $K^{th}$ enhancement layer images may be encoded. Accordingly, an encoding result of the base layer images may be output as a base layer stream, and encoding results of the first through $K^{th}$ enhancement layer images may be respectively output as first through $K^{th}$ enhancement layer streams.

The multi-layer video encoding apparatus 10 according to an embodiment may perform inter prediction for predicting a current image by referring to images in the same layer. Through the inter prediction, a motion vector representing motion information between the current image and a reference image, and a residual between the current image and the reference image may be generated.

Also, the multi-layer video encoding apparatus 10 according to an embodiment may perform inter-layer prediction for predicting enhancement layer images by referring to base layer images. The multi-layer video encoding apparatus 10 may perform inter-layer prediction for predicting second enhancement layer images by referring to first enhancement layer images. Through the inter-layer prediction, a position difference component between a current image and a reference image of a layer different from that of the current image and a residual between the current image and the reference image of the different layer may be generated.

When the multi-layer video stream encoding apparatus 10 according to an embodiment allows at least two enhancement layers, inter-layer prediction may be performed between one base layer image and the at least two enhancement layer images according to a multi-layer prediction structure.

An inter-layer prediction structure will be described later with reference to FIG. 3A.

The multi-layer video encoding apparatus 10 according to an embodiment encodes each image of a video according to blocks, per layer. A type of a block may be a square or a rectangle, or may be an arbitrary geometrical shape. The block is not limited to a data unit having a uniform size. A block according to an embodiment may be, from among coding units having a tree structure, a largest coding unit, a coding unit, a prediction unit, or a transformation unit. For example, the multi-layer video encoding apparatus 10 may split and encode, per layer, images according to the HEVC standard, into blocks having a quad-tree structure. Video encoding and decoding methods based on coding units according to a tree structure will be described later with reference to FIGS. 8 through 20. Inter prediction and inter-layer prediction may be performed based on a data unit of a coding unit, a prediction unit, or a transformation unit.

The encoder 12 according to an embodiment may encode an image sequence according to at least one layer. The encoder 12 may generate symbol data by performing source coding operations including inter prediction or intra prediction, per layer. For example, the encoder 12 may generate symbol data by performing transformation and quantization on an image block including result data of performing inter prediction or intra prediction on image samples, and perform entropy encoding on the symbol data. The bitstream generator 14 may generate a bitstream including the symbol data on which entropy encoding is performed.

Also, the encoder 12 may encode an image sequence per layer, and the bitstream generator 14 may generate a bitstream. As described above, the encoder 12 may encode a current layer image sequence by referring to symbol data of a layer different from the current layer image sequence, via inter-layer prediction. Accordingly, the encoder 12 according to an embodiment may encode an image sequence of each layer by referring to an image sequence of a different layer or the same layer according to a prediction mode. For example, in an intra mode, a current sample may be predicted by using adjacent samples in a current image, and in an inter mode, a current image may be predicted by using another image in the same layer. In an inter-layer prediction mode, a current image may be predicted by using a reference image of the same picture order count (POC) as the current image from among other layer images.

Through an encoding process in a video coding layer (VCL) described above, the encoder 12 may output residual information related to a coding unit, prediction mode information, and additional information related to prediction encoding of a coding unit, and the bitstream generator 14 may generate the additional information as a bitstream.

Here, the bitstream generator 14 corresponds to a network abstraction layer (NAL) that adds, to a transmission data unit according to a certain format, and outputs a multi-layer encoding image and additional information, which are generated by the encoder 12. The transmission data unit may be a NAL unit. The bitstream generator 14 outputs the NAL unit by adding the multi-layer encoding image and the additional information to the NAL unit. The bitstream generator 14 may output a bitstream generated by using the NAL unit.

The additional information may include DPB-related information including information (max_vps_dec_pic_buffering_minus1) indicating a maximum size of a DPB required by a decoding apparatus to decode an image frame, realignment frame number information (max_vps_num_reorder_pics) indicating the number of image frames required to be realigned, and maximum latency increase information (max_vps_latency_increase_plus1) for determining a maximum latency frame, and information about temporal sub-layer ordering. The DPB-related information may be included according to layers or according to sub-layers included in each layer.

Meanwhile, the DPB temporarily stores reconstructed images to output them in a display order, or temporarily stores reference images with respect to inter prediction and inter-layer prediction. However, since the DPB included in the decoding apparatus has a physically limited size, the multi-layer video encoding apparatus 10 may generate and transmit information indicating a maximum size of the DPB such that the size of the DPB is efficiently managed. Here, the multi-layer video encoding apparatus 10 may generate and transmit the DPB-related information (for example, the maximum size of the DPB) according to layer sets, temporal sub-layers and/or layer format groups, such that the decoding apparatus efficiently manages the DPB.

Hereinafter, a method of generating, by the multi-layer video encoding apparatus 10, the DPB-related information will be described in detail.

The encoder 12 according to an embodiment may encode image data as a multi-layer encoding image. Also, the bitstream generator 14 according to an embodiment may generate additional information including an index indicating a layer set, and generate a bitstream including the generated index and the multi-layer encoding image.

Here, a layer set denotes a group output from a multi-layer video decoding apparatus and including at least one layer. For example, the multi-layer video encoding apparatus 10 may encode a spatial scalable bitstream including a plurality of layers having different resolutions. Later, the decoding apparatus may first decode a layer having a low resolution and perform inter-layer prediction may referring to the decoded layer to decode a layer having a higher resolution. At this time, a degree of resolutions being decoded may differ according to decoding apparatuses, and thus the multi-layer video encoding apparatus 10 may determine a layer having a certain resolution and layers to be referred to so as to decode the certain resolution, as a layer set. Thus, a plurality of layer sets each including at least one layer may be determined.

As another example, when multiview scalable bitstreams include layers that are encoded and have different views. the decoding apparatus may first decode a base layer indicating a left-view image, and decode enhancement layers indicating a right-view image and a center view image by referring to the base layer. In this case, the multi-layer video encoding apparatus 10 may determine and transmit layers having a left-view, a right-view, and a center view as one layer set.

The bitstream generator 14 may determine the maximum size of the DPB regarding each of the determined plurality of layer sets, and generate information indicating the maximum size of the DPB regarding each of the determined layer sets.

Also, the bitstream generator 14 may generate the information indicating the maximum size of the DPB according to layer sets, and according to temporal sub-layers.

The temporal sub-layer is an image that is hierarchically encoded such that a frame rate of a video is variously adjusted, and may be distinguished by a temporal index (Temporal_id). Thus, a picture having a temporal index of 1 in a temporal hierarchical structure may be used as a reference picture of a picture having a temporal index of 1 or 2, 3, or the like, which is higher than 1. However, the picture having the temporal index of 1 is unable to be used as a reference picture of a picture having a temporal index of 0. A temporal hierarchical structure will be described later in detail with reference to FIG. 5A.

Also, the multi-layer video encoding apparatus 10 may generate information indicating a maximum size of a reconstructed picture buffer according to layer format groups included in a layer set.

The layer set may include a sub-group according to a certain condition (for example, a format group including at least one layer having the same image format), and the bitstream generator 14 may determine a maximum size of a sub-DPB according to the sub-groups, and generate information indicating the determined maximum size of the sub-DPB.

Accordingly, the multi-layer video encoding apparatus 10 may signal the information indicating the maximum size of the reconstructed picture buffer according to the layer sets, the sub-temporal layers, or the layer format groups included in the layer set such that the decoding apparatus efficiently manages the size of the reconstructed picture buffer.

Meanwhile, the bitstream generator 14 may generate a VPS NAL unit including the generated index, and generate a bitstream including the VPS NAL unit. The bitstream generator 14 may generate a bitstream including the index and the multi-layer encoding image, which are generated by the image encoder 12.

Figure 1B:
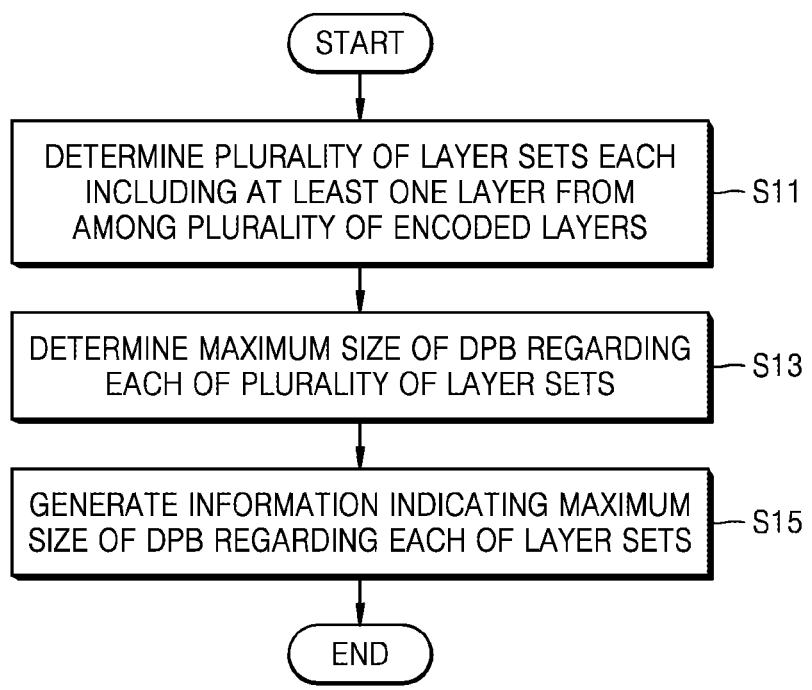
FIG. 1B is a flowchart of a multi-layer video encoding method according to an embodiment.

FIG. 1B is a flowchart of a multi-layer video encoding method according to an embodiment.

In operation S11, the multi-layer video encoding apparatus 10 may determine a plurality of layer sets each including at least one layer from among a plurality of encoded layers. Also, the multi-layer video encoding apparatus 10 may determine a temporal sub-layer and a layer format group.

In operation S13, the multi-layer video encoding apparatus 10 may determine maximum size of a DPB regarding each of the plurality of layer sets. Also, the multi-layer video encoding apparatus 10 may determine the maximum size of the DPB according to the temporal sub-layers and the layer format groups, which are included in the layer set.

In operation S15, the multi-layer video encoding apparatus 10 may generate information indicating the maximum size of the DPB regarding each of the layer sets, and add the information to a bitstream. Also, the multi-layer video encoding apparatus 10 may generate information indicating the maximum size of the DPB in each of the temporal sub-layers and the layer format groups, and add the information to a bitstream.

Here, the information indicating the maximum size of the DPB may be included in a video parameter set (VPS) extension region or video usability information (VUI) from a raw bytes sequence payload (RBSP) of each NAL unit from a bitstream including high efficiency video coding (HEVC) NAL units.

Figure 2A:
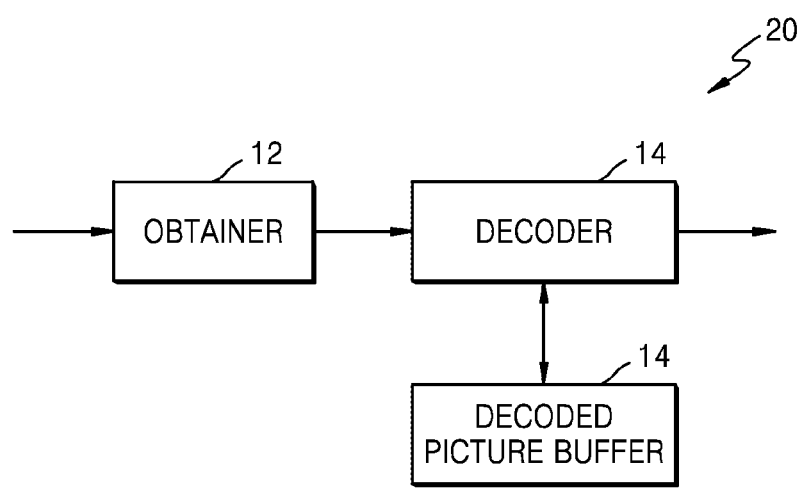
FIG. 2A is a block diagram of a structure of a multi-layer video decoding apparatus according to an embodiment.

FIG. 2A is a block diagram of a structure of a multi-layer video decoding apparatus according to an embodiment.

Referring to FIG. 2A, a multi-layer video decoding apparatus 20 may include an obtainer 22, an image decoder 24, and a DPB 26.

The multi-layer video decoding apparatus 20 according to an embodiment may receive a base layer stream and an enhancement layer stream. The multi-layer video decoding apparatus 20 may receive the base layer stream including encoding data of base layer images and the enhancement layer stream including encoding data of enhancement layer images, according to a scalable video coding method.

The multi-layer video decoding apparatus 20 may decode a plurality of layer streams according to a scalable video coding method. The multi-layer video decoding apparatus 20 may reconstruct the base layer images by decoding the base layer stream and reconstruct the enhancement layer images by decoding the enhancement layer stream.

For example, a multi-view video may be encoded according to a scalable video coding method. Left view images may be reconstructed by decoding the base layer stream, and right view images may be reconstructed by decoding the enhancement layer stream. As another example, central view images may be reconstructed by decoding the base layer stream. Left view images may be reconstructed by further decoding a first enhancement layer stream in addition to the base layer stream. Right view images may be reconstructed by further decoding a second enhancement layer stream in addition to the base layer stream.

The multi-layer video decoding apparatus 20 may obtain encoded data of the base layer images and the enhancement layer images from the base layer stream and the enhancement layer stream, and may further obtain a motion vector generated via inter prediction and disparity information generated via inter-layer prediction.

For example, the multi-layer video decoding apparatus 20 may decode inter predicted data according to layers, and decode inter-layer predicted data between a plurality of layers. Reconstruction may be performed via motion compensation and inter-layer decoding based on a coding unit or a prediction unit according to an embodiment.

Regarding each layer stream, images may be reconstructed by performing motion compensation for current image by referring to reconstructed images predicted via inter prediction of the same layer. Motion compensation is an operation of reconstructing a reconstructed image of a current image by composing a reference image determined by using a motion vector of the current image and a residual of the current image.

Also, the multi-layer video decoding apparatus 20 according to an embodiment may perform inter-layer decoding which references the base layer images so as to reconstruct the enhancement layer images predicted via inter-layer prediction. Inter-layer decoding is an operation of reconstructing a reconstructed image of a current image by composing a reference image of a different layer, which is determined by using disparity information of the current image, and a residual of the current image.

The multi-layer video decoding apparatus 20 according to an embodiment may perform inter-layer decoding for reconstructing second enhancement layer images predicted by referring to first enhancement layer images.

The multi-layer video decoding apparatus 20 performs decoding according to blocks of an image of each video. A block according to an embodiment may be, from among coding units according to a tree structure, a largest coding unit, a coding unit, a prediction unit, or a transformation unit. For example, the multi-layer video decoding apparatus 20 may reconstruct image sequences by decoding each layer stream based on blocks of a quad-tree structure determined according to the HEVC standards.

The decoder 24 may obtain symbol data reconstructed via entropy decoding according to layers. The decoder 24 may reconstruct quantized transformation coefficients of a residual by performing inverse quantization and inverse transformation by using the symbol data. The decoder 24 according to another embodiment may receive a bitstream of the quantized transformation coefficients. The residual of images may be reconstructed as results of performing inverse quantization and inverse transformation on the quantized transformation coefficients.

The decoder 24 according to an embodiment may reconstruct an image sequence according to layers by decoding a bitstream received according to layers.

The decoder 24 may generate reconstructed images of an image sequence according to layers via motion compensation between the same layer images and via inter-layer prediction between different layer images.

Accordingly, the decoder 24 according to an embodiment may decode an image sequence of each layer by referring to an image sequence of the same layer of an image sequence of a different layer, according to a prediction mode. For example, in an intra prediction mode, a current block may be reconstructed by using adjacent samples in the same image, and in an inter prediction mode, a current block may be reconstructed by referring to another image of the same layer.

Meanwhile, the obtainer 22 according to an embodiment may obtain, from a bitstream, information indicating a maximum size of a DPB regarding a layer set including a plurality of layers.

Also, when the layer set includes a plurality of temporal sub-layers, the obtainer 22 may obtain information indicating a maximum size of a DPB according to the temporal sub-layers included in the layer set.

Also, the DPB 26 regarding the layer set may include at least one sub-DPB (not shown) respectively corresponding to at least one layer format group included in the layer set. Here, the obtainer 22 determines whether information indicating a maximum size of a sub_DPB regarding a layer format group included in the layer set is obtainable from the bitstream, and when it is determined that the information indicating the maximum size of the sub-DPB is obtainable, may further obtain, from the bitstream, the information indicating the maximum size of the sub-DPB regarding the layer format group. For example, the obtainer 22 may obtain a flag indicating whether the information indicating the maximum size of the sub-DPB is obtainable, and further obtain, from the bitstream, the information indicating the maximum size of the sub-DPB according to a value of the flag.

Also, the obtainer 22 receives an encoded bitstream including HEVC NAL units, and obtains a VPS, a sequence parameter set (SPS), a picture parameter set (PPS), a slice, and a SEI message from RBSP of each NAL unit from the bitstream. Here, the obtainer 22 may obtain the information indicating the maximum size of the DPB from an VPS extension region of the RBSP.

The DPB 26 according to an embodiment temporarily stores images reconstructed by the decoder 24 to output the reconstructed images in a display order, or temporally stores reference images with respect to inter prediction and inter-layer prediction. However, since the DPB 26 has a physically limited size, the obtainer 22 may obtain the information indicating the maximum size of the DPB as described above such that the size of the DPB 26 is efficiently managed. Also, Here, the obtainer 22 may obtain DPB-related information (for example, the information indicating the maximum size of the DPB) according to layer sets, temporal sub-layers or layer format groups, such that the DPB 26 is efficiently managed even when a multi-layer video is decoded.

Figure 2B:
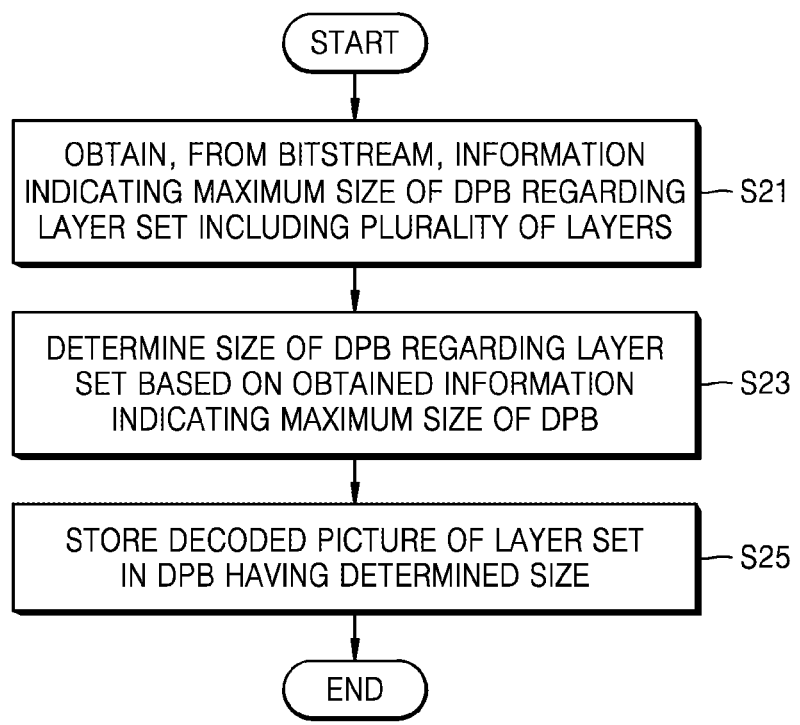
FIG. 2B is a flowchart of a multi-layer video decoding method according to an embodiment.

FIG. 2B is a flowchart of a multi-layer video decoding method according to an embodiment.

In operation S21, the multi-layer video decoding apparatus 20 may obtain, from a bitstream, information indicating a maximum size of a DPB regarding a layer set including a plurality of layers.

Also, when the layer set includes a plurality of temporal sub-layers, the multi-layer video decoding apparatus 20 may obtain information indicating a maximum size of a DPB according to the temporal sub-layers included in the layer set.

Information indicating a maximum size of a DPB regarding a temporal sub-layer of a first index from among the temporal sub-layers included in the layer set may indicate a maximum size of a DPB, which is equal to or larger than a maximum size of a DPB regarding a temporal sub-layer of a second index that is a lower level than the first index.

For example, the temporal sub-layers may be defined as a highest level value (HighestTid) of a hierarchical temporal index (Temporalid) indicating pictures usable for encoding or decoding of a current picture. A picture having a certain temporal index may be used as a reference picture of a picture having a same or higher temporal index compared to the certain temporal index. For example, a picture having a temporal index of 1 may be used as a reference picture of a picture having a temporal index of 1 or 2, 3, or the like that is larger than 1. However, the picture having the temporal index of 1 is unable to be used as a reference picture of a picture having a temporal index of 0. Accordingly, a temporal sub-layer in which a temporal index of 2 is a maximum level value may require a DPB that has a size larger than a temporal sub-layer in which a temporal index of 1 is a maximum level value.

Also, the multi-layer video decoding apparatus 20 may determine whether information indicating a maximum size of a sub-DPB regarding a layer format group included in the layer set is obtainable from the bitstream, and when it is determined that the information indicating the maximum size of the sub-DPB is obtainable, further obtain, from the bitstream, the information indicating the maximum size of the sub-DPB regarding the layer format group.

In operation S23, the multi-layer video decoding apparatus 20 may determine the size of the DPB regarding the layer set based on the obtained information indicating the maximum size of the DPB. Also, the multi-layer video decoding apparatus 20 may determine the size of the DPB regarding the layer set according to temporal sub-layers. Also, the multi-layer video decoding apparatus 20 may determine the maximum size of the sub-DPB according to layer format groups included in the layer set. In addition, the multi-layer video decoding apparatus 20 may determine the maximum size of the sub-DPB according to temporal sub-layers regarding the layer format group included in the layer set.

In operation S25, the multi-layer video decoding apparatus 20 may store a decoded picture of the layer set in the DPB having the determined size. Also, the multi-layer video decoding apparatus 20 may store a decoded picture of the layer format group in the sub-DPB.

Figure 3A:
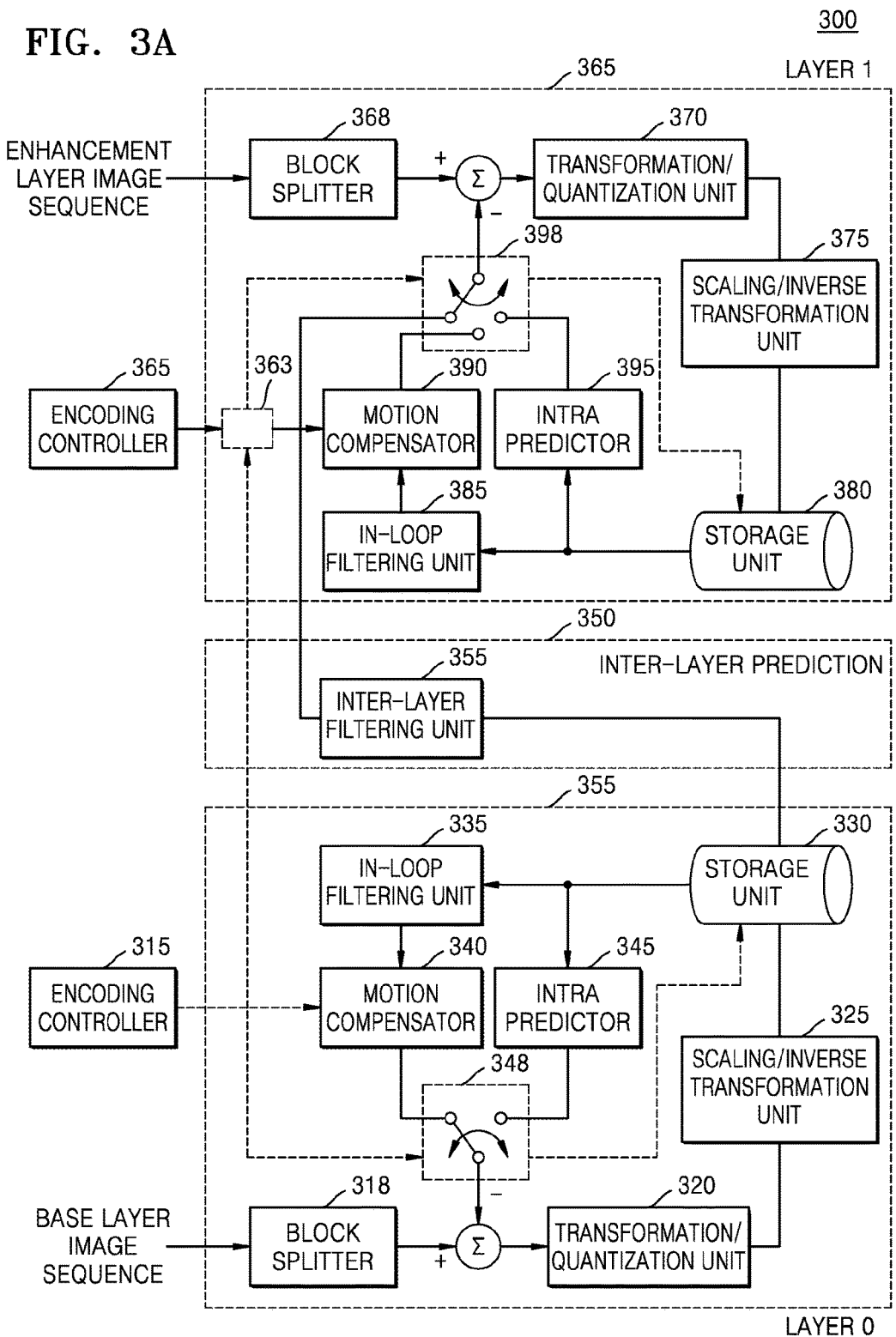
FIG. 3A illustrates an inter-layer prediction structure according to an embodiment.

FIG. 3A illustrates an inter-layer prediction structure according to an embodiment.

An inter-layer encoding system 300 includes a base layer encoder 310, an enhancement layer encoder 360, and an inter-layer predictor 350 between the base layer encoder 310 and the enhancement layer encoder 360. The base layer encoder 310 and the enhancement layer encoder 360 may be included in the encoder 12 of FIG. 1.

The base layer encoder 310 receives and encodes a base layer image sequence according to images. The enhancement layer encoder 360 receives and encodes an enhancement layer image sequence according to images. Overlapping operations of the base layer encoder 310 and the enhancement layer encoder 320 will be simultaneously described.

An input image (a low resolution image or a high resolution image) is split into a largest coding unit, a coding unit, a prediction unit, or a transformation unit through a block splitter 318 or 368. In order to encode a coding unit output from the block splitter 318 or 368, intra prediction or inter prediction may be preformed according to prediction units of the coding unit. A prediction switch 348 or 398 may enable inter prediction to be performed by referencing a pre-reconstructed image output from a motion compensator 340 or 390 or intra prediction to be performed by using a neighboring prediction unit of a current prediction unit in a current input image output from an intra predictor 345 or 395, based on whether a prediction mode of a prediction unit is an intra prediction mode or an inter prediction mode. Residual information may be generated according to prediction units via inter prediction.

Residual information between a prediction unit and an adjacent image is input to a transformation/quantization unit 320 or 370 according to prediction units of a coding unit. The transformation/quantization unit 320 or 370 may output a quantized transformation coefficient by performing transformation and quantization according to transformation units, based on a transformation unit of a coding unit.

A scaling/inverse transformation unit 325 or 375 may generate residual information of a spatial domain by again performing scaling and inverse transformation on the quantized transformation coefficient according to transformation units of a coding unit. When the prediction switch 348 or 398 is controlled to point at an inter mode, a reconstructed image including a current prediction unit may be generated as the residual information is composed with a pre-reconstructed image or a neighboring prediction unit, and the reconstructed image may be stored in a storage unit 330 or 380. The reconstructed image may be transmitted to the intra predictor 345 or 395 or the motion compensator 340 or 390 according to a prediction mode of a prediction unit that is encoded next.

In detail, in an inter mode, an in-loop filtering unit 335 or 385 may perform, on a reconstructed image stored in the storage unit 330 or 380, at least one of deblocking filtering and sample adaptive offset (SAO) filtering according to coding units. At least one of deblocking filtering and SAO filtering may be performed on a coding unit and at least one of a prediction unit and a transformation unit included in the coding unit.

Deblocking filtering is filtering for easing a blocking phenomenon of a data unit, and SAO filtering is filtering for compensating for a pixel value that is transformed according to data encoding and decoding. Data filtered by the in-loop filtering unit 335 or 385 may be transmitted to the motion compensator 340 or 390 according to prediction units. Then, in order to encode a following coding unit output from the block splitter 318 or 368, residual information between a current reconstructed image and a following coding unit output from the motion compensator 340 or 390 and the block splitter 318 or 368 may be generated.

As such, the above encoding operation may be repeated according to coding units of an input image.

Also, for inter-layer prediction, the enhancement layer encoder 360 may reference a reconstructed image stored in the storage unit 330 of the base layer encoder 310. An encoding controller 315 of the base layer encoder 310 may control the storage unit 330 of the base layer encoder 310 to transmit a reconstructed image of the base layer encoder 310 to the enhancement layer encoder 360. In the inter-layer predictor 350, an inter-layer filtering unit 355 may perform deblocking filtering or SAO filtering on a base layer reconstructed image output from the storage unit 330 of the base layer encoder 310. When resolution of a base layer image and resolution of an enhancement layer image are different from each other, the inter-layer predictor 350 may up-sample the base layer reconstructed image before transmitting the base layer reconstructed image to the enhancement layer encoder 360. When inter-layer prediction is performed according to control of the prediction switch 398 of the enhancement layer encoder 360, inter-layer prediction may be performed on an enhancement layer image by referencing the base layer reconstructed image transmitted through the inter-layer predictor 350.

In order to encode an image, various encoding modes may be set for a coding unit, a prediction unit, and a transformation unit. For example, a depth or split information (split flag) may be set as an encoding mode of a coding unit. A prediction mode, a partition type, intra direction information, or reference list information may be set as an encoding mode of a prediction unit. A transformation depth or split information may be set as an encoding mode of a transformation unit.

The base layer encoder 310 may determine an encoding depth, a prediction mode, a partition type, an intra direction/ reference list, and a transformation depth, which have highest encoding efficiency, based on results of performing encoding by applying various depths for a coding unit, various prediction modes, various partition types, various intra directions, and various reference lists for a prediction unit, and various transformation depths for a transformation unit. The encoding mode determined by the base layer encoder 310 is not limited thereto.

The encoding controller 315 of the base layer encoder 310 may control each component such that one of various encoding modes is suitably applied thereto. Also, the encoding controller 315 may control the enhancement layer encoder 360 to determine an encoding mode or residual information by referencing an encoding result of the base layer encoder 310, for inter-layer encoding of the enhancement layer encoder 360.

For example, the enhancement layer encoder 360 may use an encoding mode of the base layer encoder 310 as an encoding mode for an enhancement layer image, or may determine an encoding mode for an enhancement layer image by referencing an encoding mode of the base layer encoder 310. The encoding controller 315 of the base layer encoder 310 may control a control signal of an encoding controller 365 of the enhancement layer encoder 360 to use a current encoding mode of the base layer encoder 310 in order to determine a current encoding mode of the enhancement layer encoder 360.

An inter-layer decoding system according to an inter-layer prediction method may be realized similarly to the inter-layer encoding system 300 of FIG. 3A according to the inter-layer prediction method. In other words, the inter-layer decoding system of a multi-layer video may receive a base layer bitstream and an enhancement layer bitstream. A base layer decoder of the inter-layer decoding system may reconstruct base layer images by decoding the base layer bitstream. An enhancement layer decoder of the inter-layer decoding system may reconstruct enhancement layer images by decoding the enhancement layer bitstream by using a base layer reconstructed image and parsed encoding information. Hereinafter, an embodiment of using, by the inter-layer encoding system 300 according to the inter-layer prediction method and the inter-layer decoding system (not shown) according to the inter-layer prediction method, a multi-layer video will be described in detail with reference to FIG. 3B.

Figure 3B:
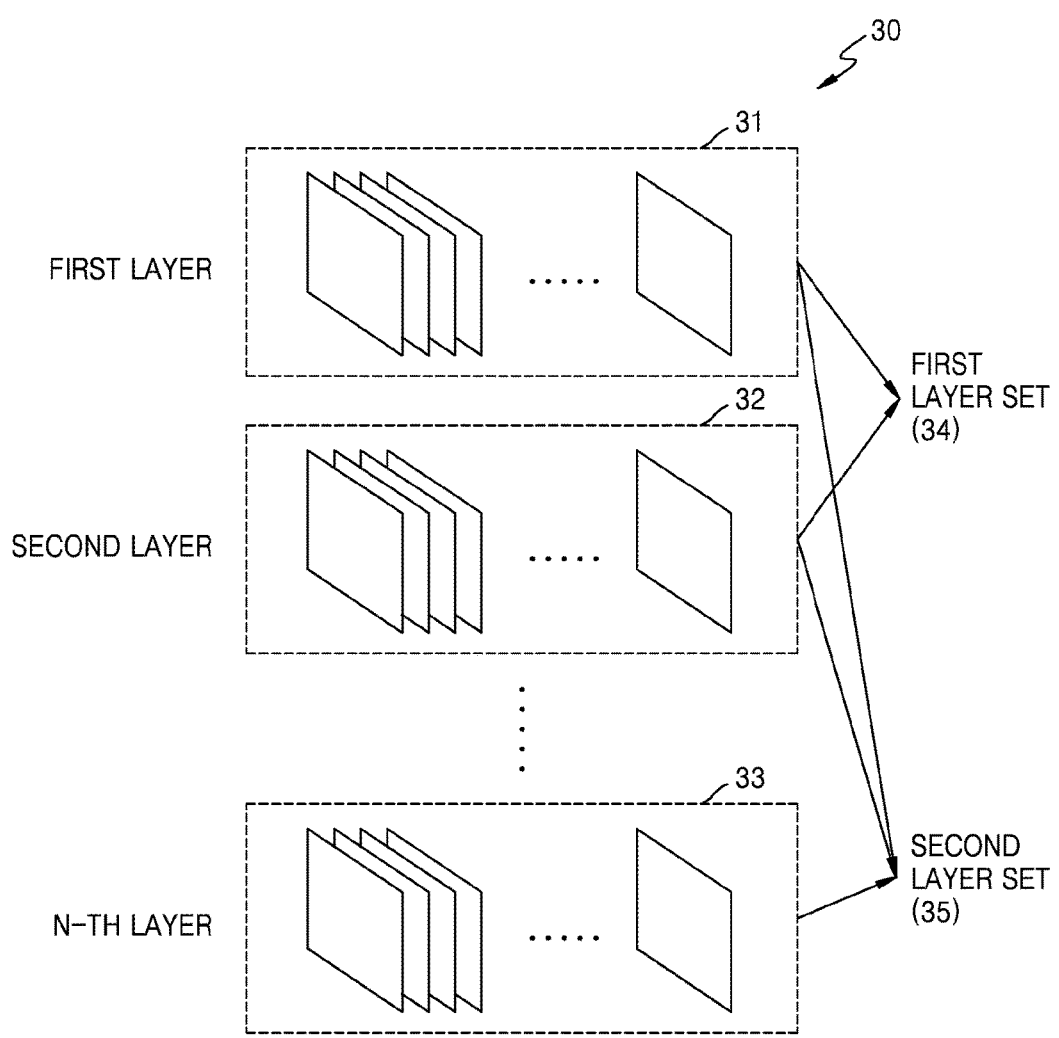
FIG. 3B illustrates a multi-layer video according to an embodiment.

FIG. 3B illustrates a multi-layer video according to an embodiment.

In order to provide an optimum service in various network environments and various terminals, the multi-layer video apparatus 10 may output a scalable bitstream by encoding multi-layer image sequences having various spatial resolutions, various qualities, various frame rates, and different viewpoints. In other words, the multi-layer video encoding apparatus 10 may generate and output a scalable video bitstream by encoding an input image according to various scalability types. Scalability includes temporal, spatial, quality, and multiview scalabilities, and a combination thereof. Such scalabilities may be classified according to types. Also, the scalabilities may be classified as a dimension identifier in each type.

For example, the scalability has the same scalability type as the temporal, spatial, quality, and multiview scalability. Also, the scalability may be classified into scalability dimension identifier according to types. For example, when the scalabilities are different, the scalabilities may have different dimension identifiers. For example, a high scalability dimension may be assigned to a high-dimensional scalability with respect to the scalability type.

When a bitstream is dividable into valid sub-streams, the bitstream is scalable. A spatial scalable bitstream includes sub-streams of various resolutions. In order to distinguish different scalabilities in the same scalability type, a scalability dimension is used. The scalability dimension may be expressed by a scalability dimension identifier.

For example, the spatial scalable bitstream may be divided into sub-streams having different resolutions, such as QVGA, VGA, and WVGA. For example, layers having different resolutions may be distinguished by using a dimension identifier. For example, the QVGA sub-stream may have 0 as a spatial scalability dimension identifier value, the VGA sub-stream may have 1 as a spatial scalability dimension identifier value, and the WVGA sub-stream may have 2 as a spatial scalability dimension identifier value.

A temporal scalable bitstream includes sub-streams having various frame rates. For example, the temporal scalable bitstream may be divided into sub-streams having a frame rate of 7.5 Hz, a frame rate of 15 Hz, a frame rate of 30 Hz, and a frame rate of 60 Hz. A quality scalable bitstream may be divided into sub-streams having different qualities according to a coarse-grained scalability (CGS) method, a medium-grained scalability (MGS) method, and a fine-grained scalability (FGS) method. The temporal scalability may also be distinguished according to different dimensions according to different frame rates, and the quality scalability may also be distinguished according to different dimensions according to different methods.

A multiview scalable bitstream includes sub-streams of different viewpoints in one bitstream. For example, in a stereoscopic image, a bitstream includes a left image and a right image. Also, a scalable bitstream may include sub-streams related to a multiview image and encoded data of a depth map. The viewpoint scalability may also be distinguished according to different dimensions according to different viewpoints.

Different scalable expansion types may be combined with each other. In other words, a scalable video bitstream may include sub-streams in which image sequences of a multi-layer including images, wherein at least one of temporal, spatial, quality, and multiview scalabilities are different from each other, are encoded.

FIG. 3B illustrates image sequences 31 through 33 having different scalable expansion types. The image sequence 31 of a first layer, the image sequence 32 of a second layer, and an image sequence 33 of an n-th layer (n is an integer) may be image sequences in which at least one of resolutions, qualities, and viewpoints are different from each other. Also, one of the image sequence 31 of the first layer, the image sequence 32 of the second layer, and the image sequence 33 of the n-th layer may be an image sequence of a base layer and the other image sequences may be image sequences of an enhancement layer.

For example, the image sequence 31 of the first layer may include images of a first viewpoint, the image sequence 32 of the second layer may include images of a second viewpoint, and the image sequence 33 of the n-th layer may include images of an n-th viewpoint. As another example, the image sequence 31 of the first layer may be a left-view image of a base layer, the image sequence 32 of the second layer may be a right-view image of the base layer, and the image sequence 33 of the n-th layer may be a right-view image of an enhancement layer. However, an embodiment is not limited thereto, and the image sequences 31 through 33 having different scalable expansion types may be image sequences having different image attributes.

Meanwhile, image sequences of different layers may be grouped as at least one layer set so as to increase encoding/decoding efficiency of a multi-layer video.

For example, the image sequence 31 of the first layer and the image sequence 32 of the second layer may be determined as a first layer set 34, and the image sequence 31 of the first layer, the image sequence 32 of the second layer 32, and the image sequence 33 of the n-th layer (n is an integer) may be determined as a second layer set 35. Accordingly, a decoding apparatus that requires the image sequence 33 of the n-th layer in order to reconstruct a high quality image may reconstruct an image from a bitstream of a layer included in the second layer set, and a decoding apparatus capable of reconstructing only a low quality image may reconstruct an image from a bitstream of a layer included in the first layer set.

In addition, by obtaining information required to decode an image frame according to layer sets, a multi-layer video may be efficiently reconstructed.

Also, as will be described later with reference to FIG. 6B, layer image sequences included in a layer set may be subdivided into certain format groups based on resolution, bit depth, or an image format, such as a color format. Also, a sub-DPB may be determined according to certain format groups.

Figure 4:
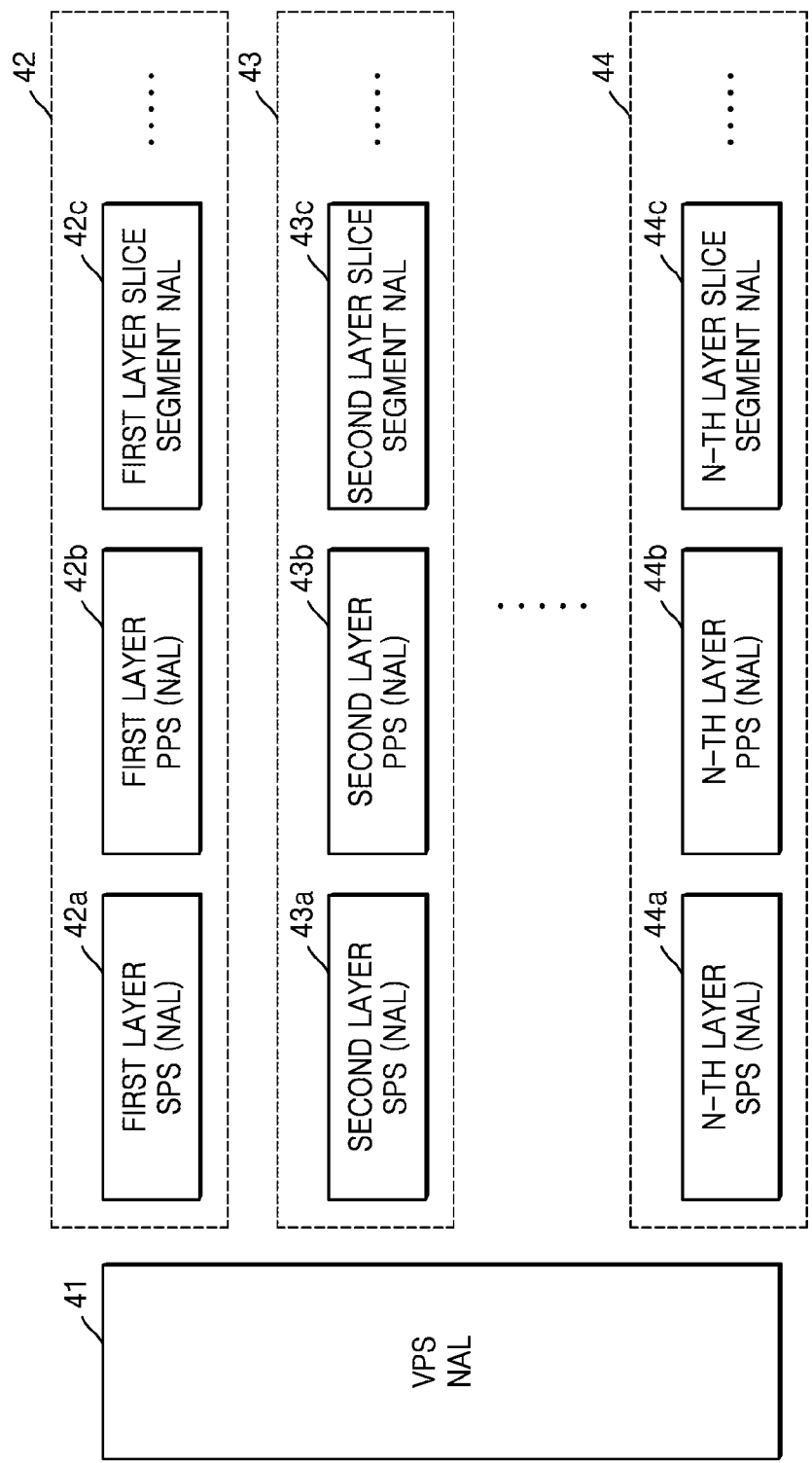
FIG. 4 illustrates network abstraction layer (NAL) units including encoded data of a multi-layer video, according to an embodiment.

FIG. 4 illustrates NAL units including encoded data of a multi-layer video, according to an embodiment.

As described above, the bitstream generator 14 outputs NAL units including encoded multi-layer video data and additional information.

A video parameter set (VPS) includes information applied to multi-layer image sequences 42 through 44 included in the multi-layer video. The NAL unit including information about the VPS is referred to as a VPS NAL unit 41.

The VPS NAL unit 41 includes a common syntax element shared by the multi-layer image sequences 42 through 43, information about an operation point to stop transmission of unnecessary information, and essential information about an operation point required during session negotiation, such as a profile or a level. In particular, the VPS NAL unit 41 according to an embodiment includes scalability information related to a scalability identifier for realizing scalability in a multi-layer video. The scalability information is information for determining scalability applied to the multi-layer image sequences 42 through 43 included in the multi-layer video.

The scalability information includes information about a scalability type and a scalability dimension applied to the multi-layer image sequences 42 through 4 included in the multi-layer video. In encoding and decoding methods according to a first embodiment of the present disclosure, the scalability information may be directly obtained from a value of a hierarchical identifier included in a NAL unit header. The hierarchical identifier is an identifier for distinguishing a plurality of layers included in a VPS. The VPS may signal the hierarchical identifier of each layer through VPS extension. The layer identifier of each layer of the VPS may be signaled by being included in the VPS NAL unit. For example, the hierarchical identifier of the NAL units belong to a certain layer of the VPS may be included in the VPS NAL unit. For example, the hierarchical identifier of the NAL unit belonging to the VPS may be signaled through the VPS extension. Accordingly, in encoding and decoding methods according to an embodiment of the present disclosure, the scalability information about a layer of the NAL units belonging to the VPS may be obtained by using the hierarchical identifier value of the NAL units.

Figure 5A:
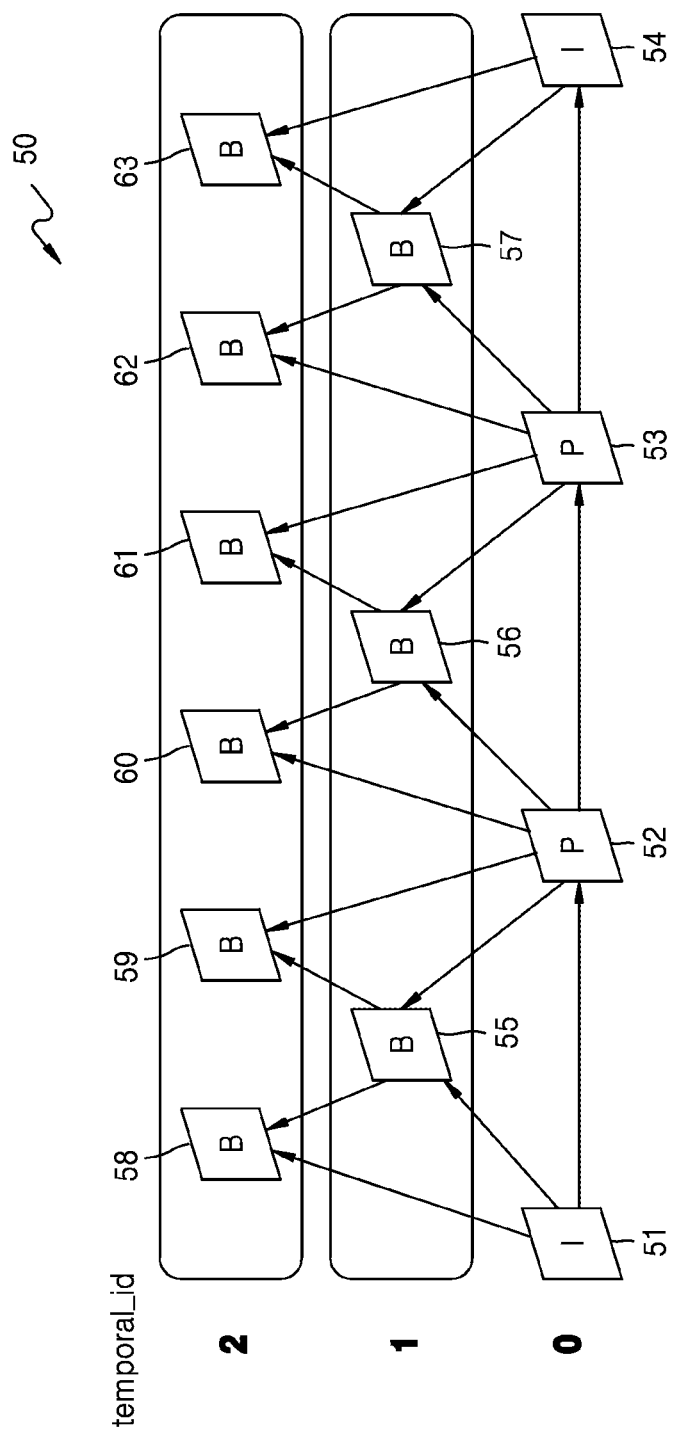
FIG. 5A illustrates a temporal sub-layer prediction structure according to a temporal hierarchical encoding and decoding method, according to an embodiment.

FIG. 5A illustrates a multi-layer prediction structure according to an encoding and decoding method using a temporal sub-layer.

A scalable video coding method may be performed according to a temporal hierarchical structure 50. The temporal hierarchical structure 50 includes a prediction structure of hierarchical B-type images 55 through 63. In a prediction structure of level 0, inter prediction of I-type images 51 and 54, and inter prediction of P-type images 52 and 53 are performed. In a prediction structure of level 1, inter prediction of B-type images 55 through 57 that references the I-type images 51 and 54, and P-type images 52 and 53 is performed. In a prediction structure of level 2, inter prediction that references the I-type images 51 and 54, the P-type images 52 and 53, and the B-type images 55 through 57 of level 1 is performed.

A temporal index ('temporal_id') is a number for identifying a prediction level, and a frame rate may increase as images of each level are output. For example, when the I-type images 51 and 54, and P-type images 52 and 53 of level 0 are decoded and output at a frame rate of 15 Hz, and then when the B-type images 55 through 57 of level 1 are decoded and output, a frame rate increases to 30 Hz, and when the B-type images 58 through 63 of level 2 are decoded and output, a frame rate may increase to 60 Hz.

According to an embodiment, when the temporal hierarchical structure 50 is realized in a scalable video coding method, images of level 0 may be encoded as base layer images, images of level 1 may be encoded as first enhancement layer images, and images of level 2 may be encoded as second enhancement layer images.

Accordingly, the multi-layer video decoding apparatus 20 according to an embodiment not only determines a size of a DPB according to layer sets, but also determines a size of a DPB based on a maximum level of a temporal layer, thereby efficiently managing the size of the DPB. For example, a maximum size of a DPB may be determined for each of a temporal sub-layer having a temporal layer of which a maximum level is 1, and a temporal sub-layer having a temporal layer of which a maximum level is 2.

Hereinafter, a method of determining a size of a DPB according to temporal sub-layers will be described with reference to FIG. 5B.

Figure 5B:
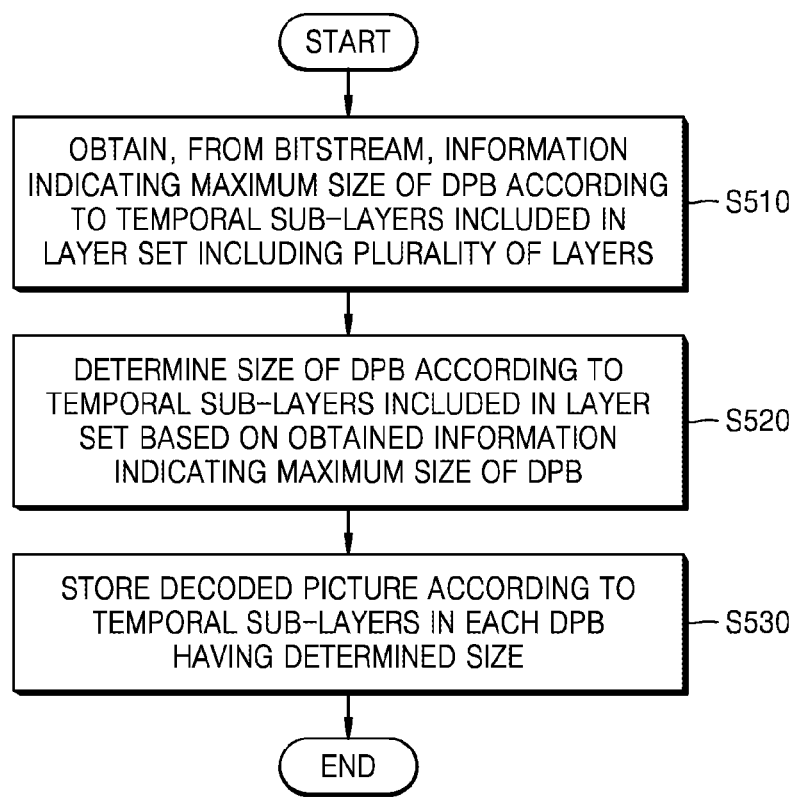
FIG. 5B is a flowchart of a method of managing a decoded picture buffer according to temporal sub-layers, according to an embodiment.

FIG. 5B is a flowchart of a method of managing a DPB according to temporal sub-layers, according to an embodiment.

In operation S510, the multi-layer video decoding apparatus 20 may obtain, from a bitstream, information indicating a maximum size of a DPB according to temporal sub-layers included in a layer set including a plurality of layers.

For example, the multi-layer video decoding apparatus 20 may obtain the information indicating the maximum size of the DPB according to temporal sub-layers included in the layer set. A maximum size of a DPB of a temporal sub-layer having a high level may be larger than a maximum size of a DPB of a temporal sub-layer having a low level.

In operation S520, the multi-layer video decoding apparatus 20 may determine the maximum size of the DPB according to temporal sub-layers included in the layer set based on the obtained information indicating the maximum size of the DPB.

In operation S530, the multi-layer video decoding apparatus 20 may store a decoded picture according to temporal sub-layers in each DPB having the determined size.

Figure 6A:
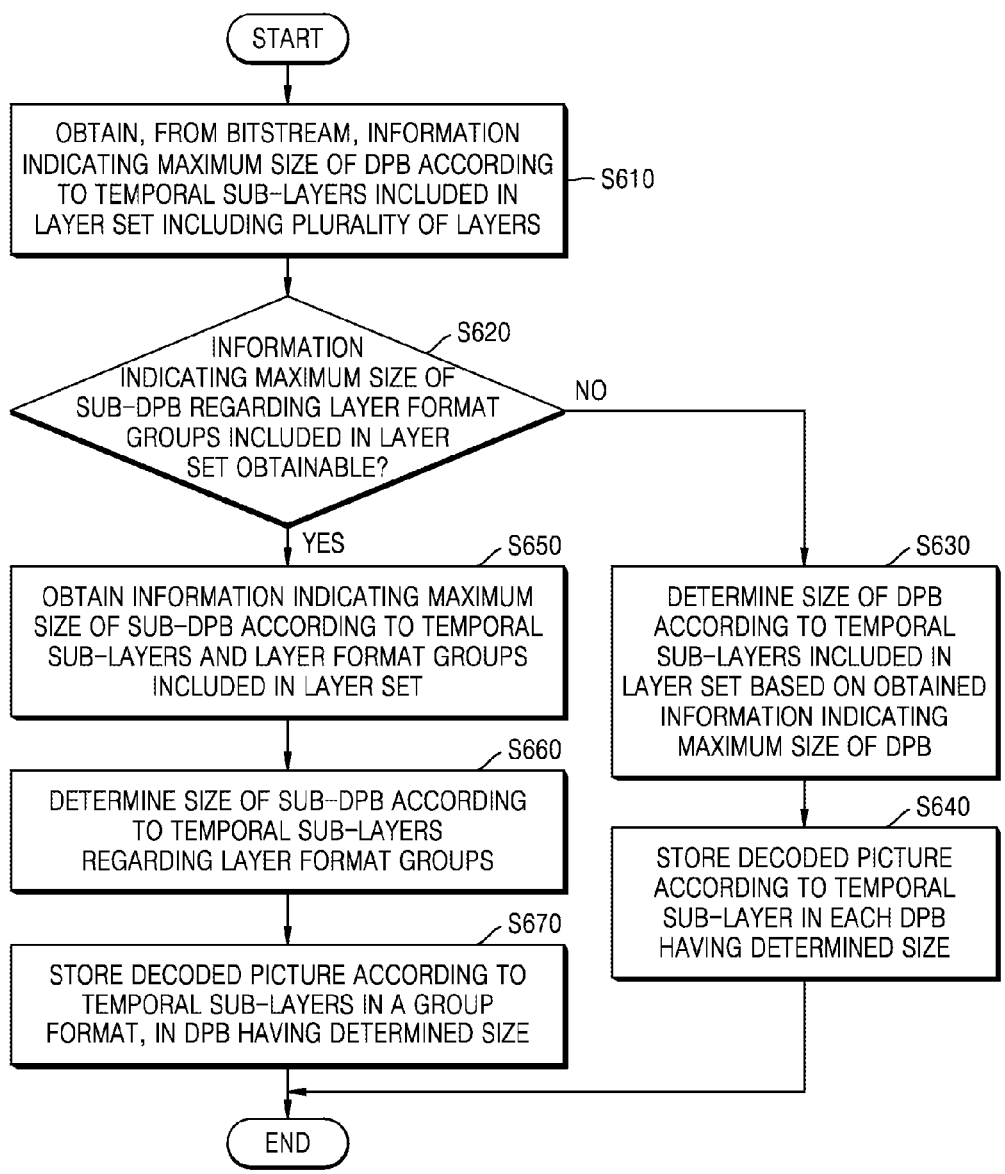
FIG. 6A is a flowchart of a method of managing a buffer for decoding a multi-layer video, according to an embodiment.

FIG. 6A is a flowchart of a method of managing a buffer for decoding a multi-layer video, according to an embodiment.

In operation S610, the multi-layer video decoding apparatus 20 obtains, from a bitstream, information indicating a maximum size of a DPB according to temporal sub-layers included in a layer set including a plurality of layers. For example, the multi-layer video decoding apparatus 20 may obtain the information indicating the maximum size of the DPB according to temporal sub-layers included in the layer set.

In operation S620, the multi-layer video decoding apparatus 20 determines whether information indicating a maximum size of a sub-DPB regarding a layer format group included in the layer set is obtainable. For example, the multi-layer video decoding apparatus 20 may obtain information indicating whether size information of the sub-DPB regarding the layer format group exist according to temporal sub-layers included in the layer set.

Here, a format group may be a group obtained by subdividing layer image sequences included in a layer set according to resolution, bit depth, or an image format, such as a color format.

For example, FIG. 6B illustrates an example of determining a layer format group. Referring to FIG. 6B, there may be layers having the same resolution, the same bit depth, and the same color format from among layers included in a layer set 601. Accordingly, the multi-layer video encoding apparatus 10 may determine a first layer and a second layer, which have the same format, as a first layer format group 602, and a third layer and a fourth layer as a second layer format group 603, so as to efficiently manage a DPB. Then, the multi-layer video encoding apparatus 10 may determine a maximum size of a sub-DPB according to determined layer format groups. Accordingly, a DPB regarding the layer set may include a plurality of sub-picture buffers.

Meanwhile, in FIG. 6B, it is described that a layer format group is determined based on a layer format, but an embodiment is not limited thereto, and a layer format group may be grouped according to a different standard such that a sub-DPB is efficiently configured regarding layers included in a layer set.

Referring back to FIG. 6A, when it is determined that the information indicating the maximum size of the sub-DPB is not obtainable, the multi-layer video decoding apparatus 20 determines a size of the DPB according to temporal sub-layers included in the layer set based on the obtained information indicating the maximum size of the DPB, in operation S630. Also, in operation S640, a decoded picture is stored according to temporal sub-layers, in each DPB having the determined size.

When it is determined that the information indicating the maximum size of the sub-DPB is obtainable, the information indicating the maximum size of the sub-DPB may be obtained in operation S650 according to temporal sub-layers and layer format groups included in the layer set.

In operation S660, the multi-layer video decoding apparatus 20 determines a size of the sub-DPB according to temporal sub-layers regarding the layer format groups. For example, the size of the sub-DPB may be determined according to layer sets, temporal sub-layers, and layer format groups based on the information indicating the maximum size of the sub-DPB.

In operation S670, the multi-layer video decoding apparatus 20 stores a decoded picture according to temporal sub-layers in a format group, in the sub-DPB having the determined size.

In FIG. 6A, it is described that the information indicating the maximum size of the sub-DPB is obtained after the information indicating the maximum size of the DPB regarding the layer set is obtained, but an embodiment is not limited thereto.

For example, instead of operation 610 of FIG. 6A, the multi-layer video decoding apparatus 20 may obtain, from the bitstream, information indicating whether a temporal sub-layer exist in the layer set including the plurality of layers. For example, sub_layer_flag_info_present_flag, i.e., information indicating whether a temporal sub-layer exists, may be obtained per layer set.

Accordingly, when information about a sub-DPB exists, a multi-layer video decoding apparatus may obtain information indicating a maximum size may be obtained according to sub-DPBs. In this case, an operation of obtaining information indicating a maximum size of a DPB regarding the entire layer set may be omitted.

FIG. 7A illustrates an example of a syntax 700 related to a size of a buffer for decoding a multi-layer video, according to an embodiment.

A syntax vps_extension( ) 701 for VPS extension may include a loop 702 and a conditional statement 703 for determining a maximum size of a DPB regarding a layer set.

First, in the loop 702, the multi-layer video decoding apparatus 20 may determine the conditional statement 703 according to indexes i of the layer sets based on information (numOutputLayerSets) indicating the number of layer sets.

In the conditional statement 703, a flag (vps_sub_layers_max_minus1_present_ flag) about whether information indicating the number of temporal sub-layers included in a layer that includes the most temporal sub-layers from among at least one layer included in the layer set (hereinafter, referred to as information about a maximum number of temporal sub-layers of a layer set) exists may be obtained. If the information about the maximum number of temporal sub-layers exist, information (max_sub_layers_output_layer_set_minus1[i]) about a maximum number of temporal sub-layers of a layer set having an i-th index may be obtained. The obtained max_sub_layers_output_layer_set_minus1[i] may be used in dpb_size( ) 711 of FIG. 7B.

FIG. 7B illustrates another example of a syntax 710 related to a size of a buffer for decoding a multi-layer video, according to an embodiment.

Referring to FIG. 7B, a syntax dpb_size( ) 711 for determining a size of a DPB may include conditional statements 712 through 716 for determining a maximum size of a DPB regarding a layer set.

In the conditional statement 712, the multi-layer video decoding apparatus 20 may obtain a flag (vps_sub_layers_max_minus1_present_flag) about whether information about a maximum number of temporal sub-layers of the layer set exists. If the flag (vps_sub_layers_max_minus1_present_flag) is true, the conditional statement 713 is executed.

In the conditional statement 713, the multi-layer video decoding apparatus 20 may obtain sub_layer_flag_info_present_flag[i], i.e., information indicating whether a temporal sub-layer exists according to indexes i of layer sets determined based on information (NumOutputLayerSets) indicating a number of layer sets.

In the conditional statement 714, conditional statements 715 through 717 are determined according to indexes j of the temporal sub-layers based on max_sub_layers_output_layer_set_minus1[i] induced from sub_layer_flag_info_present_flag[i]. Here, max_sub_layers_output_layer_set_minus1[i] is information about a maximum number of temporal sub-layers of a layer set having an i-th index. In other words, instead of increasing the index j of the temporal sub-layer up to a maximum number of temporal sub-layers in entire layers forming a multi-layer image, the multi-layer video decoding apparatus 20 may increase the index j of the temporal sub-layer only up to a maximum number of temporal sub-layers of a layer set to be decoded. For example, let's assume that there are five layers (a 0th layer, a first layer, a second layer, a third layer, and a fourth layer) forming a multi-layer image, and the five layers respectively include 1, 2, 3, 4, and 10 temporal sub-layers. Considering a first layer set including the 0th, first, and third layers and a second layer set including the 0th, third, and fourth layers, j may be increased up to 3 when the first layer set is decoded and may be increase dup to 10 when the second layer set is decoded. Here, j may be the same as a highest level value (HightestTid) of a temporal index (Temporalid) usable in the temporal sub-layer of the layer set having the i-th index.

In the conditional statement 715, when j is larger than 0 and a temporal sub-layer exists (sub_layer_flag_info_present_flag[i]=1), information (sub_layer_dpb_info_present_flag[i][j]) indicating whether information about a sub-DPB exists may be obtained.

In the conditional statement 716, when sub_layer_dpb_info_present_flag[i][j] is 1, a condition of the conditional statement 717 is determined.

In the conditional statement 717, information (max_vps_dec_pic_buffering_minus1[i][j][k]) indicating a size of a sub-DPB may be obtained according to indexes k of sub-DPBs determined based on the number (NumSubDpbs[i]) of sub-DPBs included in the layer set.

Accordingly, the multi-layer video decoding apparatus 20 may determine the size of the sub-DPB according to layer sets i, temporal sub-layers j, and layer format groups k, based on max_vps_dec_pic_buffering_minus1[i][j][k]. When the information indicating the maximum size of the sub-DPB is not obtainable, information indicating the maximum size of the DPB according to layer sets i and temporal sub-layers j may be obtained. The multi-layer video decoding apparatus 20 according to an embodiment may also obtain information about temporal sub-layer ordering and DPB-related information including realignment frame number information (max_vps_num_reorder_pics[i][j]) indicating the number of image frames required to be realigned according to layer sets i and temporal sub-layers j and maximum latency increase information (max_vps_latency_increase_plus1[i][j]) for determining a maximum latency frame.

In a conditional statement 718, when information about a maximum number of temporal sub-layers of a layer set does not exist, the multi-layer video decoding apparatus 20 determines a maximum size of a DPB regarding a layer set. In a conditional statement 719, the information about the maximum number of temporal sub-layers of the layer set exists.

In the conditional statement 719, the multi-layer video decoding apparatus 20 may obtain information indicating a size of a sub-DPB according to the indexes j of the temporal sub-layers while increasing the indexes j of the temporal sub-layers by the number of temporal sub-layers included in a layer that includes the most temporal sub-layers from among the layers included in the multi-layer image. For example, as described above, let's assume that there are five layers (the 0th layer, the first layer, the second layer, the third layer, and the fourth layer) forming the multi-layer image and the five layers respectively include 1, 2, 3, 4, and 10 temporal sub-layers. In this case, considering the first layer set including the 0th, first, and third layers and the second layer set including the 0th, third, and fourth layers, since information about a maximum number of temporal sub-layers of a layer set does not exist, the multi-layer video decoding apparatus 20 obtains the size of the sub-DPB according to layer sets i, indexes j of temporal sub-layers, and layer format groups k while increasing the index j up to 10 regardless of a layer set to be decoded. When information indicating a maximum size of a sub-DPB is not obtainable, information indicating a maximum size of a DPB may be obtained according to layer sets i and temporal sub-layers j.

Signaling of information about a size of a DPB according to an embodiment may be realized as Table 1 below in a syntax of video parameter set video usability information (VPS VUI).

TABLE 1

| vps_vui( ){ | Descriptor |
|---|---|
|   cross_layer_pic_type_aligned_lag | u(1) |
|   if( !cross_layer_pic_type_aligned_flag ) | |
|     cross_layer_irap_aligned_flag | u(1) |
|   bit_rate_present_vps_flag | u(1) |
|   pic_rate_present_vps_flag | u(1) |
|   if( bit_rate_present_vps_flag \|\| pic_rate_present_vps_flag ) | |
|     for( i = 0; i <= vps_number_layer_sets_minus1; i++ ) | |
|       for( j = 0; j <= vps_max_sub_layers_minus1; j++ ) { | |
|         if( bit_rate_present_vps_flag ) | |
|           bit_rate_present_flag[ i ][ j ] | u(1) |
|         if( pic_rate_present_vps_flag ) | |
|           pic_rate_present_flag[ i ][ j ] | u(1) |
|         if( bit_rate_present_flag[ i ][ j ] ) { | |
|           avg_bit_rate[ i ][ j ] | u(16) |
|           max_bit_rate[ i ][ j ] | u(16) |
|         } | |
|         if( pic_rate_present_flag[ i ][ j ] ) { | |
|           constant_pic_rate_idc[ i ][ j ] | u(2) |
|           avg_pic_rate[ i ][ j ] | u(16) |
|         } | |
|       } | |
|   tiles_not_in_use_flag | u(1) |
|   if( !tiles_not_in_use_flag ) { | |
|     for( i = 0; i <= MaxLayersMinus1; i++ ) { | u(1) |
|       tiles_in_use_flag[ i ] | |
|       if( tiles_in_use_flag[ i ] ) | |
|         loop_filter_not_across_tiles_flag[ i ] | u(1) |
|     } | |
|     for( i = 1; i <= MaxLayersMinus1; i++ ) | |
|       for( j = 0; j <NumDirectRefLayers[ layer_id_in_nuh[ i ] ]; j++ ) { | |
|         layerIdx = LayerIdxInVps[ RefLayerId[ layer_id_in_nuh[ i ] ][ j ] ] | |
|         if( tiles_in_use_flag[ i ] && tiles_in_use_flag[ layerIdx ] ) | |
|           tile_boundaries_aligned_flag[ i ][ j ] | u(1) |
|       } | |
|   } | |
|   wpp_not_in_use_flag | |
|   if( !wpp_not_in_use_flag ) | |
|     for( i = 0; i <= MaxLayersMinus1; i++ ) | |
|       wpp_in_use_flag[ i ] | u(1) |
|   single_layer_for_non_irap_flag | u(1) |
|   higher_layer_irap_skip_flag | u(1) |
|   ilp_restricted_ref_layers_flag | u(1) |
|   if( ilp_restricted_ref_layers_flag ) | |
|     for( i = 1; i <= MaxLayersMinus1; i++ ) | |
|       for( j = 0; j <NumDirectRefLayers[ layer_id_in_nuh[ i ] ]; j++ ) { | |
|         min_spatial_segment_offset_plus1[ i ][ j ] | ue(v) |
|         if( min_spatial_segment_offset_plus1[ i ][ j ] > 0 ) { | |
|           ctu_based_offset_enabled_flag[ i ][ j ] | u(1) |
|           if( ctu_based_offset_enabled_flag[ i ][ j ] ) | |
|             min_horizontal_ctu_offset_plus1[ i ][ j ] | ue(v) |
|         } | |
|       } | |

TABLE 1-continued

| vps_vui( ){ | Descriptor |
|---|---|
| vps_dpb_size_info_present_flag | u(1) |
| if(vps_dpb_size_info_present_flag) | |
|   dpb_size( ) | |
| video_signal_info_idx_present_flag | u(1) |
| if( video_signal_info_idx_present_flag ) | |
|   vps_num_video_signal_info_minus1 | u(4) |
| for( i = 0; i <= vps_num_video_signal_info_minus1; i++ ) | |
|   video_signal_info( ) | |
| if( video_signal_info_idx_present_flag &&vps_num_video_signal_info_minus1 > 0) | |
|   for( i = 1; i <= MaxLayersMinus1; i++ ) | |
|     vps_video_signal_info_idx[ i ] | u(4) |
| vps_vui_bsp_hrd_present_flag | u(1) |
| if( vps_vui_bsp_hrd_present_flag ) | |
|   vps_vui_bsp_hrd_parameters( ) | |
| } | |

Meanwhile, for convenience of description, only operations performed by the multi-layer video decoding apparatus 20 are described in FIGS. 7A and 7B, and operations of the multi-layer video encoding apparatus 10 are omitted, but it would be obvious to one of ordinary skill in the art that the corresponding operations may be performed in the multi-layer video encoding apparatus 10.

The video encoding and decoding methods performed by the video encoding and decoding apparatuses described above may be used for encoding and decoding of an inter-layer video in inter-layer video encoding and decoding apparatuses.

As described above, the multi-layer video encoding apparatus 10 according to an embodiment and the multi-layer video decoding apparatus 20 according to an embodiment split blocks obtained by splitting video data into coding units having a tree structure, and use coding units, prediction units, and transformation units for inter-layer prediction or inter prediction of the coding units. Hereinafter, a video encoding method and apparatus, and a video decoding method and apparatus based on coding units and transformation units of a tree structure, according to an embodiment, will be described with reference to FIGS. 8 through 20.

In the multi-layer video encoding apparatus 10 according to an embodiment and the multi-layer video apparatus 20 according to an embodiment, as described above, video data may be split into coding units having a tree structure, and coding units, prediction units, and transformation units are used for inter layer prediction or inter prediction on the coding units. Hereinafter, a video encoding method and apparatus and a video decoding method and apparatus based on coding units and transformation units having a tree structure according to an embodiment will be described with reference to FIGS. 8 through 20.

In principle, during encoding/decoding for a multi-layer video, encoding/decoding processes for first layer images and encoding/decoding processes for second layer images are separately performed. That is, when inter-layer prediction is performed on a multi-layer video, encoding/decoding results of a single-layer video are referred to each other, but separate encoding/decoding processes are performed for respective single-layer videos.

For convenience of description, since a video encoding process and a video decoding process based on a coding unit of a tree structure, which will be described with reference to FIGS. 8 through 20, are performed on a single-layer video, inter prediction and motion compensation will be described. However, as described with reference to FIGS. 1A through 7, inter-layer prediction and compensation between base view images and second layer images may be performed to encode/decode a video stream.

Figure 8:
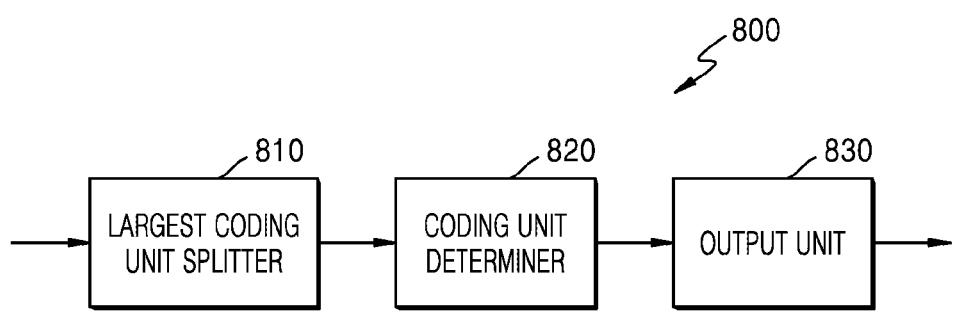
FIG. 8 illustrates a block diagram of a video encoding apparatus based on coding units of a tree structure, according to an embodiment.

Accordingly, in order for an encoder of an inter-layer video encoding apparatus according to an embodiment to encode a multi-layer video based on coding units having a tree structure, the inter-layer video encoding apparatus may include as many video encoding apparatuses 800 of FIG. 8 as the number of layers of the multi-layer video so as to perform video encoding according to each single-layer video, thereby controlling each video encoding apparatus 800 to encode an assigned single-layer video. Also, the inter-layer video encoding apparatus may perform inter-view prediction by using an encoding result of individual single views of each video encoding apparatus 800. Accordingly, the encoder of the inter-layer video encoding apparatus may generate a base view video stream and a second layer video stream, which include encoding results according to layers.

Figure 9:
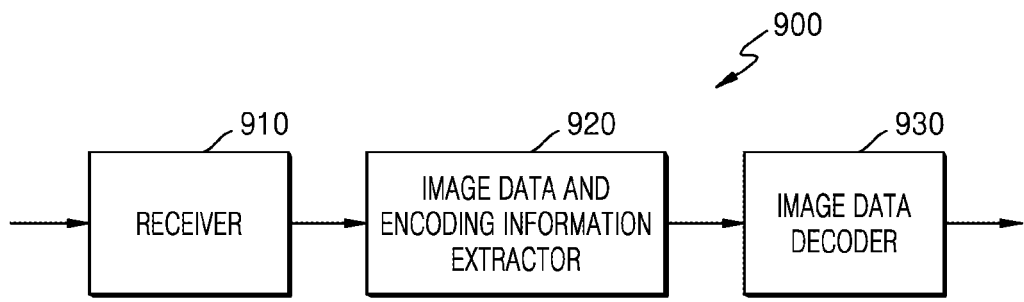
FIG. 9 illustrates a block diagram of a video decoding apparatus based on coding units of a tree structure, according to an embodiment.

Similarly, in order for a decoder of an inter-layer video decoding apparatus according to an embodiment to decode a multi-layer video based on coding units having a tree structure, the inter-layer video decoding apparatus may include as many video decoding apparatuses 900 of FIG. 9 as the number of layers of the multi-layer video so as to perform video decoding according to layers with respect to a received first layer video stream and a received second layer video stream, thereby controlling each video decoding apparatus 900 to decode an assigned single-layer video. Also, the inter-layer video decoding apparatus may perform inter-layer compensation by using a decoding result of individual single layer of each video decoding apparatus 900. Accordingly, the decoder of the inter-layer video decoding apparatus may generate first layer images and second layer images, which are reconstructed according to layers.

FIG. 8 illustrates a block diagram of the video encoding apparatus 800 based on coding units of a tree structure, according to an embodiment of the present disclosure.

The video encoding apparatus 800 according to an embodiment involving video prediction based on coding units according to a tree structure includes a coding unit determiner 820 and an output unit 830. Hereinafter, for convenience of description, the video encoding apparatus 800 according to an embodiment involving video prediction based on coding units according to a tree structure will be abbreviated to the 'video encoding apparatus 800'.

The coding unit determiner 820 may split a current picture based on a largest coding unit that is a coding unit having a maximum size for a current picture of an image. If the current picture is larger than the largest coding unit, image data of the current picture may be split into the at least one largest coding unit. The largest coding unit according to an embodiment may be a data unit having a size of 32×32, 64×64, 128×128, 256×256, etc., wherein a shape of the data unit is a square having a width and length in squares of 2.

A coding unit according to an embodiment may be characterized by a maximum size and a depth. The depth denotes the number of times the coding unit is spatially split from the largest coding unit, and as the depth deepens, deeper coding units according to depths may be split from the largest coding unit to a minimum coding unit. A depth of the largest coding unit is an uppermost depth and a depth of the minimum coding unit is a lowermost depth. Since a size of a coding unit corresponding to each depth decreases as the depth of the largest coding unit deepens, a coding unit corresponding to an upper depth may include a plurality of coding units corresponding to lower depths.

As described above, the image data of the current picture is split into the largest coding units according to a maximum size of the coding unit, and each of the largest coding units may include deeper coding units that are split according to depths. Since the largest coding unit according to an embodiment is split according to depths, the image data of a spatial domain included in the largest coding unit may be hierarchically classified according to depths.

A maximum depth and a maximum size of a coding unit, which limit the total number of times a height and a width of the largest coding unit are hierarchically split, may be predetermined.

The coding unit determiner 820 encodes at least one split region obtained by splitting a region of the largest coding unit according to depths, and determines a depth to output a finally encoded image data according to the at least one split region. In other words, the coding unit determiner 820 determines a final depth by encoding the image data in the deeper coding units according to depths, according to the largest coding unit of the current picture, and selecting a depth having the least encoding error. The determined final depth and the encoded image data according to the determined coded depth are output to the output unit 830.

The image data in the largest coding unit is encoded based on the deeper coding units corresponding to at least one depth equal to or below the maximum depth, and results of encoding the image data are compared based on each of the deeper coding units. A depth having the least encoding error may be selected after comparing encoding errors of the deeper coding units. At least one final depth may be selected for each largest coding unit.

The size of the largest coding unit is split as a coding unit is hierarchically split according to depths, and as the number of coding units increases. Also, even if coding units correspond to the same depth in one largest coding unit, it is determined whether to split each of the coding units corresponding to the same depth to a lower depth by measuring an encoding error of the image data of the each coding unit, separately. Accordingly, even when image data is included in one largest coding unit, the encoding errors may differ according to regions in the one largest coding unit, and thus the final depths may differ according to regions in the image data. Thus, one or more final depths may be determined in one largest coding unit, and the image data of the largest coding unit may be divided according to coding units of at least one final depth.

Accordingly, the coding unit determiner 820 according to an embodiment may determine coding units having a tree structure included in the largest coding unit. The 'coding units having a tree structure' according to an embodiment include coding units corresponding to a depth determined to be the final depth, from among all deeper coding units included in the largest coding unit. A coding unit of a final depth may be hierarchically determined according to depths in the same region of the largest coding unit, and may be independently determined in different regions. Similarly, a final depth in a current region may be independently determined from a final depth in another region.

A maximum depth according to an embodiment is an index related to the number of splitting times from a largest coding unit to a minimum coding unit. A first maximum depth according to an embodiment may denote the total number of splitting times from the largest coding unit to the minimum coding unit. A second maximum depth according to an embodiment may denote the total number of depth levels from the largest coding unit to the minimum coding unit. For example, when a depth of the largest coding unit is 0, a depth of a coding unit, in which the largest coding unit is split once, may be set to 1, and a depth of a coding unit, in which the largest coding unit is split twice, may be set to 2. Here, if the minimum coding unit is a coding unit in which the largest coding unit is split four times, depth levels of depths 0, 1, 2, 3, and 4 exist, and thus the first maximum depth may be set to 4, and the second maximum depth may be set to 5.

Prediction encoding and transformation may be performed according to the largest coding unit. The prediction encoding and the transformation are also performed based on the deeper coding units according to a depth equal to or depths less than the maximum depth, according to the largest coding unit.

Since the number of deeper coding units increases whenever the largest coding unit is split according to depths, encoding, including the prediction encoding and the transformation, is performed on all of the deeper coding units generated as the depth deepens. For convenience of description, the prediction encoding and the transformation will now be described based on a coding unit of a current depth, in a largest coding unit.

The video encoding apparatus 800 according to an embodiment may variously select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the video encoding apparatus 800 may select not only a coding unit for encoding the image data, but also a data unit different from the coding unit so as to perform the prediction encoding on the image data in the coding unit.

In order to perform prediction encoding in the largest coding unit, the prediction encoding may be performed based on a coding unit corresponding to a final depth according to an embodiment, i.e., based on a coding unit that is no longer split to coding units corresponding to a lower depth. Hereinafter, the coding unit that is no longer split and becomes a basis unit for prediction encoding will now be referred to as a 'prediction unit'. A partition obtained by splitting the prediction unit may include a prediction unit or a data unit obtained by splitting at least one of a height and a width of the prediction unit. A partition is a data unit where a prediction unit of a coding unit is split, and a prediction unit may be a partition having the same size as a coding unit.

For example, when a coding unit of 2N×2N (where N is a positive integer) is no longer split and becomes a prediction unit of 2N×2N, and a size of a partition may be 2N×2N, 2N×N, N×2N, or N×N. Examples of a partition mode according to an embodiment include symmetrical partitions that are obtained by symmetrically splitting a height or width of the prediction unit, partitions obtained by asymmetrically splitting the height or width of the prediction unit, such as 1:n or n:1, partitions that are obtained by geometrically splitting the prediction unit, and partitions having arbitrary shapes.

A prediction mode of the prediction unit may be at least one of an intra mode, a inter mode, and a skip mode. For example, the intra mode or the inter mode may be performed on the partition of 2N×2N, 2N×N, N×2N, or N×N. Also, the skip mode may be performed only on the partition of 2N×2N. The encoding is independently performed on one prediction unit in a coding unit, thereby selecting a prediction mode having a least encoding error.

The video encoding apparatus 800 according to an embodiment may also perform the transformation on the image data in a coding unit based not only on the coding unit for encoding the image data, but also based on a data unit that is different from the coding unit. In order to perform the transformation in the coding unit, the transformation may be performed based on a transformation unit having a size smaller than or equal to the coding unit. For example, the transformation unit may include a data unit for an intra mode and a transformation unit for an inter mode.

The transformation unit in the coding unit may be recursively split into smaller sized regions in a manner similar to that in which the coding unit is split according to the tree structure, according to an embodiment. Thus, residual data in the coding unit may be split according to the transformation unit having the tree structure according to transformation depths.

A transformation depth indicating the number of splitting times to reach the transformation unit by splitting the height and width of the coding unit may also be set in the transformation unit according to an embodiment. For example, in a current coding unit of 2N×2N, a transformation depth may be 0 when the size of a transformation unit is 2N×2N, may be 1 when the size of the transformation unit is N×N, and may be 2 when the size of the transformation unit is N/2×N/2. In other words, the transformation unit having the tree structure may be set according to the transformation depths.

Split information according to depths requires not only information about a depth but also requires information related to prediction and transformation. Accordingly, the coding unit determiner 820 not only determines a depth having a least encoding error but also determines a partition mode in which a prediction unit is split to partitions, a prediction mode according to prediction units, and a size of a transformation unit for transformation.

Coding units according to a tree structure in a largest coding unit and methods of determining a prediction unit/partition, and a transformation unit, according to embodiments, will be described in detail later with reference to FIGS. 9 through 19.

The coding unit determiner 820 may measure an encoding error of deeper coding units according to depths by using Rate-Distortion Optimization based on Lagrangian multipliers.

The output unit 830 outputs, in bitstreams, the image data of the largest coding unit, which is encoded based on the at least one depth determined by the coding unit determiner 820, and information according to depths.

The encoded image data may be obtained by encoding residual data of an image.

The information according to depths may include depth information, partition mode information about the prediction unit, prediction mode information, and transformation unit split information.

Final depth information may be defined by using split information according to depths, which indicates whether encoding is performed on coding units of a lower depth instead of a current depth. If the current depth of the current coding unit is a depth, the current coding unit is encoded by using the coding unit of the current depth, and thus split information of the current depth may be defined not to split the current coding unit to a lower depth. On the contrary, if the current depth of the current coding unit is not the depth, the encoding has to be performed on the coding unit of the lower depth, and thus the split information of the current depth may be defined to split the current coding unit to the coding units of the lower depth.

If the current depth is not the depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed for the coding units having the same depth.

Since the coding units having a tree structure are determined for one largest coding unit, and at least one piece of split information has to be determined for a coding unit of a depth, at least one piece of split information may be determined for one largest coding unit. Also, a depth of data of the largest coding unit may vary according to locations since the data is hierarchically split according to depths, and thus a depth and split information may be set for the data.

Accordingly, the output unit 830 according to the embodiment may assign encoding information about a corresponding depth and an encoding mode to at least one of the coding unit, the prediction unit, and a minimum unit included in the largest coding unit.

The minimum unit according to an embodiment is a square data unit obtained by splitting the smallest coding unit constituting the lowermost depth by 4. Alternatively, the minimum unit according to an embodiment may be a maximum square data unit that may be included in all of the coding units, prediction units, partition units, and transformation units included in the largest coding unit.

For example, the encoding information output by the output unit 830 may be classified into encoding information according to deeper coding units, and encoding information according to prediction units. The encoding information according to the deeper coding units may include the prediction mode information and the partition size information. The encoding information according to the prediction units may include information about an estimated direction during an inter mode, about a reference image index of the inter mode, about a motion vector, about a chroma component of an intra mode, and about an interpolation method during the intra mode.

Information about a maximum size of the coding unit defined according to pictures, slices, or GOPs, and information about a maximum depth may be inserted into a header of a bitstream, a sequence parameter set, or a picture parameter set.

Information about a maximum size of the transformation unit permitted with respect to a current video, and information about a minimum size of the transformation unit may also be output through a header of a bitstream, a sequence parameter set, or a picture parameter set. The output unit 830 may encode and output reference information, prediction information, and slice type information that are related to prediction.

According to the simplest embodiment for the video encoding apparatus 800, the deeper coding unit may be a coding unit obtained by dividing a height or width of a coding unit of an upper depth, which is one layer above, by two. That is, when the size of the coding unit of the current depth is 2N×2N, the size of the coding unit of the lower depth is N×N. Also, a current coding unit having a size of 2N×2N may maximally include four lower-depth coding units having a size of N×N.

Accordingly, the video encoding apparatus 800 may form the coding units having the tree structure by determining coding units having an optimum shape and an optimum size for each largest coding unit, based on the size of the largest coding unit and the maximum depth determined considering characteristics of the current picture. Also, since encoding may be performed on each largest coding unit by using any one of various prediction modes and transformations, an optimal encoding mode may be determined by taking into account characteristics of the coding unit of various image sizes.

Thus, if an image having a high resolution or a large data amount is encoded in a conventional macroblock, the number of macroblocks per picture excessively increases. Accordingly, the number of pieces of compressed information generated for each macroblock increases, and thus it is difficult to transmit the compressed information and data compression efficiency decreases. However, by using the video encoding apparatus according to the embodiment, image compression efficiency may be increased since a coding unit is adjusted while considering characteristics of an image while increasing a maximum size of a coding unit while considering a size of the image.

The inter-layer video encoding apparatus including the components described above in FIG. 1A may include the video encoding apparatuses 800 corresponding to the number of layers so as to encode single layer images in each of the layers of a multilayer video. For example, a first layer encoder may include one video encoding apparatus 800, and a second layer encoder may include the video encoding apparatuses 800 corresponding to the number of second layers.

When the video encoding apparatus 800 encodes first layer images, the coding unit determiner 820 may determine a prediction unit for inter-image prediction for each of coding units of a tree structure according to each largest coding unit, and may perform the inter-image prediction on each prediction unit.

When the video encoding apparatus 800 encodes the second layer images, the coding unit determiner 820 may determine prediction units and coding units of a tree structure according to each largest coding unit, and may perform inter-prediction on each of the prediction units.

The video encoding apparatus 800 may encode a luminance difference so as to compensate for the luminance difference between the first layer image and the second layer image. However, whether to perform luminance compensation may be determined according to an encoding mode of a coding unit. For example, the luminance compensation may be performed only on a prediction unit having a size of 2N×2N.

FIG. 9 illustrates a block diagram of the video decoding apparatus 900 based on coding units of a tree structure, according to an embodiment.

The video decoding apparatus involving video prediction based on coding units of the tree structure 200 according to the embodiment includes a receiver 910, an image data and encoding information extractor 920, and an image data decoder 930. Hereinafter, for convenience of description, the video decoding apparatus involving video prediction based on coding units of the tree structure 900 according to the embodiment is referred to as the 'video decoding apparatus 900'.

Definitions of various terms, such as a coding unit, a depth, a prediction unit, a transformation unit, and various types of split information for decoding operations of the video decoding apparatus 900 according to the embodiment are identical to those described with reference to FIG. 8 and the video encoding apparatus 800.

The receiver 910 receives and parses a bitstream of an encoded video. The image data and encoding information extractor 920 extracts encoded image data for each coding unit from the parsed bitstream, wherein the coding units have a tree structure according to each largest coding unit, and outputs the extracted image data to the image data decoder 930. The image data and encoding information extractor 920 may extract information about a maximum size of a coding unit of a current picture, from a header about the current picture, a sequence parameter set, or a picture parameter set.

Also, the image data and encoding information extractor 920 extracts a final depth and split information about the coding units having a tree structure according to each largest coding unit, from the parsed bitstream. The extracted final depth and the extracted split information are output to the image data decoder 930. That is, the image data in a bitstream is split into the largest coding unit so that the image data decoder 930 decodes the image data for each largest coding unit.

A depth and split information according to each of the largest coding units may be set for one or more pieces of depth information, and split information according to depths may include partition mode information of a corresponding coding unit, prediction mode information, and split information of a transformation unit. Also, as the depth information, the split information according to depths may be extracted.

The depth and the split information according to each of the largest coding units extracted by the image data and encoding information extractor 920 are a depth and split information determined to generate a minimum encoding error when an encoder, such as the video encoding apparatus 800, repeatedly performs encoding for each deeper coding unit according to depths according to each largest coding unit. Accordingly, the video decoding apparatus 900 may reconstruct an image by decoding data according to an encoding method that generates the minimum encoding error.

Since encoding information about the depth and the encoding mode may be assigned to a predetermined data unit from among a corresponding coding unit, a prediction unit, and a minimum unit, the image data and encoding information extractor 920 may extract the depth and the split information according to the predetermined data units. If a depth and split information of a corresponding largest coding unit are recorded according to each of the predetermined data units, predetermined data units having the same depth and the split information may be inferred to be the data units included in the same largest coding unit.

The image data decoder 930 reconstructs the current picture by decoding the image data in each largest coding unit based on the depth and the split information according to each of the largest coding units. That is, the image data decoder 930 may decode the encoded image data based on the read information about the partition mode, the prediction mode, and the transformation unit for each coding unit from among the coding units having the tree structure included in each largest coding unit. A decoding process may include a prediction including intra prediction and motion compensation, and an inverse transformation.

The image data decoder 930 may perform intra prediction or motion compensation according to a partition and a prediction mode of each coding unit, based on the information about the partition type and the prediction mode of the prediction unit of the coding unit according to depths.

In addition, the image data decoder 930 may read information about a transformation unit according to a tree structure for each coding unit so as to perform inverse transformation based on transformation units for each coding unit, for inverse transformation for each largest coding unit. Due to the inverse transformation, a pixel value of a spatial domain of the coding unit may be reconstructed.

The image data decoder 930 may determine a depth of a current largest coding unit by using split information according to depths. If the split information indicates that image data is no longer split in the current depth, the current depth is a depth. Accordingly, the image data decoder 930 may decode the image data of the current largest coding unit by using the information about the partition mode of the prediction unit, the prediction mode, and the size of the transformation unit for each coding unit corresponding to the current depth.

That is, data units containing the encoding information including the same split information may be gathered by observing the encoding information set assigned for the predetermined data unit from among the coding unit, the prediction unit, and the minimum unit, and the gathered data units may be considered to be one data unit to be decoded by the image data decoder 930 in the same encoding mode. As such, the current coding unit may be decoded by obtaining the information about the encoding mode for each coding unit.

The inter-layer video decoding apparatus including the components described above in FIG. 2A may include the video decoding apparatuses 900 corresponding to the number of views, so as to reconstruct first layer images and second layer images by decoding a received first layer image stream and a received second layer image stream.

When the first layer image stream is received, the image data decoder 930 of the video decoding apparatus 900 may split samples of the first layer images, which are extracted from the first layer image stream by the extractor 920, into coding units according to a tree structure of a largest coding unit. The image data decoder 930 may perform motion compensation, based on prediction units for the inter-image prediction, on each of the coding units according to the tree structure of the samples of the first layer images, and may reconstruct the first layer images.

When the second layer image stream is received, the image data decoder 930 of the video decoding apparatus 900 may split samples of the second layer images, which are extracted from the second layer image stream by the extractor 920, into coding units according to a tree structure of a largest coding unit. The image data decoder 930 may perform motion compensation, based on prediction units for the inter-image prediction, on each of the coding units of the samples of the second layer images, and may reconstruct the second layer images.

The extractor 920 may obtain, from a bitstream, information related to a luminance error so as to compensate for a luminance difference between the first layer image and the second layer image. However, whether to perform luminance compensation may be determined according to an encoding mode of a coding unit. For example, the luminance compensation may be performed only on a prediction unit having a size of 2N×2N.

Thus, the video decoding apparatus 900 may obtain information about at least one coding unit that generates the minimum encoding error when encoding is recursively performed for each largest coding unit, and may use the information to decode the current picture. That is, the coding units having the tree structure determined to be the optimum coding units in each largest coding unit may be decoded.

Accordingly, even if an image has high resolution or has an excessively large data amount, the image may be efficiently decoded and reconstructed by using a size of a coding unit and an encoding mode, which are adaptively determined according to characteristics of the image, by using optimal split information received from an encoding terminal.

Figure 10:
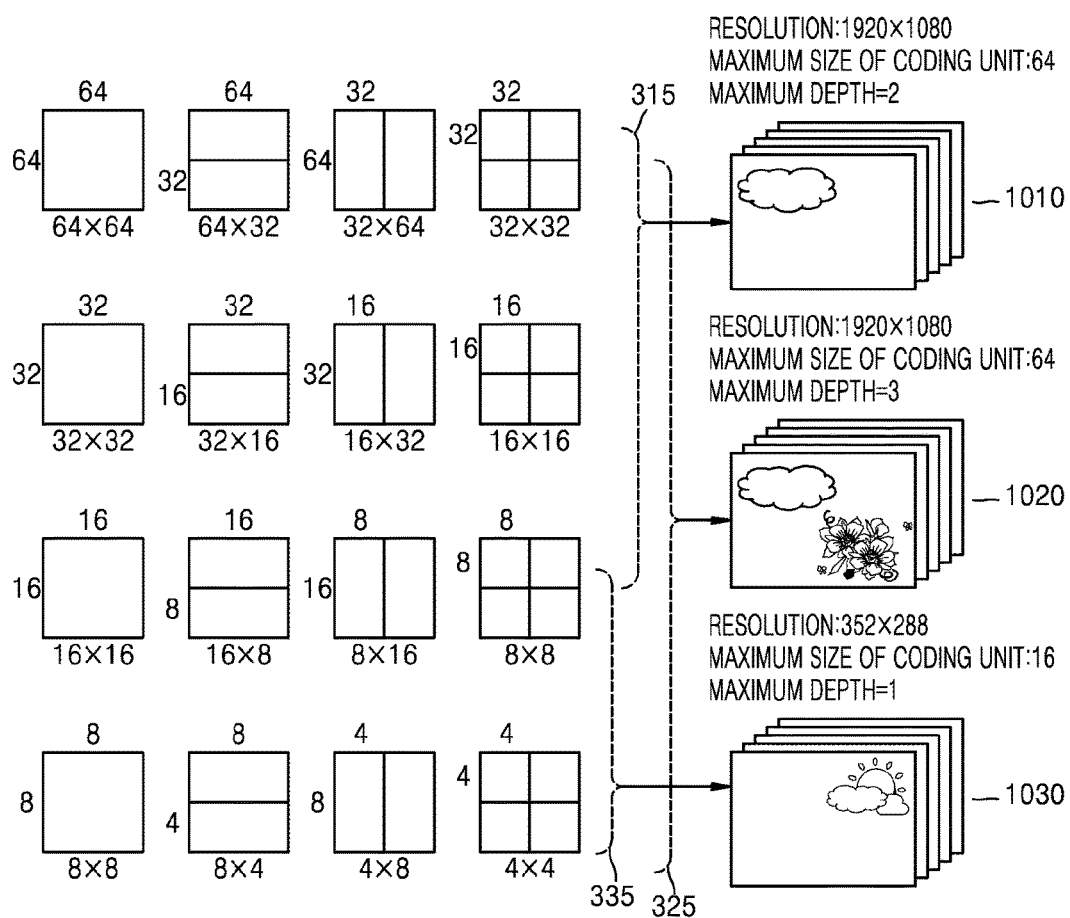
FIG. 10 illustrates a concept of coding units, according to an embodiment.

FIG. 10 illustrates a concept of coding units, according to an embodiment.

A size of a coding unit may be expressed by width×height, and may be 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 1010, a resolution is 1920×1080, a maximum size of a coding unit is 64, and a maximum depth is 2. In video data 1020, a resolution is 1920×1080, a maximum size of a coding unit is 64, and a maximum depth is 3. In video data 1030, a resolution is 352×288, a maximum size of a coding unit is 16, and a maximum depth is 1. The maximum depth shown in FIG. 10 denotes the total number of splits from a largest coding unit to a smallest coding unit.

If a resolution is high or a data amount is large, a maximum size of a coding unit may be large so as to not only increase encoding efficiency but also to accurately reflect characteristics of an image. Accordingly, the maximum size of the coding unit of the video data 1010 and 1020 having a higher resolution than the video data 1030 may be 64.

Since the maximum depth of the video data 1010 is 2, coding units 1015 of the vide data 1010 may include a largest coding unit having a long axis size of 64, and coding units having long axis sizes of 32 and 16 since depths are deepened to two layers by splitting the largest coding unit twice. On the other hand, since the maximum depth of the video data 1030 is 1, coding units 1035 of the video data 1030 may include a largest coding unit having a long axis size of 16, and coding units having a long axis size of 8 since depths are deepened to one layer by splitting the largest coding unit once.

Since the maximum depth of the video data 1020 is 3, coding units 1025 of the video data 1020 may include a largest coding unit having a long axis size of 64, and coding units having long axis sizes of 32, 16, and 8 since the depths are deepened to 3 layers by splitting the largest coding unit three times. As a depth deepens, an expression capability with respect to detailed information may be improved.

Figure 11:
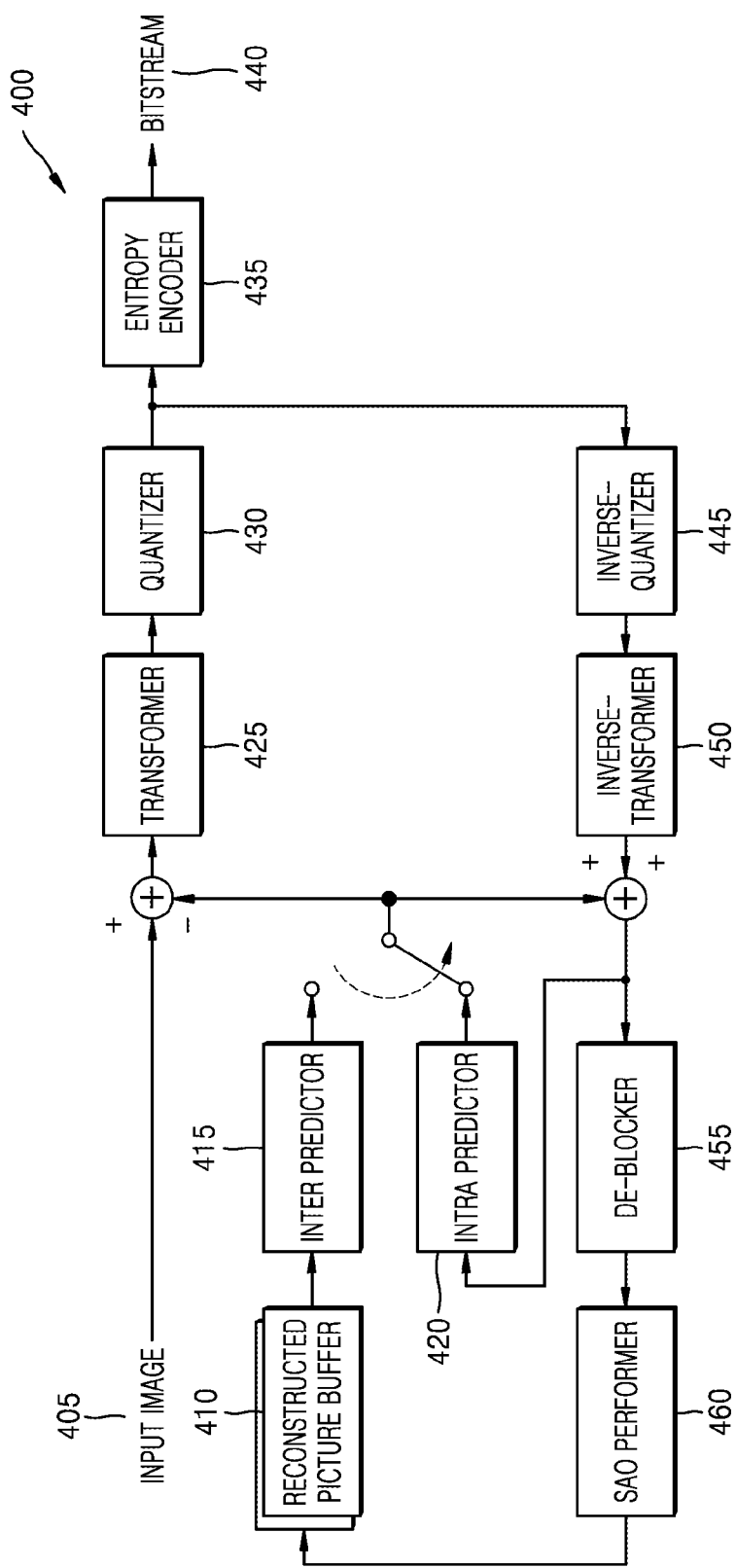
FIG. 11 illustrates a block diagram of an image encoder based on coding units, according to an embodiment.

FIG. 11 illustrates a block diagram of an image encoder 1100 based on coding units, according to an embodiment.

The video encoder 1100 according to the embodiment performs operations necessary for encoding image data in a picture encoder 1520 of the video encoding apparatus 800. That is, an intra predictor 1120 performs intra prediction on coding units in an intra mode according to prediction units, from among a current image 1105, and an inter predictor 1115 performs inter prediction on coding units in an inter mode by using the current image 1105 and a reference image obtained from a reconstructed picture buffer 1110 according to prediction units. The current image 1105 may be split into largest coding units and then the largest coding units may be sequentially encoded. In this regard, encoding may be performed on coding units of a tree structure which are split from the largest coding unit.

Residue data is generated by removing prediction data regarding coding units of each mode that is output from the intra predictor 1120 or the inter predictor 1115 from data regarding encoded coding units of the current image 1105, and the residue data is output as a quantized transformation coefficient according to transformation units via a transformer 1125 and a quantizer 1130. The quantized transformation coefficient is reconstructed as the residue data in a spatial domain via an inverse-quantizer 1145 and an inverse-transformer 1150. The reconstructed residue data in the spatial domain is added to prediction data for coding units of each mode that is output from the intra predictor 1120 or the inter predictor 1115 and thus is reconstructed as data in a spatial domain for coding units of the current image 1105. The reconstructed data in the spatial domain is generated as reconstructed images via a de-blocker 1155 and an SAO performer 1160. The reconstructed images are stored in the reconstructed picture buffer 1110. The reconstructed images stored in the reconstructed picture buffer 1110 may be used as reference images for inter prediction of another image. The transformation coefficient quantized by the transformer 1125 and the quantizer 1130 may be output as a bitstream 1140 via an entropy encoder 1135.

In order for the image encoder 1100 to be applied in the video encoding apparatus 800, all elements of the image encoder 1100, i.e., the inter predictor 1115, the intra predictor 1120, the transformer 1125, the quantizer 1130, the entropy encoder 1135, the inverse-quantizer 1145, the inverse-transformer 1150, the de-blocker 1155, and the SAO performer 1160, perform operations based on each coding unit among coding units having a tree structure according to each largest coding unit.

In particular, the intra predictor 1120 and the inter predictor 1115 may determine a partition mode and a prediction mode of each coding unit from among the coding units having a tree structure by taking into account a maximum size and a maximum depth of a current largest coding unit, and the transformer 1125 may determine whether to split a transformation unit having a quadtree structure in each coding unit from among the coding units having a tree structure.

Figure 12:
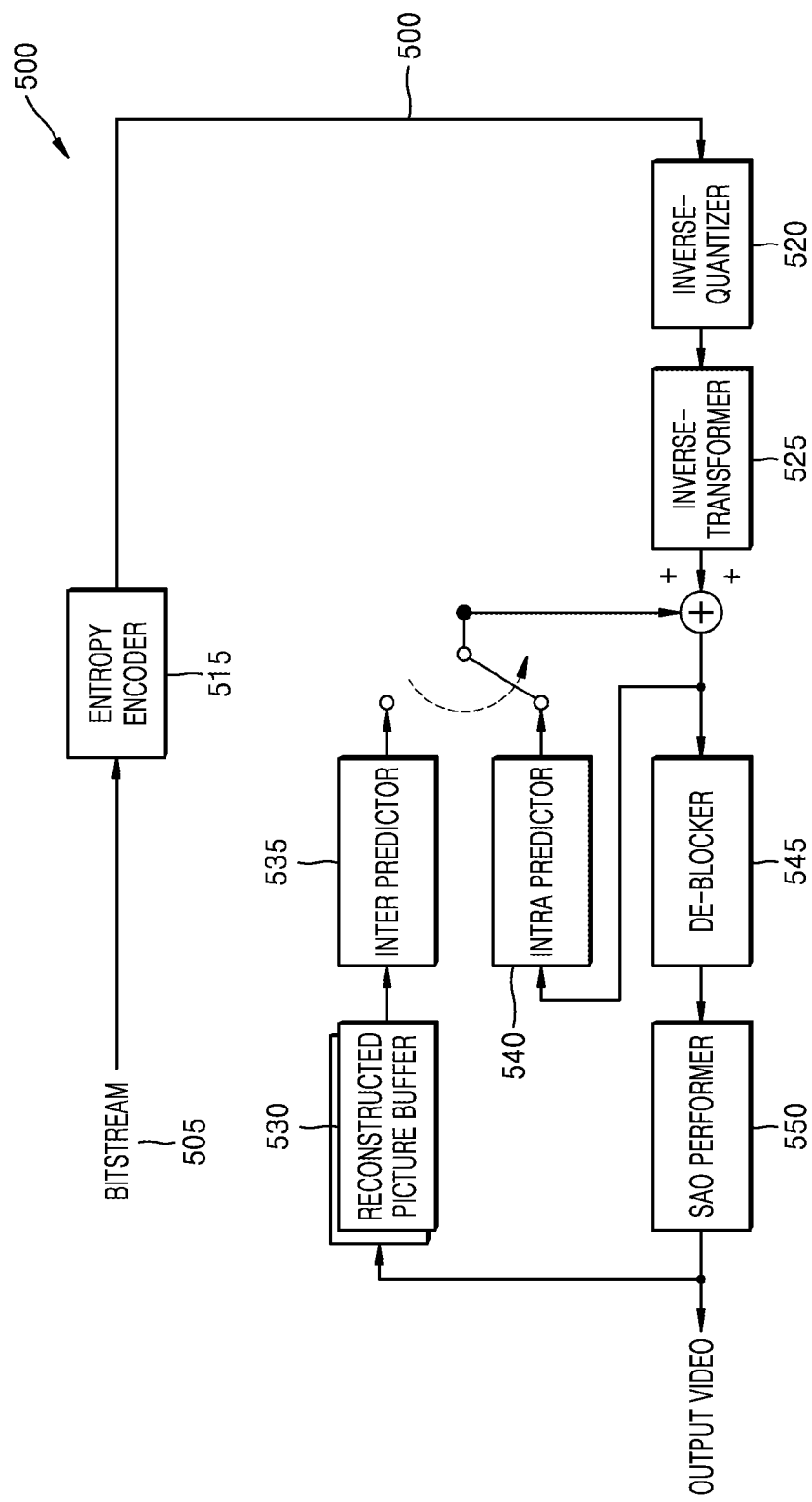
FIG. 12 illustrates a block diagram of an image decoder based on coding units, according to an embodiment.

FIG. 12 illustrates a block diagram of an image decoder 1200 based on coding units, according to an embodiment.

An entropy decoder 1215 parses decoding-target encoded image data and encoding information required for decoding from a bitstream 1205. The encoded image data is a quantized transformation coefficient, and an inverse-quantizer 1220 and an inverse-transformer 1225 reconstructs residue data from the quantized transformation coefficient.

An intra predictor 1240 performs intra prediction on coding units in an intra mode according to each prediction unit. An inter predictor 1235 performs inter prediction on coding units in an inter mode from among a current image for each prediction unit by using a reference image obtained from a reconstructed picture buffer 1230.

Prediction data and residue data regarding coding units of each mode which passed through the intra predictor 1240 or the inter predictor 1235 are summed, and thus data in a spatial domain regarding coding units of the current image 1105 may be reconstructed, and the reconstructed data in the spatial domain may be output as a reconstructed image 1260 via a de-blocker 1245 and an SAO performer 1250. Reconstructed images stored in the reconstructed picture buffer 1230 may be output as reference images.

In order to decode the image data in a picture decoder 930 of the video decoding apparatus 900, operations after the entropy decoder 1215 of the image decoder 1200 according to an embodiment may be performed.

In order for the image decoder 1200 to be applied in the video decoding apparatus 900 according to an embodiment, all elements of the image decoder 1200, i.e., the entropy decoder 1215, the inverse-quantizer 1220, the inverse-transformer 1225, the inter predictor 1240, the inter predictor 1235, the de-blocker 1245, and the SAO performer 1250 may perform operations based on coding units having a tree structure for each largest coding unit.

In particular, the intra predictor 1240 and the inter predictor 1235 may determine a partition mode and a prediction mode for each of the coding units having a tree structure, and the inverse-transformer 1225 may determine whether to split a transformation unit according to a quad tree structure for each of the coding units.

The encoding operation of FIG. 10 and the decoding operation of FIG. 11 describe each of videostream encoding and decoding operations in a single layer, respectively. Thus, if the inter-layer video encoding apparatus 10 of FIG. 1A encodes a video stream of two or more layers, the image encoder 1100 may be provided for each layer. Similarly, if the inter-layer decoding apparatus 20 of FIG. 2A decodes a video stream of two or more layers, the image decoder 1200 may be provided for each layer.

Figure 13:
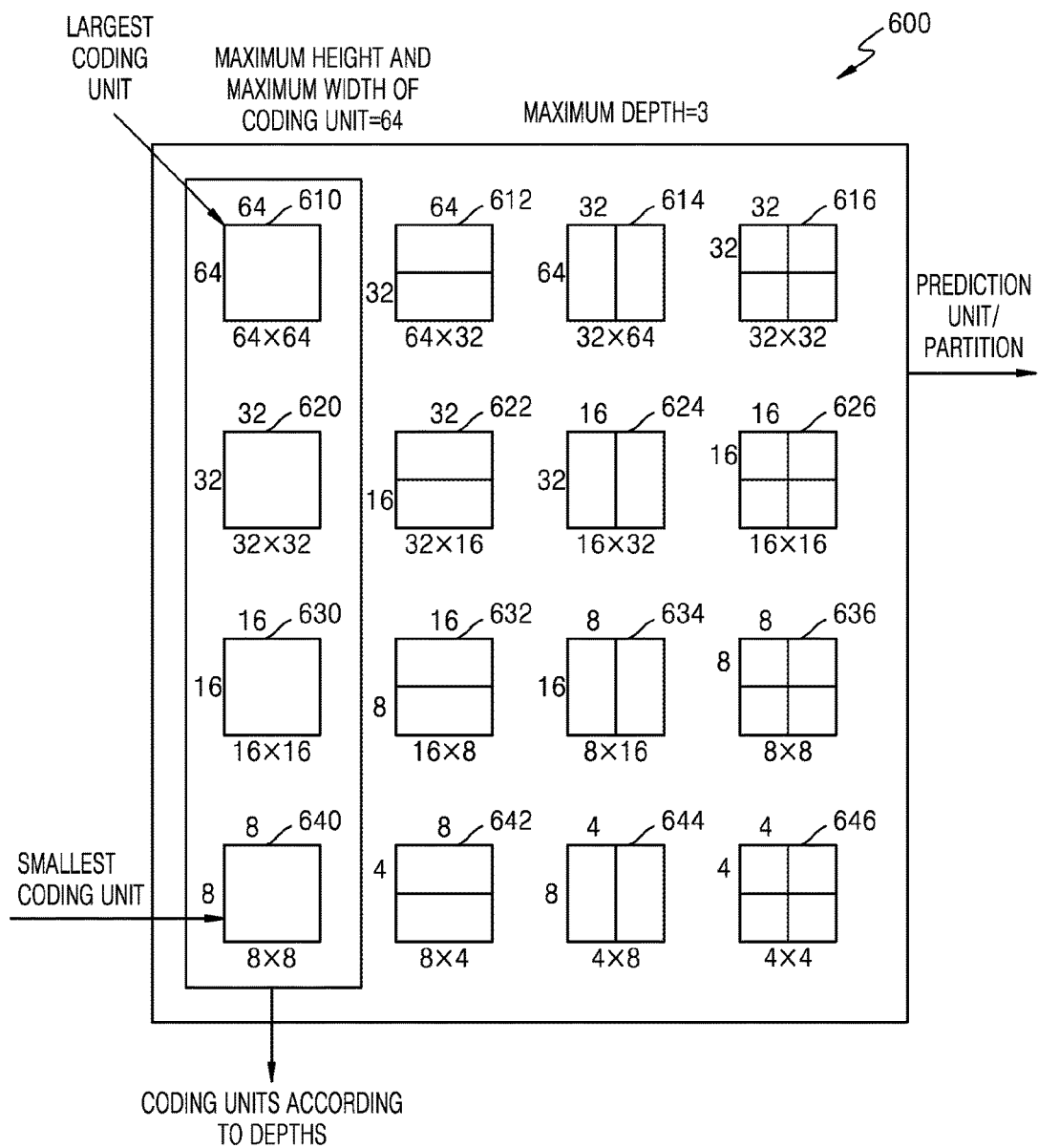
FIG. 13 illustrates deeper coding units according to depths, and partitions, according to an embodiment.

FIG. 13 illustrates deeper coding units according to depths, and partitions, according to an embodiment.

The video encoding apparatus 800 and the video decoding apparatus 900 use hierarchical coding units so as to consider characteristics of an image. A maximum height, a maximum width, and a maximum depth of coding units may be adaptively determined according to the characteristics of the image, or may be variously set according to user requirements. Sizes of deeper coding units according to depths may be determined according to the predetermined maximum size of the coding unit.

In a hierarchical structure of coding units 1300 according to an embodiment, the maximum height and the maximum width of the coding units are each 64, and the maximum depth is 3. In this case, the maximum depth refers to a total number of times the coding unit is split from the largest coding unit to the smallest coding unit. Since a depth deepens along a vertical axis of the hierarchical structure of coding units 1300, a height and a width of the deeper coding unit are each split. Also, a prediction unit and partitions, which are bases for prediction encoding of each deeper coding unit, are shown along a horizontal axis of the hierarchical structure of coding units 1300.

That is, a coding unit 1310 is a largest coding unit in the hierarchical structure of coding units 1300, wherein a depth is 0 and a size, i.e., a height by width, is 64×64. The depth deepens along the vertical axis, and a coding unit 1320 having a size of 32×32 and a depth of 1, a coding unit 1330 having a size of 16×16 and a depth of 2, and a coding unit

1340 having a size of 8×8 and a depth of 3. The coding unit 1340 having the size of 8×8 and the depth of 3 is a smallest coding unit.

The prediction unit and the partitions of a coding unit are arranged along the horizontal axis according to each depth. In other words, if the coding unit 1310 having a size of 64×64 and a depth of 0 is a prediction unit, the prediction unit may be split into partitions include in the coding unit 1310 having the size of 64×64, i.e. a partition 1310 having a size of 64×64, partitions 1312 having the size of 64×32, partitions 1314 having the size of 32×64, or partitions 1316 having the size of 32×32.

Equally, a prediction unit of the coding unit 1320 having the size of 32×32 and the depth of 1 may be split into partitions included in the coding unit 1320 having the size of 32×32, i.e. a partition 1320 having a size of 32×32, partitions 1322 having a size of 32×16, partitions 1324 having a size of 16×32, and partitions 1326 having a size of 16×16.

Equally, a prediction unit of the coding unit 1330 having the size of 16×16 and the depth of 2 may be split into partitions included in the coding unit 1330 having the size of 16×16, i.e. a partition 1330 having a size of 16×16 included in the coding unit 1330, partitions 1332 having a size of 16×8, partitions 1334 having a size of 8×16, and partitions 1336 having a size of 8×8.

Equally, a prediction unit of the coding unit 1340 having the size of 8×8 and the depth of 3 may be split into partitions included in the coding unit 1340 having the size of 8×8, i.e. a partition 1340 having a size of 8×8 included in the coding unit 1340, partitions 1342 having a size of 8×4, partitions 1344 having a size of 4×8, and partitions 1346 having a size of 4×4.

In order to determine a depth of the largest coding unit 1310, the coding unit determiner 820 of the video encoding apparatus 800 has to perform encoding on coding units respectively corresponding to depths included in the largest coding unit 1310.

The number of deeper coding units according to depths including data in the same range and the same size increases as the depth deepens. For example, four coding units corresponding to a depth of 2 are required to cover data that is included in one coding unit corresponding to a depth of 1. Accordingly, in order to compare encoding results of the same data according to depths, the coding unit corresponding to the depth of 1 and four coding units corresponding to the depth of 2 are each encoded.

In order to perform encoding according to each of the depths, a least encoding error that is a representative encoding error of a corresponding depth may be selected by performing encoding on each of prediction units of the coding units according to depths, along the horizontal axis of the hierarchical structure of coding units 1300. Alternatively, the minimum encoding error may be searched for by comparing representative encoding errors according to depths, by performing encoding for each depth as the depth deepens along the vertical axis of the hierarchical structure of coding units 1300. A depth and a partition generating the minimum encoding error in the largest coding unit 1310 may be selected as a depth and a partition mode of the largest coding unit 1310.

Figure 14:
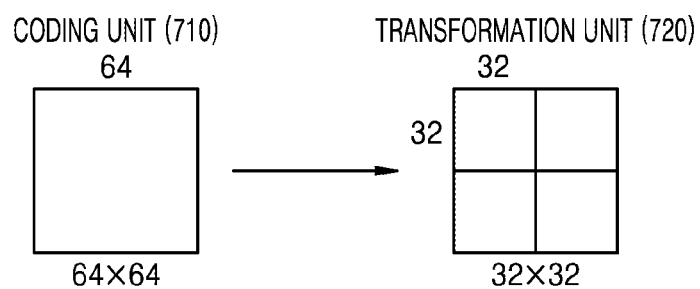
FIG. 14 illustrates a relationship between a coding unit and transformation units, according to an embodiment.

FIG. 14 illustrates a relationship between a coding unit and transformation units, according to an embodiment.

The video encoding apparatus 800 or the video decoding apparatus 900 encodes or decodes an image according to coding units having sizes smaller than or equal to a largest coding unit for each largest coding unit. Sizes of transformation units for transformation during encoding may be selected based on data units that are not larger than a corresponding coding unit.

For example, in the video encoding apparatus 800 or the video decoding apparatus 900, when a size of the coding unit 1410 is 64×64, transformation may be performed by using the transformation units 1420 having a size of 32×32.

Also, data of the coding unit 1410 having the size of 64×64 may be encoded by performing the transformation on each of the transformation units having the size of 32×32, 16×16, 8×8, and 4×4, which are smaller than 64×64, and then a transformation unit having the least coding error with respect to an original image may be selected.

Figure 15:
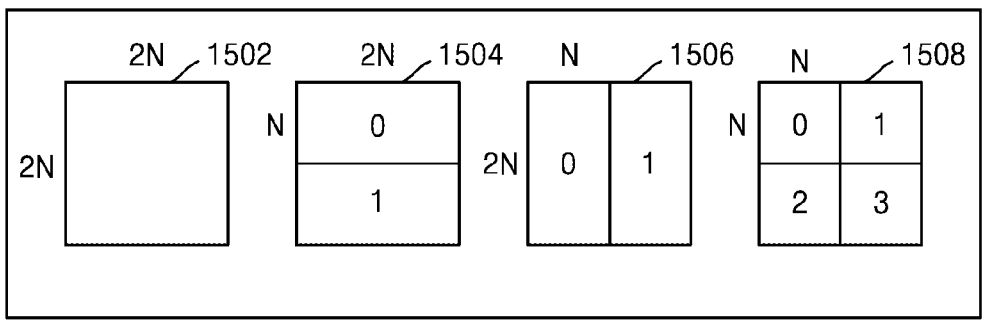
FIG. 15 illustrates a plurality of pieces of encoding information according to depths, according to an embodiment.
Figure 15:
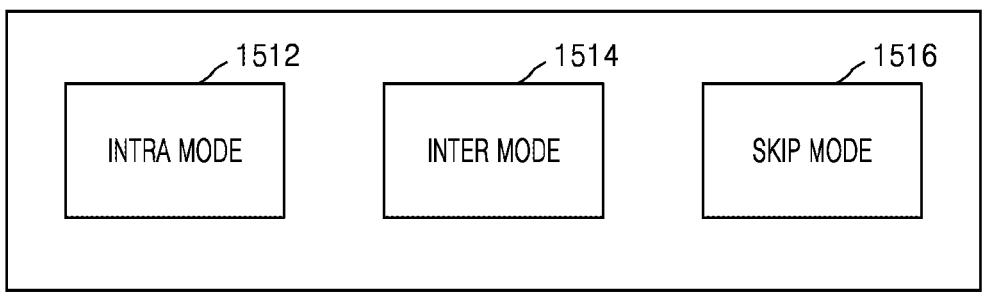
Figure 15:
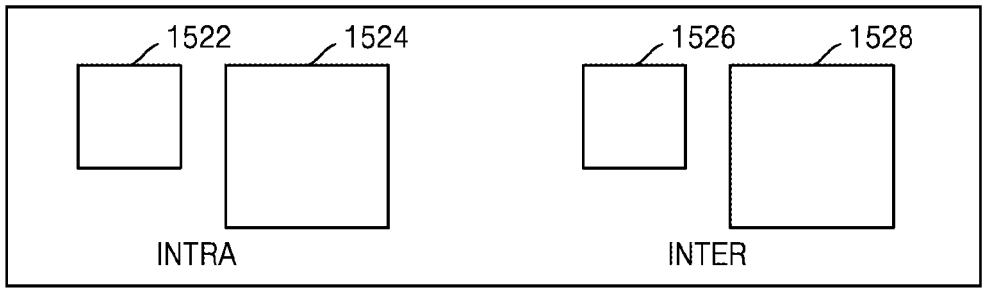

FIG. 15 illustrates a plurality of pieces of encoding information, according to an embodiment.

The output unit 830 of the video encoding apparatus 800 may encode and transmit, as split information, partition mode information 1500, prediction mode information 1510, and transformation unit size information 1520 for each coding unit corresponding to a depth.

The partition mode information 1500 indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 1502 having a size of 2N×2N, a partition 1504 having a size of 2N×N, a partition 1506 having a size of N×2N, and a partition 1508 having a size of N×N. Here, the partition mode information 1500 about a current coding unit is set to indicate one of the partition 1504 having a size of 2N×N, the partition 1506 having a size of N×2N, and the partition 1508 having a size of N×N.

The prediction mode information 1510 indicates a prediction mode of each partition. For example, the prediction mode information 1510 may indicate a mode of prediction encoding performed on a partition indicated by the partition mode information 1500, i.e., an intra mode 1512, an inter mode 1514, or a skip mode 1516.

The transformation unit size information 1520 indicates a transformation unit to be based on when transformation is performed on a current coding unit. For example, the transformation unit may be a first intra transformation unit 1522, a second intra transformation unit 1524, a first inter transformation unit 1526, or a second inter transformation unit 1528.

The image data and encoding information extractor 1610 of the video decoding apparatus 900 may extract and use the partition mode information 1500, the prediction mode information 1510, and the transformation unit size information 1520 for decoding, according to each deeper coding unit.

Figure 16:
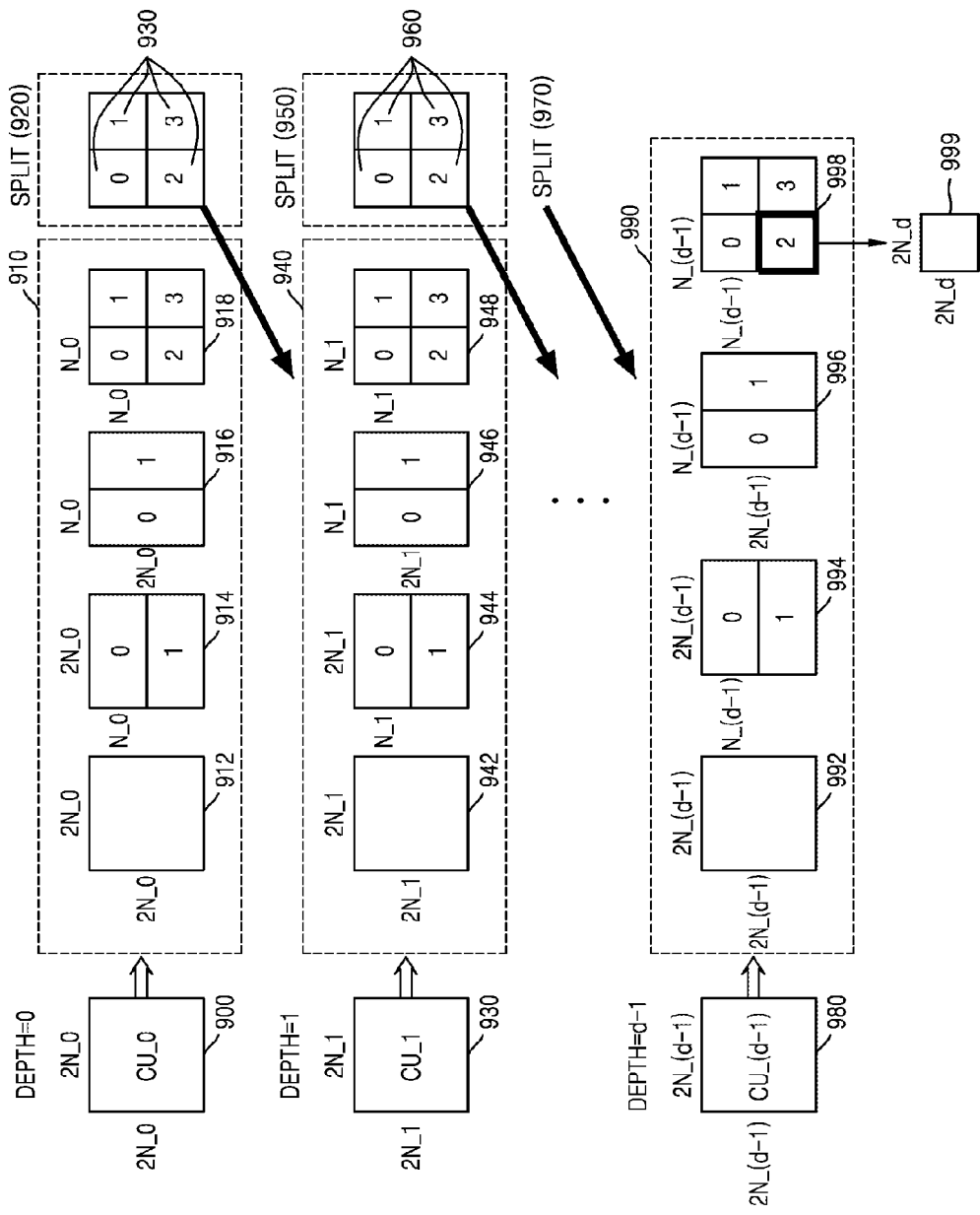
FIG. 16 illustrates deeper coding units according to depths, according to an embodiment.

FIG. 16 illustrates deeper coding units according to depths, according to an embodiment.

Split information may be used to indicate a change in a depth. The spilt information indicates whether a coding unit of a current depth is split into coding units of a lower depth.

A prediction unit 1610 for prediction encoding a coding unit 1600 having a depth of 0 and a size of 2N_0×2N_0 may include partitions of a partition mode 1612 having a size of 2N_0×2N_0, a partition mode 1614 having a size of 2N_0×N_0, a partition mode 1616 having a size of N_0×2N_0, and a partition mode 1618 having a size of N_0×N_0. Only the partition modes 1612, 1614, 1616, and 1618 which are obtained by symmetrically splitting the prediction unit are illustrated, but as described above, a partition mode is not limited thereto and may include asymmetrical partitions, partitions having a predetermined shape, and partitions having a geometrical shape.

According to each partition mode, prediction encoding has to be repeatedly performed on one partition having a size of 2N_0×2N_0, two partitions having a size of 2N_0×N_0, two partitions having a size of N_0×2N_0, and four partitions having a size of N_0×N_0. The prediction encoding in an intra mode and an inter mode may be performed on the partitions having the sizes of 2N_0×2N_0, N_0×2N_0, 2N_0×N_0, and N_0×N_0. The prediction encoding in a skip mode is performed only on the partition having the size of 2N_0×2N_0.

If an encoding error is smallest in one of the partition modes 1612, 1614, and 1616 having the sizes of 2N_0× 2N_0, 2N_0×N_0 and N_0×2N_0, the prediction unit 1610 may not be split into a lower depth.

If the encoding error is the smallest in the partition mode 1618 having the size of N_0×N_0, a depth is changed from 0 to 1 and split is performed (operation 1620), and encoding may be repeatedly performed on coding units 1630 of a partition mode having a depth of 2 and a size of N_0×N_0 so as to search for a minimum encoding error.

A prediction unit 1640 for prediction encoding the coding unit 1630 having a depth of 1 and a size of 2N_1×2N_1 (=N_0×N_0) may include a partition mode 1642 having a size of 2N_1×2N_1, a partition mode 1644 having a size of 2N_1×N_1, a partition mode 1646 having a size of N_1× 2N_1, and a partition mode 1648 having a size of N_1×N_1.

If an encoding error is the smallest in the partition mode 1648 having the size of N_1×N_1, a depth is changed from 1 to 2 and split is performed (in operation 1650), and encoding may be repeatedly performed on coding units 1660 having a depth of 2 and a size of N_2×N_2 so as to search for a minimum encoding error.

When a maximum depth is d, deeper coding units according to depths may be set until when a depth corresponds to d−1, and split information may be set until when a depth corresponds to d−2. In other words, when encoding is performed up to when the depth is d−1 after a coding unit corresponding to a depth of d−2 is split (in operation 1670), a prediction unit 1690 for prediction encoding a coding unit 1680 having a depth of d−1 and a size of 2N_(d−1)×2N_(d−1) may include partitions of a partition mode 1692 having a size of 2N_(d−1)×2N_(d−1), a partition mode 1694 having a size of 2N_(d−1)×N_(d−1), a partition mode 1696 having a size of N_(d−1)×2N_(d−1), and a partition mode 1698 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition modes so as to search for a partition mode having a minimum encoding error.

Even when the partition type 1698 having the size of N_(d−1)×N_(d−1) has the minimum encoding error, since a maximum depth is d, a coding unit CU_(d−1) having a depth of d−1 is no longer split into a lower depth, and a depth for the coding units constituting a current largest coding unit 1600 is determined to be d−1 and a partition mode of the current largest coding unit 1600 may be determined to be N_(d−1)×N_(d−1). Also, since the maximum depth is d, split information for the coding unit 1652 corresponding to a depth of d−1 is not set.

A data unit 1699 may be a 'minimum unit' for the current largest coding unit. A minimum unit according to the embodiment may be a square data unit obtained by splitting a smallest coding unit having a lowermost depth by 4. By performing the encoding repeatedly, the video encoding apparatus 800 according to the embodiment may select a depth having the least encoding error by comparing encoding errors according to depths of the coding unit 1600 to determine a depth, and set a corresponding partition type and a prediction mode as an encoding mode of the depth.

As such, the minimum encoding errors according to depths are compared in all of the depths of 0, 1, . . . , d−1, d, and a depth having the least encoding error may be determined as a depth. The depth, the partition mode of the prediction unit, and the prediction mode may be encoded and transmitted as split information. Also, since a coding unit has to be split from a depth of 0 to a depth, only split information of the depth is set to '0', and split information of depths excluding the depth is set to '1'.

The image data and encoding information extractor 920 of the video decoding apparatus 900 according to the embodiment may extract and use a depth and prediction unit information about the coding unit 1600 so as to decode the coding unit 1612. The video decoding apparatus 900 according to the embodiment may determine a depth, in which split information is '0', as a depth by using split information according to depths, and may use, for decoding, split information about the corresponding depth.

Figure 17:
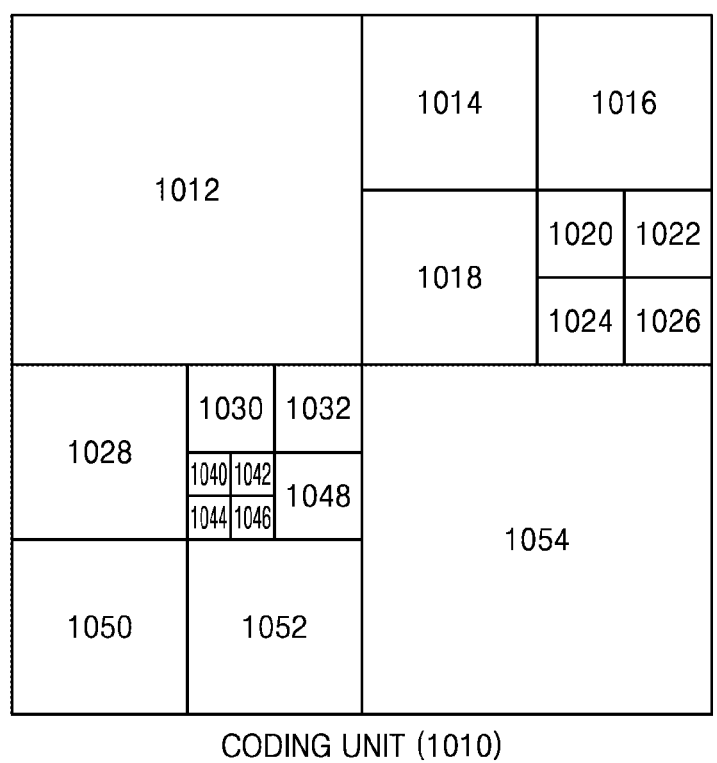
FIGS. 17, 18, and 19 illustrate relationship between coding units, prediction units, and transformation units, according to embodiments.
Figure 18:
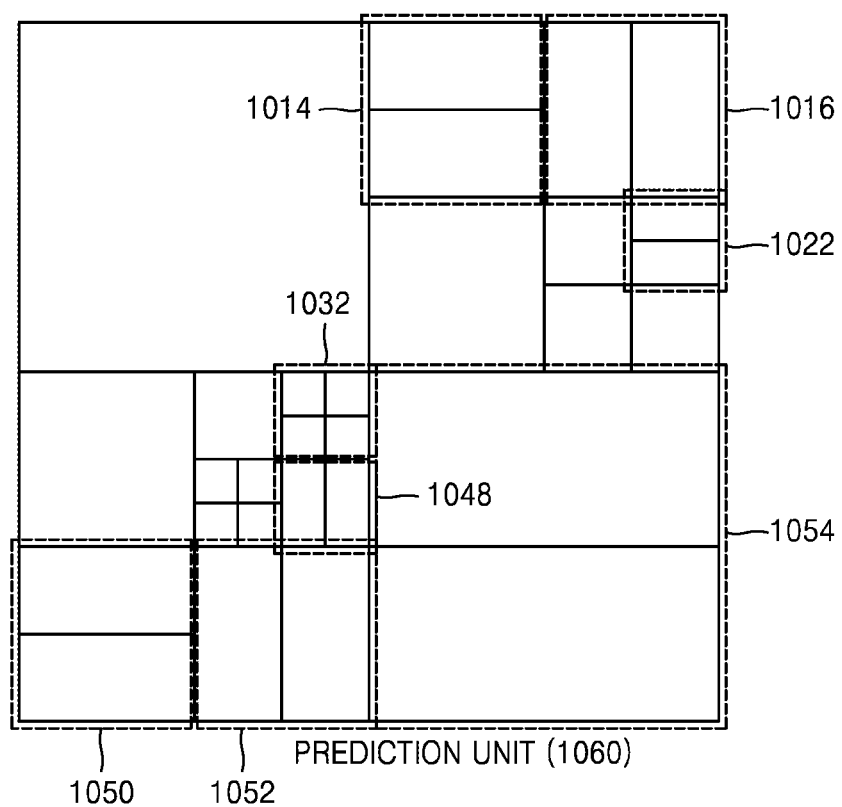
Figure 19:
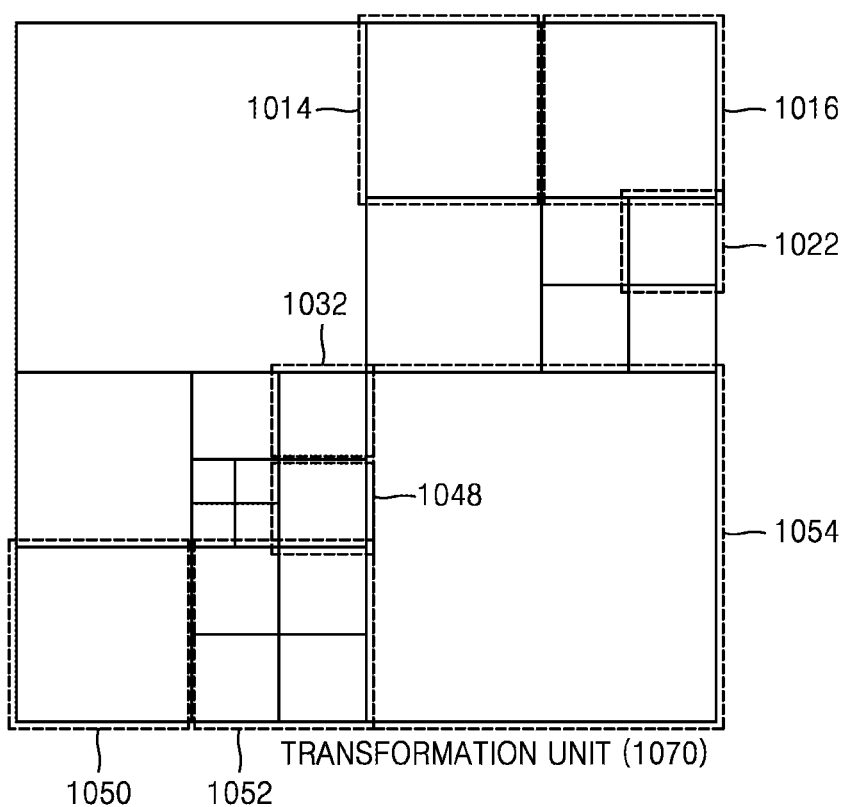

FIGS. 17, 18, and 19 illustrate a relationship between coding units, prediction units, and transformation units, according to an embodiment.

Coding units 1710 are deeper coding units according to depths determined by the video encoding apparatus 800, in a largest coding unit. Prediction units 1760 are partitions of prediction units of each of the coding units 1710 according to depths, and transformation units 1770 are transformation units of each of the coding units according to depths.

When a depth of a largest coding unit is 0 in the deeper coding units 1710, depths of coding units 1712 and 1754 are 1, depths of coding units 1714, 1716, 1718, 1728, 1750, and 1752 are 2, depths of coding units 1720, 1722, 1724, 1726, 1730, 1732, and 1748 are 3, and depths of coding units 1740, 1742, 1744, and 1746 are 4.

Some partitions 1714, 1716, 1722, 1732, 1748, 1750, 1752, and 1754 from among the prediction units 1760 are obtained by splitting the coding unit. That is, partitions 1714, 1722, 1750, and 1754 are a partition mode having a size of 2N×N, partitions 1716, 1748, and 1752 are a partition mode having a size of N×2N, and a partition 1732 is a partition mode having a size of N×N. Prediction units and partitions of the deeper coding units 1710 are smaller than or equal to each coding unit.

Transformation or inverse transformation is performed on image data of the coding unit 1752 in the transformation units 1770 in a data unit that is smaller than the coding unit 1752. Also, the coding units 1714, 1716, 1722, 1732, 1748, 1750, 1752, and 1754 in the transformation units 1760 are data units different from those in the prediction units 1760 in terms of sizes and shapes. That is, the video encoding apparatus 800 and the video decoding apparatus 900 according to the embodiments may perform intra prediction/motion estimation/motion compensation/and transformation/inverse transformation on an individual data unit in the same coding unit.

Accordingly, encoding is recursively performed on each of coding units having a hierarchical structure in each region of a largest coding unit to determine an optimum coding unit, and thus coding units having a recursive tree structure may be obtained. Encoding information may include split information about a coding unit, partition mode information, prediction mode information, and transformation unit size information. Table 2 below shows the encoding information that may be set by the video encoding apparatus 800 and the video decoding apparatus 900 according to the embodiments.

TABLE 2

Split Information 0
(Encoding on Coding Unit having Size of 2Nx2N and Current Depth of d)

| Prediction Mode | Partition Type | | Size of Transformation Unit | | Split Information 1 |
|---|---|---|---|---|---|
| | Symmetrical Partition Type | Asymmetrical Partition Type | Split Information 0 of Transformation Unit | Split Information 1 of Transformation Unit | |
| Intra Inter Skip (Only 2Nx2N) | 2Nx2N 2NxN Nx2N NxN | 2NxnU 2NxnD nLx2N nRx2N | 2Nx2N | NxN (Symmetrical Partition Type) N/2xN/2 (Asymmetrical Partition Type) | Repeatedly Encode Coding Units having Lower Depth of d + 1 |

The output unit 830 of the video encoding apparatus 800 according to the embodiment may output the encoding information about the coding units having a tree structure, and the image data and encoding information extractor 920 of the video decoding apparatus 900 according to the embodiment may extract the encoding information about the coding units having a tree structure from a received bitstream.

Split information specifies whether a current coding unit is split into coding units of a lower depth. If split information of a current depth d is 0, a depth, in which a current coding unit is no longer split into a lower depth, is a depth, and thus partition mode information, prediction mode information, and transformation unit size information may be defined for the depth. If the current coding unit is further split according to the split information, encoding has to be independently performed on four split coding units of a lower depth.

A prediction mode may be one of an intra mode, an inter mode, and a skip mode. The intra mode and the inter mode may be defined in all partition modes, and the skip mode is defined only in a partition mode having a size of 2N×2N.

The partition mode information may indicate symmetrical partition modes having sizes of 2N×2N, 2N×N, N×2N, and N×N, which are obtained by symmetrically splitting a height or a width of a prediction unit, and asymmetrical partition modes having sizes of 2N×nU, 2N×nD, nL×2N, and nR×2N, which are obtained by asymmetrically splitting the height or width of the prediction unit. The asymmetrical partition modes having the sizes of 2N×nU and 2N×nD may be respectively obtained by splitting the height of the prediction unit in 1:3 and 3:1, and the asymmetrical partition modes having the sizes of nL×2N and nR×2N may be respectively obtained by splitting the width of the prediction unit in 1:3 and 3:1.

The size of the transformation unit may be set to be two types in the intra mode and two types in the inter mode. That is, if split information of the transformation unit is 0, the size of the transformation unit may be 2N×2N, which is the size of the current coding unit. If split information of the transformation unit is 1, the transformation units may be obtained by splitting the current coding unit. Also, if a partition mode of the current coding unit having the size of 2N×2N is a symmetrical partition mode, a size of a transformation unit may be N×N, and if the partition mode of the current coding unit is an asymmetrical partition mode, the size of the transformation unit may be N/2×N/2.

The encoding information about coding units having a tree structure according to the embodiment may be assigned to at least one of a coding unit corresponding to a depth, a prediction unit, and a minimum unit. The coding unit corresponding to the depth may include at least one of a prediction unit and a minimum unit containing the same encoding information.

Accordingly, it is determined whether adjacent data units are included in the same coding unit corresponding to the depth by comparing encoding information of the adjacent data units. Also, a corresponding coding unit corresponding to a depth is determined by using encoding information of a data unit, and thus a distribution of depths in a largest coding unit may be inferred.

Accordingly, if a current coding unit is predicted based on encoding information of adjacent data units, encoding information of data units in deeper coding units adjacent to the current coding unit may be directly referred to and used.

In another embodiment, if a current coding unit is predicted based on encoding information of adjacent data units, data units adjacent to the current coding unit may be searched by using encoded information of the data units, and the searched adjacent coding units may be referred for predicting the current coding unit.

Figure 20:
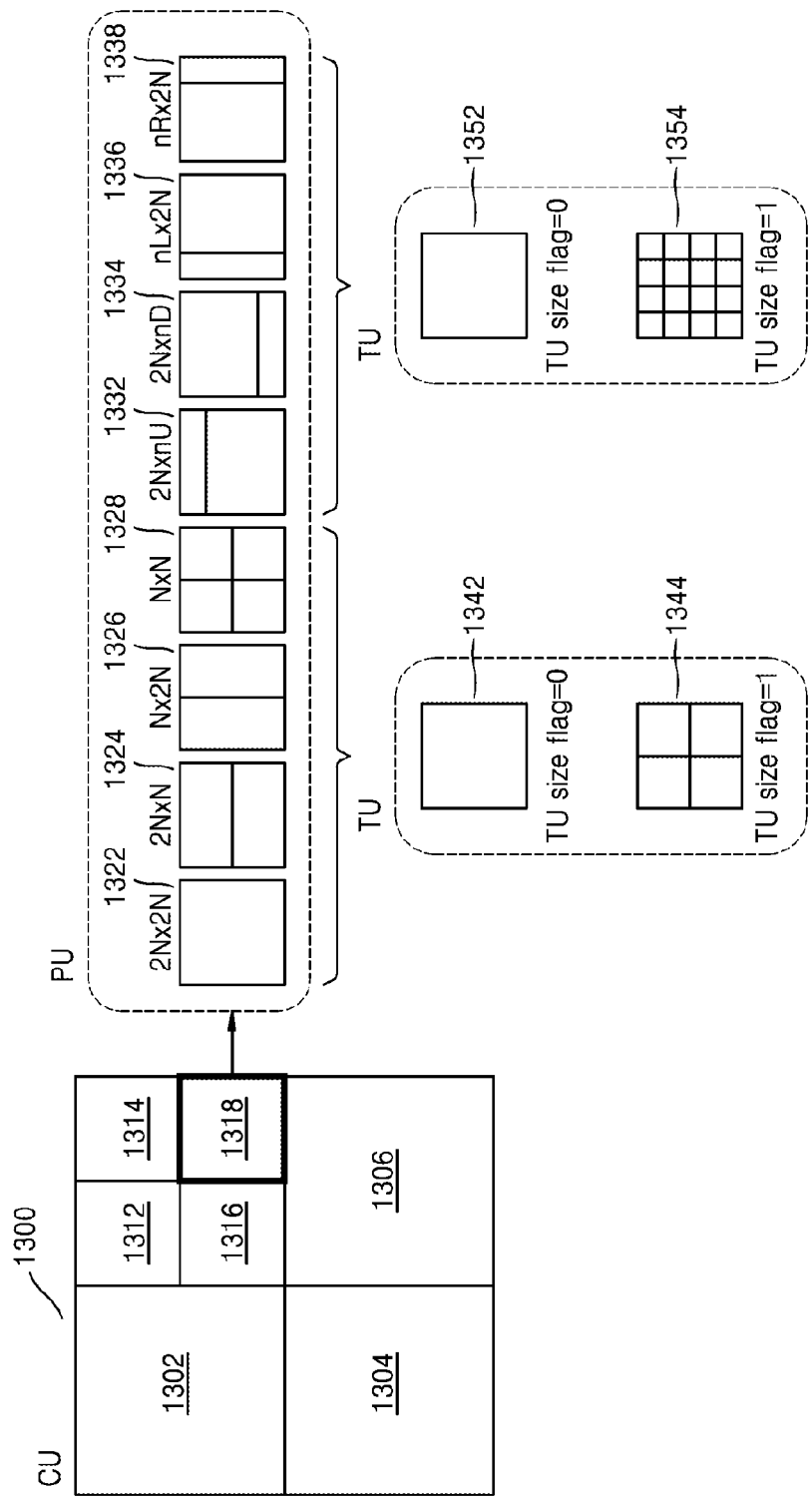
FIG. 20 illustrates a relationship between a coding unit, a prediction unit, and a transformation unit, according to encoding mode information of Table 1.

FIG. 20 illustrates a relationship between a coding unit, a prediction unit, and a transformation unit, according to encoding mode information of Table 1.

A largest coding unit 20300 includes coding units 2002, 2004, 2006, 2012, 2014, 2016, and 2018 of depths. Here, since the coding unit 2018 is a coding unit of a depth, split information may be set to 0. Partition mode information of the coding unit 2018 having a size of 2N×2N may be set to be one of partition modes including 2N×2N 2022, 2N×N 2024, N×2N 2026, N×N 2028, 2N×nU 2032, 2N×nD 2034, nL×2N 2036, and nR×2N 2038.

Transformation unit split information (TU size flag) is a type of a transformation index, and a size of a transformation unit corresponding to the transformation index may be changed according to a prediction unit type or partition mode of the coding unit.

For example, when the partition mode information is set to be one of symmetrical partition modes 2N×2N 2022, 2N×N 2024, N×2N 2026, and N×N 2028, if the transformation unit split information is 0, a transformation unit 2042 having a size of 2N×2N is set, and if the transformation unit split information is 1, a transformation unit 2044 having a size of N×N may be set.

When the partition mode information is set to be one of asymmetrical partition modes 2N×nU 2032, 2N×nD 2034, nL×2N 2036, and nR×2N 2038, if the transformation unit split information (TU size flag) is 0, a transformation unit 2052 having a size of 2N×2N may be set, and if the transformation unit split information is 1, a transformation unit 2054 having a size of N/2×N/2 may be set.

The transformation unit split information (TU size flag) described above with reference to FIG. 19 is a flag having a value or 0 or 1, but the transformation unit split information according to an embodiment is not limited to a flag having 1 bit, and the transformation unit may be hierarchically split while the transformation unit split information increases in a manner of 0, 1, 2, 3 . . . etc., according to setting. The transformation unit split information may be an example of the transformation index.

In this case, the size of a transformation unit that has been actually used may be expressed by using the transformation unit split information according to the embodiment, together with a maximum size of the transformation unit and a minimum size of the transformation unit. The video encoding apparatus 800 according to the embodiment may encode maximum transformation unit size information, minimum transformation unit size information, and maximum transformation unit split information. The result of encoding the maximum transformation unit size information, the minimum transformation unit size information, and the maximum transformation unit split information may be inserted into an SPS. The video decoding apparatus 900 according to the embodiment may decode video by using the maximum transformation unit size information, the minimum transformation unit size information, and the maximum transformation unit split information.

For example, (a) if the size of a current coding unit is 64×64 and a maximum transformation unit size is 32×32, (a-1) then the size of a transformation unit may be 32×32 when a TU size flag is 0, (a-2) may be 16×16 when the TU size flag is 1, and (a-3) may be 8×8 when the TU size flag is 2.

As another example, (b) if the size of the current coding unit is 32×32 and a minimum transformation unit size is 32×32, (b-1) then the size of the transformation unit may be 32×32 when the TU size flag is 0. Here, the TU size flag cannot be set to a value other than 0, since the size of the transformation unit cannot be less than 32×32.

As another example, (c) if the size of the current coding unit is 64×64 and a maximum TU size flag is 1, then the TU size flag may be 0 or 1. Here, the TU size flag cannot be set to a value other than 0 or 1.

Thus, if it is defined that the maximum TU size flag is 'MaxTransformSizeIndex', a minimum transformation unit size is 'MinTransformSize', and a transformation unit size is 'RootTuSize' when the TU size flag is 0, then a current minimum transformation unit size 'CurrMinTuSize' that can be determined in a current coding unit may be defined by Equation (1):

$$\text{CurrMinTuSize}=\max(\text{MinTransformSize},\text{RootTuSize}/(2^\wedge\text{MaxTransformSizeIndex})) \quad (1)$$

Compared to the current minimum transformation unit size 'CurrMinTuSize' that can be determined in the current coding unit, a transformation unit size 'RootTuSize' when the TU size flag is 0 may denote a maximum transformation unit size that can be selected in the system. That is, in Equation (1), 'RootTuSize/(2^MaxTransformSizeIndex)' denotes a transformation unit size when the transformation unit size 'RootTuSize', when the TU size flag is 0, is split by the number of times corresponding to the maximum TU size flag, and 'MinTransformSize' denotes a minimum transformation size. Thus, a smaller value from among 'RootTuSize/(2^MaxTransformSizeIndex)' and 'MinTransformSize' may be the current minimum transformation unit size 'CurrMinTuSize' that can be determined in the current coding unit.

According to an embodiment, the maximum transformation unit size RootTuSize may vary according to the type of a prediction mode.

For example, if a current prediction mode is an inter mode, then 'RootTuSize' may be determined by using Equation (2) below. In Equation (2), 'MaxTransformSize' denotes a maximum transformation unit size, and 'PUSize' denotes a current prediction unit size.

$$\text{RootTuSize}=\min(\text{MaxTransformSize},\text{PUSize}) \quad (2)$$

That is, if the current prediction mode is the inter mode, the transformation unit size 'RootTuSize', when the TU size flag is 0, may be a smaller value from among the maximum transformation unit size and the current prediction unit size.

If a prediction mode of a current partition unit is an intra mode, 'RootTuSize' may be determined by using Equation (3) below. In Equation (3), 'PartitionSize' denotes the size of the current partition unit.

$$\text{RootTuSize}=\min(\text{MaxTransformSize},\text{PartitionSize}) \quad (3)$$

That is, if the current prediction mode is the intra mode, the transformation unit size 'RootTuSize' when the TU size flag is 0 may be a smaller value from among the maximum transformation unit size and the size of the current partition unit.

However, the current maximum transformation unit size 'RootTuSize' that varies according to the type of a prediction mode in a partition unit is just an embodiment, and a factor for determining the current maximum transformation unit size is not limited thereto.

According to the video encoding method based on coding units of a tree structure described above with reference to FIGS. 8 through 20, image data of a spatial domain is encoded in each of the coding units of the tree structure, and the image data of the spatial domain is reconstructed in a manner that decoding is performed on each largest coding unit according to the video decoding method based on the coding units of the tree structure, so that a video that is formed of pictures and pictures sequences may be reconstructed. The reconstructed video may be reproduced by a reproducing apparatus, may be stored in a storage medium, or may be transmitted via a network.

The one or more embodiments may be written as computer programs and may be implemented in general-use digital computers that execute the programs by using a computer-readable recording medium. Examples of the computer-readable recording medium include magnetic storage media (e.g., ROM, floppy disks, hard disks, etc.), optical recording media (e.g., CD-ROMs, or DVDs), etc.

For convenience of description, the inter-layer video encoding methods and/or the video encoding method, which are described with reference to FIGS. 1A through 20, will be collectively referred to as 'the video encoding method'. Also, the inter-layer video decoding methods and/or the video decoding method, which are described with reference to FIGS. 1A through 20, will be collectively referred to as 'the video decoding method'.

Also, a video encoding apparatus including the video encoding apparatus, the video encoding apparatus 800, or the image encoder 1100 which are described with reference to FIGS. 1A through 20 will be collectively referred to as a 'video encoding apparatus'. Also, a video decoding apparatus including the inter-layer video decoding apparatus, the video decoding apparatus 900, or the image decoder 1200 which are described with reference to FIGS. 1A through 20 will be collectively referred to as a 'video decoding apparatus'.

A computer-readable recording medium storing a program, e.g., a disc 26000, according to an embodiment will now be described in detail.

Figure 21:
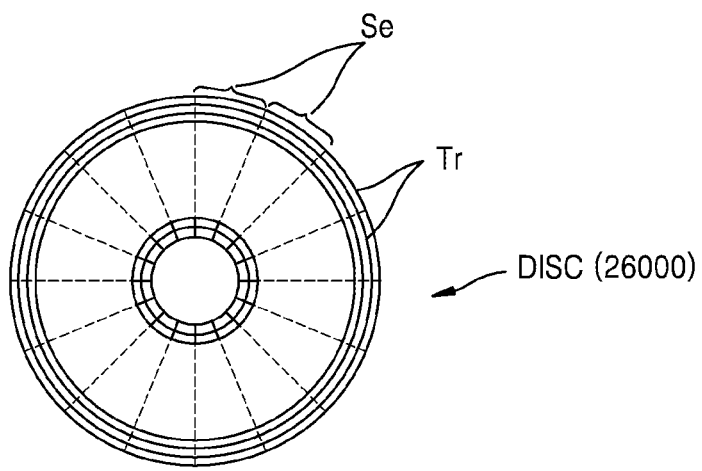
FIG. 21 illustrates a physical structure of a disc in which a program is stored, according to various embodiments.

FIG. 21 illustrates a diagram of a physical structure of the disc 26000 in which a program is stored, according to an embodiment. The disc 26000, which is a storage medium, may be a hard drive, a compact disc-read only memory (CD-ROM) disc, a Blu-ray disc, or a digital versatile disc (DVD). The disc 26000 includes a plurality of concentric tracks Tr that are each divided into a specific number of sectors Se in a circumferential direction of the disc 26000. In a specific region of the disc 26000, a program that executes the quantized parameter determining method, the video encoding method, and the video decoding method described above may be assigned and stored.

A computer system embodied using a storage medium that stores a program for executing the video encoding method and the video decoding method as described above will now be described with reference to FIG. 22.

Figure 22:
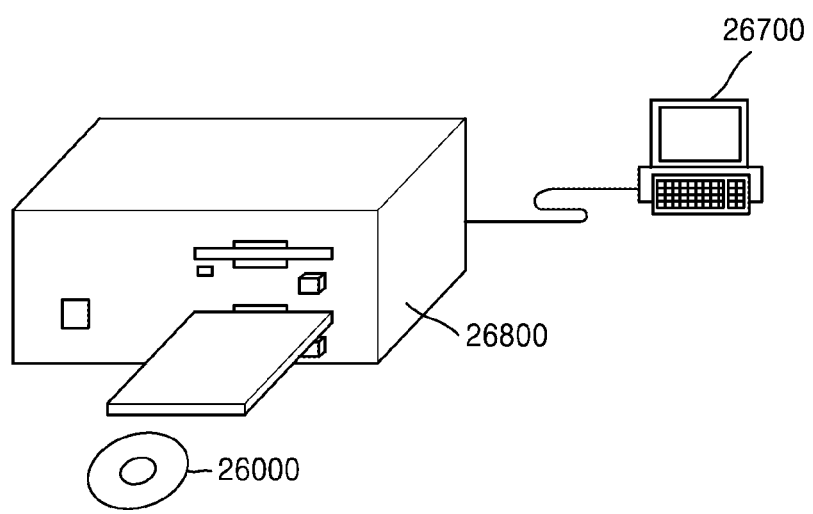
FIG. 22 illustrates a disc drive for recording and reading a program by using the disc.

FIG. 22 illustrates a diagram of a disc drive 26800 for recording and reading a program by using the disc 26000. A computer system 26700 may store a program that executes at least one selected from a video encoding method and a video decoding method according to an embodiment, in the disc 26000 via the disc drive 26800. In order to run the program stored in the disc 26000 in the computer system 26700, the program may be read from the disc 26000 and be transmitted to the computer system 26700 by using the disc drive 26800.

The program that executes at least one of a video encoding method and a video decoding method according to an embodiment may be stored not only in the disc 26000 illustrated in FIGS. 21 and 22 but also may be stored in a memory card, a ROM cassette, or a solid state drive (SSD).

A system to which the video encoding method and the video decoding method described above are applied will be described below.

Figure 23:
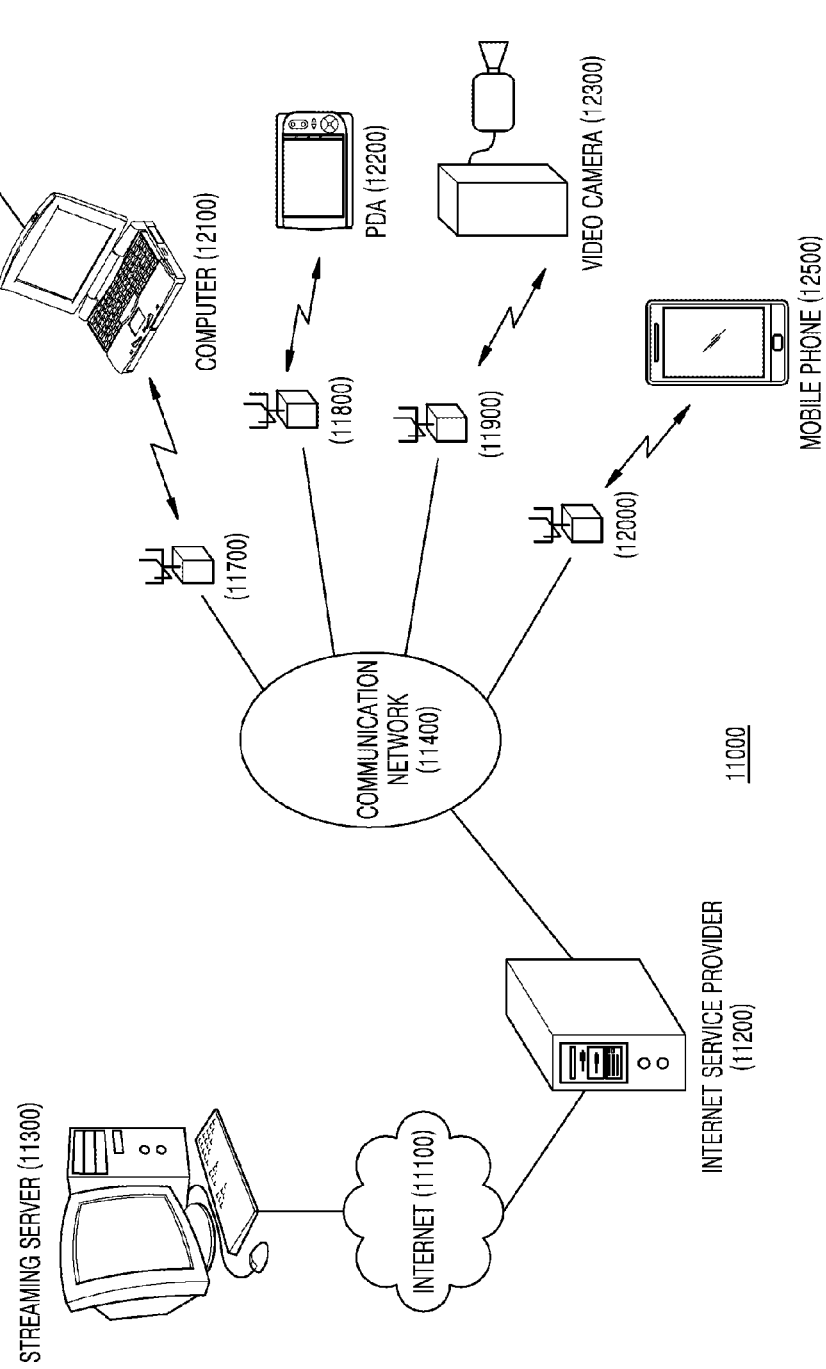
FIG. 23 illustrates an overall structure of a content supply system for providing a content distribution service.

FIG. 23 illustrates a diagram of an overall structure of a content supply system 11000 for providing a content distribution service. A service area of a communication system is divided into predetermined-sized cells, and wireless base stations 11700, 11800, 11900, and 12000 are installed in these cells, respectively.

The content supply system 11000 includes a plurality of independent devices. For example, the plurality of independent devices, such as a computer 12100, a personal digital assistant (PDA) 12200, a video camera 12300, and a mobile phone 12500, are connected to the Internet 11100 via an internet service provider 11200, a communication network 11400, and the wireless base stations 11700, 11800, 11900, and 12000.

However, the content supply system 11000 is not limited to as illustrated in FIG. 23, and devices may be selectively connected thereto. The plurality of independent devices may be directly connected to the communication network 11400, not via the wireless base stations 11700, 11800, 11900, and 12000.

The video camera 12300 is an imaging device, e.g., a digital video camera, which is capable of capturing video images. The mobile phone 12500 may employ at least one communication method from among various protocols, e.g., Personal Digital Communications (PDC), Code Division Multiple Access (CDMA), Wideband-Code Division Multiple Access (W-CDMA), Global System for Mobile Communications (GSM), and Personal Handyphone System (PHS).

The video camera 12300 may be connected to a streaming server 11300 via the wireless base station 11900 and the communication network 11400. The streaming server 11300 allows content received from a user via the video camera 12300 to be streamed via a real-time broadcast. The content received from the video camera 12300 may be encoded by the video camera 12300 or the streaming server 11300. Video data captured by the video camera 12300 may be transmitted to the streaming server 11300 via the computer 12100.

Video data captured by a camera 12600 may also be transmitted to the streaming server 11300 via the computer 12100. The camera 12600 is an imaging device capable of capturing both still images and video images, similar to a digital camera. The video data captured by the camera 12600 may be encoded using the camera 12600 or the computer 12100. Software that performs encoding and decoding video may be stored in a computer-readable recording medium, e.g., a CD-ROM disc, a floppy disc, a hard disc drive, an SSD, or a memory card, which may be accessible by the computer 12100.

If video data is captured by a camera built in the mobile phone 12500, the video data may be received from the mobile phone 12500.

The video data may also be encoded by a large scale integrated circuit (LSI) system installed in the video camera 12300, the mobile phone 12500, or the camera 12600.

The content supply system 11000 may encode content data recorded by a user using the video camera 12300, the camera 12600, the mobile phone 12500, or another imaging device, e.g., content recorded during a concert, and transmit the encoded content data to the streaming server 11300. The streaming server 11300 may transmit the encoded content data in a type of a streaming content to other clients that request the content data.

The clients are devices capable of decoding the encoded content data, e.g., the computer 12100, the PDA 12200, the video camera 12300, or the mobile phone 12500. Thus, the content supply system 11000 allows the clients to receive and reproduce the encoded content data. Also, the content supply system 11000 allows the clients to receive the encoded content data and decode and reproduce the encoded content data in real time, thereby enabling personal broadcasting.

Encoding and decoding operations of the plurality of independent devices included in the content supply system 11000 may be similar to those of a video encoding apparatus and a video decoding apparatus according to embodiments.

Figure 24:
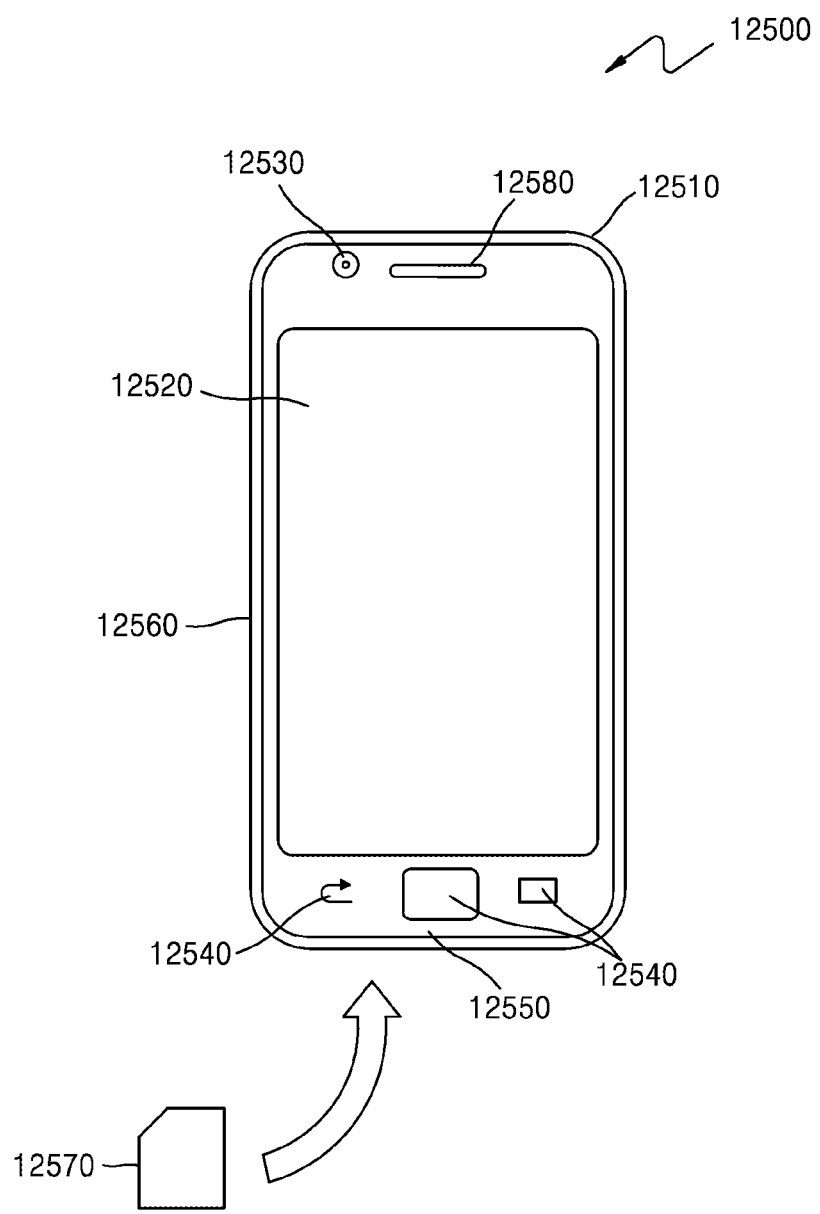
FIGS. 24 and 25 illustrate external and internal structures of a mobile phone to which a video encoding method and a video decoding method are applied, according to embodiments.
Figure 25:
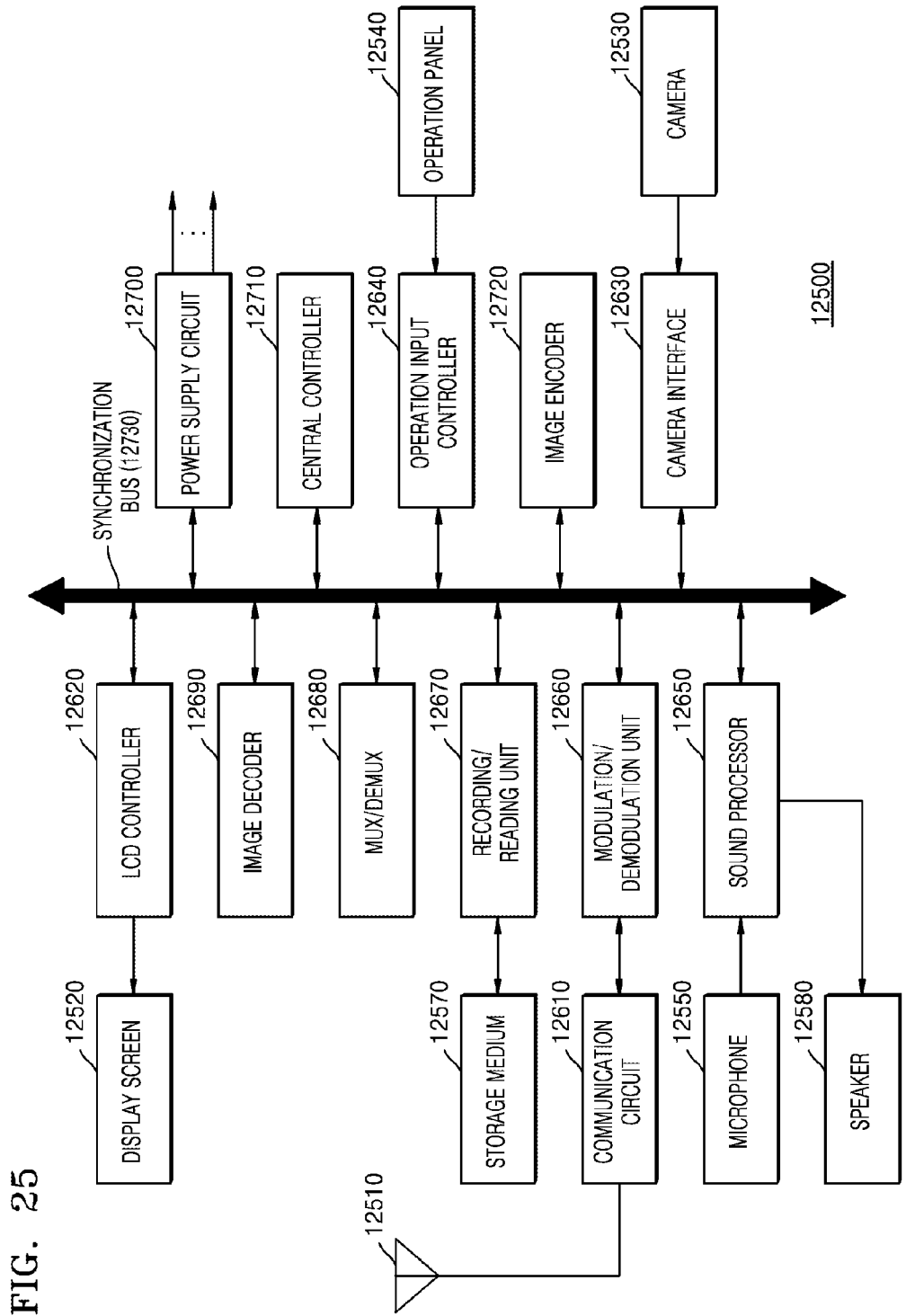

With reference to FIGS. 24 and 25, the mobile phone 12500 included in the content supply system 11000 according to an embodiment will now be described in detail.

FIG. 24 illustrates an external structure of the mobile phone 12500 to which a video encoding method and a video decoding method are applied, according to an embodiment. The mobile phone 12500 may be a smart phone, the functions of which are not limited and a large number of the functions of which may be changed or expanded.

The mobile phone 12500 includes an internal antenna 12510 via which a radio-frequency (RF) signal may be exchanged with the wireless base station 12000, and includes a display screen 12520 for displaying images captured by a camera 12530 or images that are received via the antenna 12510 and decoded, e.g., a liquid crystal display (LCD) or an organic light-emitting diode (OLED) screen. The mobile phone 12500 includes an operation panel 12540 including a control button and a touch panel. If the display screen 12520 is a touch screen, the operation panel 12540 further includes a touch sensing panel of the display screen 12520. The mobile phone 12500 includes a speaker 12580 for outputting voice and sound or another type of a sound output unit, and a microphone 12550 for inputting voice and sound or another type of a sound input unit. The mobile phone 12500 further includes the camera 12530, such as a charge-coupled device (CCD) camera, to capture video and still images. The mobile phone 12500 may further include a storage medium 12570 for storing encoded/decoded data, e.g., video or still images captured by the camera 12530, received via email, or obtained according to various ways; and a slot 12560 via which the storage medium 12570 is loaded into the mobile phone 12500. The storage medium 12570 may be a flash memory, e.g., a secure digital (SD) card or an electrically erasable and programmable read only memory (EEPROM) included in a plastic case.

FIG. 25 illustrates an internal structure of the mobile phone 12500. In order to systemically control parts of the mobile phone 12500 including the display screen 12520 and the operation panel 12540, a power supply circuit 12700, an operation input controller 12640, an image encoder 12720, a camera interface 12630, an LCD controller 12620, an image decoder 12690, a multiplexer/demultiplexer 12680, a recording/reading unit 12670, a modulation/demodulation unit 12660, and a sound processor 12650 are connected to a central controller 12710 via a synchronization bus 12730.

If a user operates a power button and sets from a 'power off' state to a 'power on' state, the power supply circuit 12700 supplies power to all the parts of the mobile phone 12500 from a battery pack, thereby setting the mobile phone 12500 to an operation mode.

The central controller 12710 includes a central processing unit (CPU), a read-only memory (ROM), and a random access memory (RAM).

While the mobile phone 12500 transmits communication data to the outside, a digital signal is generated by the mobile phone 12500 under control of the central controller 12710. For example, the sound processor 12650 may generate a digital sound signal, the video encoder 12720 may generate a digital image signal, and text data of a message may be generated via the operation panel 12540 and the operation input controller 12640. When a digital signal is transmitted to the modulation/demodulation unit 12660 by control of the central controller 12710, the modulation/demodulation unit 12660 modulates a frequency band of the digital signal, and a communication circuit 12610 performs digital-to-analog conversion (DAC) and frequency conversion on the frequency band-modulated digital sound signal. A transmission signal output from the communication circuit 12610 may be transmitted to a voice communication base station or the wireless base station 12000 via the antenna 12510.

For example, when the mobile phone 12500 is in a conversation mode, a sound signal obtained via the microphone 12550 is transformed into a digital sound signal by the sound processor 12650, by control of the central controller 12710. The digital sound signal may be transformed into a transformation signal via the modulation/demodulation unit 12660 and the communication circuit 12610, and may be transmitted via the antenna 12510.

When a text message, e.g., email, is transmitted during a data communication mode, text data of the text message is input via the operation panel 12540 and is transmitted to the central controller 12610 via the operation input controller 12640. By control of the central controller 12610, the text data is transformed into a transmission signal via the modulation/demodulation unit 12660 and the communication circuit 12610 and is transmitted to the wireless base station 12000 via the antenna 12510.

In order to transmit image data during the data communication mode, image data captured by the camera 12530 is provided to the image encoder 12720 via the camera interface 12630. The captured image data may be directly displayed on the display screen 12520 via the camera interface 12630 and the LCD controller 12620.

A structure of the image encoder 12720 may correspond to that of the video encoding apparatus 100 described above. The image encoder 12720 may transform the image data received from the camera 12530 into compressed and encoded image data according to the aforementioned video encoding method, and then output the encoded image data to the multiplexer/demultiplexer 12680. During a recording operation of the camera 12530, a sound signal obtained by the microphone 12550 of the mobile phone 12500 may be transformed into digital sound data via the sound processor 12650, and the digital sound data may be transmitted to the multiplexer/demultiplexer 12680.

The multiplexer/demultiplexer 12680 multiplexes the encoded image data received from the image encoder 12720, together with the sound data received from the sound processor 12650. A result of multiplexing the data may be transformed into a transmission signal via the modulation/demodulation unit 12660 and the communication circuit 12610, and may then be transmitted via the antenna 12510.

While the mobile phone 12500 receives communication data from the outside, frequency recovery and analog-to-digital conversion (ADC) are performed on a signal received via the antenna 12510 to transform the signal into a digital signal. The modulation/demodulation unit 12660 modulates a frequency band of the digital signal. The frequency-band modulated digital signal is transmitted to the video decoder 12690, the sound processor 12650, or the LCD controller 12620, according to the type of the digital signal.

During the conversation mode, the mobile phone 12500 amplifies a signal received via the antenna 12510, and obtains a digital sound signal by performing frequency conversion and ADC on the amplified signal. A received digital sound signal is transformed into an analog sound signal via the modulation/demodulation unit 12660 and the sound processor 12650, and the analog sound signal is output via the speaker 12580, by control of the central controller 12710.

When during the data communication mode, data of a video file accessed at an Internet website is received, a signal received from the wireless base station 12000 via the antenna 12510 is output as multiplexed data via the modulation/demodulation unit 12660, and the multiplexed data is transmitted to the multiplexer/demultiplexer 12680.

In order to decode the multiplexed data received via the antenna 12510, the multiplexer/demultiplexer 12680 demultiplexes the multiplexed data into an encoded video data stream and an encoded audio data stream. Via the synchronization bus 12730, the encoded video data stream and the encoded audio data stream are provided to the video decoder 12690 and the sound processor 12650, respectively.

A structure of the image decoder 12690 may correspond to that of the video decoding apparatus described above. The image decoder 12690 may decode the encoded video data to obtain reconstructed video data and provide the reconstructed video data to the display screen 12520 via the LCD controller 12620, by using the aforementioned video decoding method according to the embodiment.

Thus, the data of the video file accessed at the Internet website may be displayed on the display screen 12520. At the same time, the sound processor 12650 may transform audio data into an analog sound signal, and provide the analog sound signal to the speaker 12580. Thus, audio data contained in the video file accessed at the Internet website may also be reproduced via the speaker 12580.

The mobile phone 12500 or another type of communication terminal may be a transceiving terminal including both a video encoding apparatus and a video decoding apparatus according to an embodiment, may be a transmitting terminal including only the video encoding apparatus, or may be a receiving terminal including only the video decoding apparatus.

Figure 26:
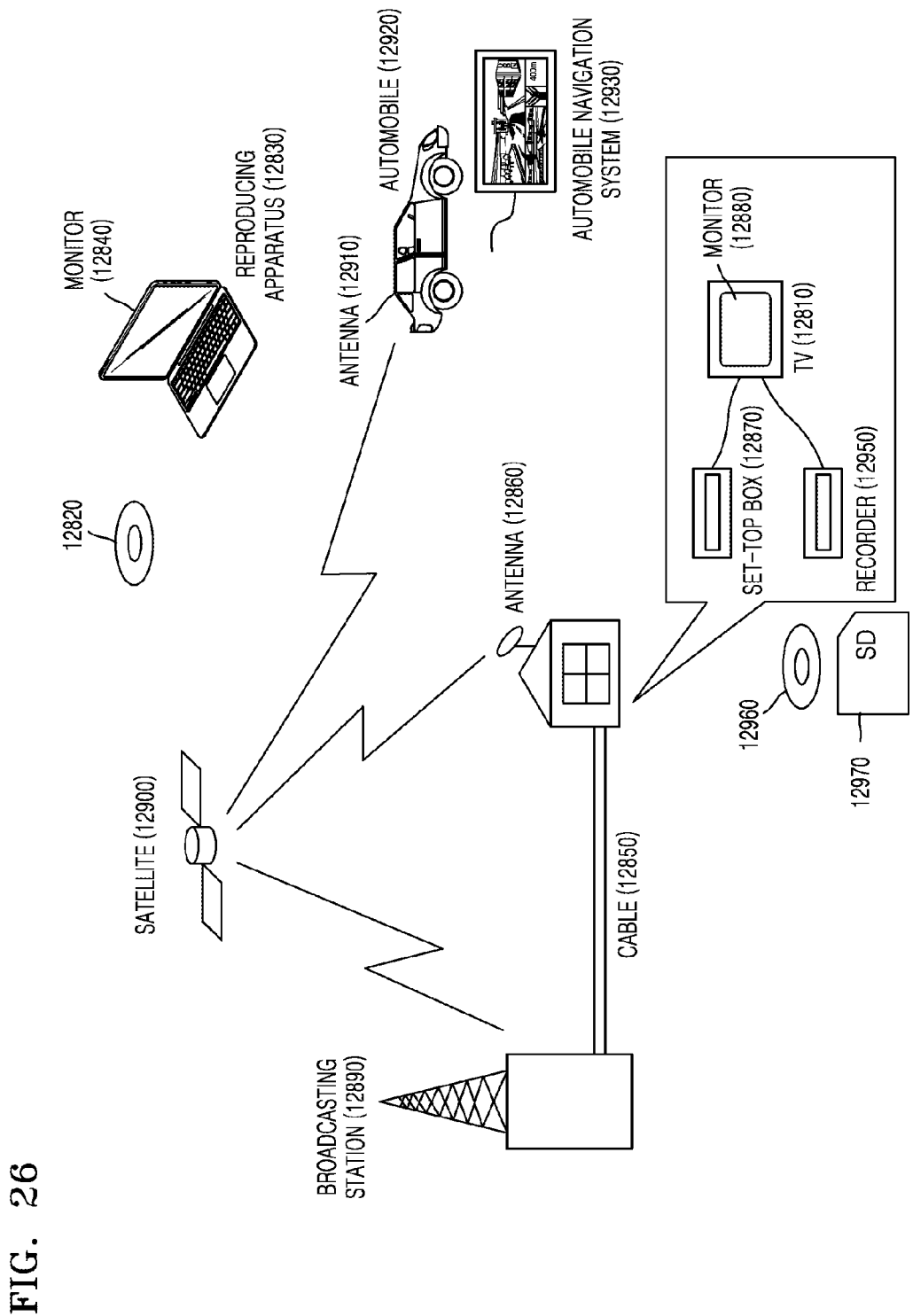
FIG. 26 illustrates a digital broadcasting system employing a communication system according to an embodiment.

A communication system according to an embodiment is not limited to the communication system described above with reference to FIG. 24. For example, FIG. 26 illustrates a digital broadcasting system employing a communication system, according to an embodiment. The digital broadcasting system of FIG. 26 may receive a digital broadcast transmitted via a satellite or a terrestrial network by using the video encoding apparatus and the video decoding apparatus according to the embodiments.

In more detail, a broadcasting station 12890 transmits a video data stream to a communication satellite or a broadcasting satellite 12900 by using radio waves. The broadcasting satellite 12900 transmits a broadcast signal, and the broadcast signal is transmitted to a satellite broadcast receiver via a household antenna 12860. In every house, an encoded video stream may be decoded and reproduced by a TV receiver 12810, a set-top box 12870, or another device.

When the video decoding apparatus according to the embodiment is implemented in a reproducing apparatus 12830, the reproducing apparatus 12830 may parse and decode an encoded video stream recorded on a storage medium 12820, such as a disc or a memory card to reconstruct digital signals. Thus, the reconstructed video signal may be reproduced, for example, on a monitor 12840.

In the set-top box 12870 connected to the antenna 12860 for a satellite/terrestrial broadcast or a cable antenna 12850 for receiving a cable television (TV) broadcast, the video decoding apparatus according to the embodiment may be installed. Data output from the set-top box 12870 may also be reproduced on a TV monitor 12880.

As another example, the video decoding apparatus according to the embodiment may be installed in the TV receiver 12810 instead of the set-top box 12870.

An automobile 12920 that has an appropriate antenna 12910 may receive a signal transmitted from the satellite 12900 or the wireless base station 11700. A decoded video may be reproduced on a display screen of an automobile navigation system 12930 installed in the automobile 12920.

A video signal may be encoded by the video encoding apparatus according to the embodiment and may then be stored in a storage medium. In more detail, an image signal may be stored in a DVD disc 12960 by a DVD recorder or may be stored in a hard disc by a hard disc recorder 12950. As another example, the video signal may be stored in an SD card 12970. If the hard disc recorder 12950 includes the video decoding apparatus according to the embodiment, a video signal recorded on the DVD disc 12960, the SD card 12970, or another storage medium may be reproduced on the TV monitor 12880.

The automobile navigation system 12930 may not include the camera 12530, the camera interface 12630, and the video encoder 12720 of FIG. 26. For example, the computer 12100 and the TV receiver 12810 may not include the camera 12530, the camera interface 12630, and the video encoder 12720 of FIG. 26.

Figure 27:
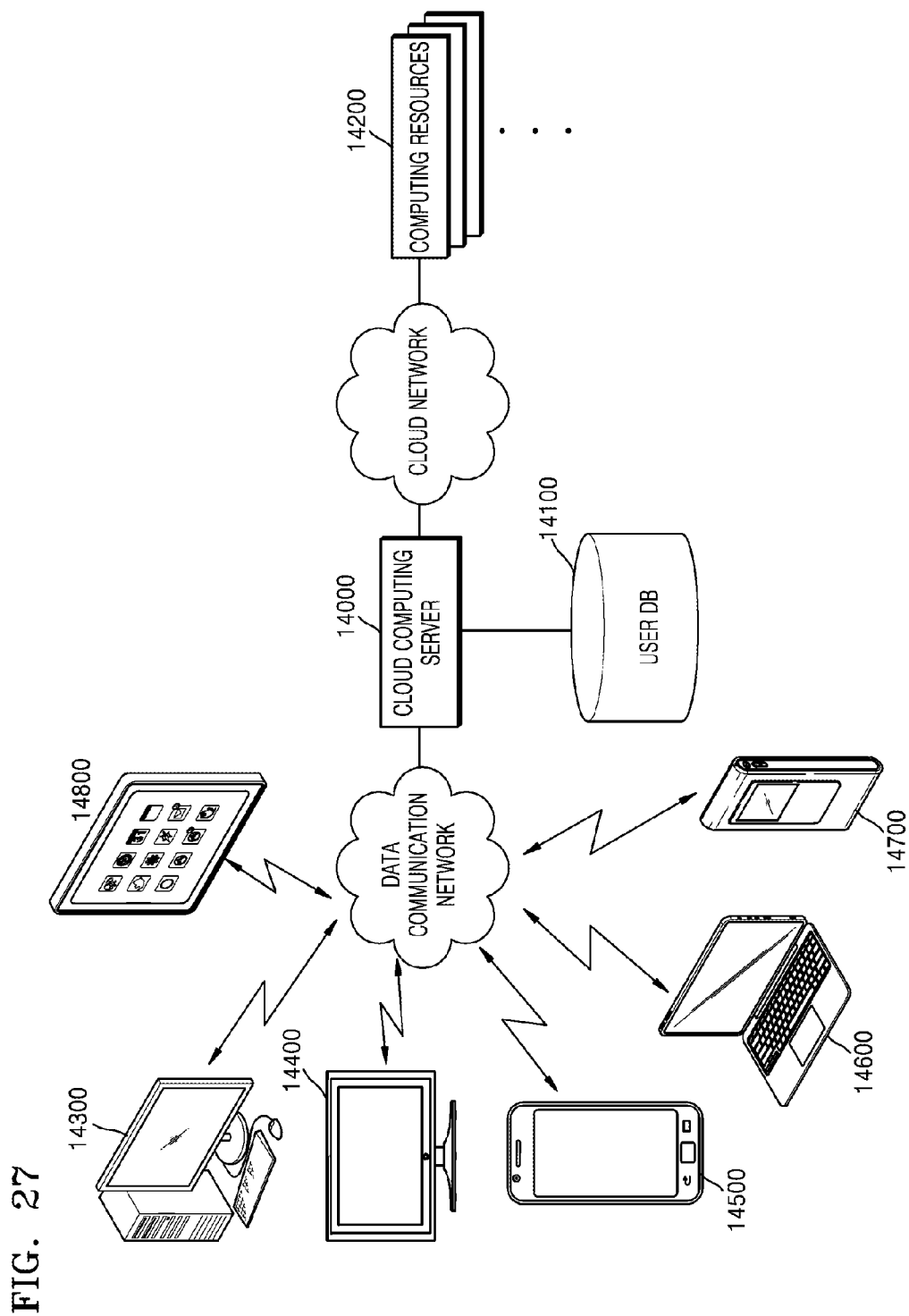
FIG. 27 illustrates a network structure of a cloud computing system using a video encoding apparatus and a video decoding apparatus, according to an embodiment.

FIG. 27 is a diagram illustrating a network structure of a cloud computing system using a video encoding apparatus and a video decoding apparatus, according to an embodiment.

The cloud computing system may include a cloud computing server 14100, a user database (DB) 14100, a plurality of computing resources 14200, and a user terminal.

The cloud computing system provides an on-demand outsourcing service of the plurality of computing resources 14200 via a data communication network, e.g., the Internet, in response to a request from the user terminal. Under a cloud computing environment, a service provider provides users with desired services by combining computing resources at data centers located at physically different locations by using virtualization technology. A service user does not have to install computing resources, e.g., an application, a storage, an operating system (OS), and security software, into his/her own terminal in order to use them, but may select and use desired services from among services in a virtual space generated through the virtualization technology, at a desired point in time.

A user terminal of a specified service user is connected to the cloud computing server 14000 via a data communication network including the Internet and a mobile telecommunication network. User terminals may be provided cloud computing services, and particularly video reproduction services, from the cloud computing server 14000. The user terminals may be various types of electronic devices capable of being connected to the Internet, e.g., a desktop PC 14300, a smart TV 14400, a smart phone 14500, a notebook computer 14600, a portable multimedia player (PMP) 14700, a tablet PC 14800, and the like.

The cloud computing server 14100 may combine the plurality of computing resources 14200 distributed in a cloud network and provide user terminals with a result of combining. The plurality of computing resources 14200 may include various data services, and may include data uploaded from user terminals. As described above, the cloud computing server 14100 may provide user terminals with desired services by combining video database distributed in different regions according to the virtualization technology.

User information about users who have subscribed for a cloud computing service is stored in the user DB 14100. The user information may include logging information, addresses, names, and personal credit information of the users. The user information may further include indexes of videos. Here, the indexes may include a list of videos that have already been reproduced, a list of videos that are being reproduced, a pausing point of a video that was being reproduced, and the like.

Information about a video stored in the user DB 14100 may be shared between user devices. For example, when a video service is provided to the notebook computer 14600 in response to a request from the notebook computer 14600, a reproduction history of the video service is stored in the user DB 14100. When a request to reproduce the video service is received from the smart phone 14500, the cloud computing server 14000 searches for and reproduces the video service, based on the user DB 14100. When the smart phone 14500 receives a video data stream from the cloud computing server 14000, a process of reproducing video by decoding the video data stream is similar to an operation of the mobile phone 12500 described above with reference to FIG. 24.

The cloud computing server 14000 may refer to a reproduction history of a desired video service, stored in the user DB 14100. For example, the cloud computing server 14000 receives a request to reproduce a video stored in the user DB 14100, from a user terminal. If this video was being reproduced, then a method of streaming this video, performed by the cloud computing server 14000, may vary according to the request from the user terminal, i.e., according to whether the video will be reproduced, starting from a start thereof or a pausing point thereof. For example, if the user terminal requests to reproduce the video, starting from the start thereof, the cloud computing server 14000 transmits streaming data of the video starting from a first frame thereof to the user terminal. If the user terminal requests to reproduce the video, starting from the pausing point thereof, the cloud computing server 14000 transmits streaming data of the video starting from a frame corresponding to the pausing point, to the user terminal.

In this case, the user terminal may include the video decoding apparatus as described above with reference to FIGS. 1A through 20. As another example, the user terminal may include the video encoding apparatus as described above with reference to FIGS. 1A through 20. Alternatively, the user terminal may include both the video decoding apparatus and the video encoding apparatus as described above with reference to FIGS. 1A through 20.

Various applications of the video encoding method, the video decoding method, the video encoding apparatus, and the video decoding apparatus according to the embodiments described above with reference to FIGS. 1A through 20 are described above with reference to FIGS. 21 through 27. However, methods of storing the video encoding method and the video decoding method in a storage medium or methods of implementing the video encoding apparatus and the video decoding apparatus in a device described above with reference to FIGS. 1A through 20 are not limited to the embodiments described above with reference to FIGS. 21 through 27.

While this invention has been particularly shown and described with reference to embodiments thereof, it will be understood by those of ordinary skill in the art that various changes in form and details may be made therein without departing from the spirit and scope of the invention as defined by the appended claims. The embodiments should be considered in a descriptive sense only and not for purposes of limitation. Therefore, the scope of the invention is defined not by the detailed description of the invention but by the appended claims, and all differences within the scope will be construed as being included in the present disclosure.

The invention claimed is:

1. A multi-layer video decoding method comprising:
   obtaining, from a bitstream, information indicating a maximum size of a decoded picture buffer (DPB) regarding a layer set comprising a plurality of layers;
   determining a size of the DPB regarding the layer set based on the obtained information indicating the maximum size of the DPB; and
   storing a decoded picture of the layer set in the DPB having the determined size,
   wherein the obtaining of the information indicating the maximum size of the DPB regarding the layer set comprises, when the layer set comprises a plurality of temporal sub-layers, obtaining the information indicating the maximum size of the DPB according to the temporal sub-layers comprised in the layer set,
   wherein the obtaining of the information indicating the maximum size of the DPB according to the temporal sub-layers comprises, when a number of temporal sub-layers comprised in a layer that comprises most temporal sub-layers from among the plurality of layers comprised in the layer set is N and information about N exists in the bitstream, obtaining the information indicating the maximum size of the DPB according to the temporal sub-layers while increasing an index from 0 to N, and when information about N does not exist in the bitstream and a number of temporal sub-layers comprised in a layer that comprises most temporal sub-layers from among one or more layers comprised in the multi-layer is M, obtaining the information indicating the maximum size of the DPB according to the temporal sub-layers while increasing an index from 0 to M.

2. The multi-layer video decoding method of claim 1, wherein information indicating a maximum size of a DPB regarding a temporal sub-layer of a first index from among the plurality of temporal sub-layers comprised in the layer set indicates a maximum size of a DPB, which is equal to or larger than a maximum size of a DPB regarding a temporal sub-layer of a second index that is a lower level than the first index.

3. The multi-layer video decoding method of claim 1, further comprising:
   determining whether information indicating a maximum size of a sub-DPB regarding a layer format group comprised in the layer set is obtainable from the bitstream; and
   obtaining the information indicating the maximum size of the sub-DPB when it is determined that the information indicating the maximum size is obtainable.

4. The multi-layer video decoding method of claim 3, further comprising:
   determining a size of the sub-DPB regarding the layer format group comprised in the layer set; and
   storing a decoded picture of the layer format group in the sub-DPB having the determined size.

5. The multi-layer video decoding method of claim 3, wherein the obtaining of the information indicating the maximum size of the sub-DPB comprises, when the layer set comprises the plurality of temporal sub-layers, obtaining the information indicating the maximum size of the sub-DPB regarding the layer format group according to the temporal sub-layers comprised in the layer set.

6. The multi-layer video decoding method of claim 1, wherein the obtaining of the information indicating the maximum size of the DPB comprises obtaining the information indicating the maximum size of the DPB from a video parameter set (VPS) extension region of a raw bytes sequence payload (RBSP) of each network abstraction layer (NAL) from the bitstream comprising high efficiency video coding (HEVC) NAL units.

7. A multi-layer video decoding apparatus comprising:
   an obtainer configured to obtain, from a bitstream, information indicating a maximum size of a decoded picture buffer (DPB) regarding a layer set comprising a plurality of layers;
   a DPB having a size regarding the layer set, which is determined based on the obtained information indicating the maximum size of the DPB; and a decoder configured to store a decoded picture of the layer set in the DPB having the determined size, wherein the obtainer obtains, when the layer set comprises a plurality of temporal sub-layers, information indicating a maximum size of a sub-DPB according to the temporal sub-layers comprised in the layer set, and when the information indicating the maximum size of the sub-DPB is obtained according to the temporal sub-layers, when a number of temporal sub-layers comprised in a layer that comprises most temporal sub-layers from among the plurality of layers comprised in the layer set is N and information about N exists in the bitstream, the information indicating the maximum size of the DPB according to the temporal sub-layers is obtained while increasing an index from 0 to N, and when information about N does not exist in the bitstream and a number of temporal sub-layers comprised in a layer that comprises most temporal sub-layers from among one or more layers comprised in the multi-layer is M, the information indicating the maximum size of the DPB according to the temporal sub-layers is obtained while increasing an index from 0 to M.

8. The multi-layer video decoding apparatus of claim 7, wherein information indicating a maximum size of a DPB regarding a temporal sub-layer of a first index from among the plurality of temporal sub-layers comprised in the layer set indicates a maximum size of a DPB, which is equal to or larger than a maximum size of a DPB regarding a temporal sub-layer of a second index that is a lower level than the first index.

9. The multi-layer video decoding apparatus of claim 7, wherein the obtainer determines whether information indicating a maximum size of a sub-DPB regarding a layer format group comprised in the layer set is obtainable from the bitstream, and further obtains the information indicating the maximum size of the sub-DPB regarding the layer format group when it is determined that the information indicating the maximum size is obtainable.

10. The multi-layer video decoding apparatus of claim 9, wherein the DPB comprises at least one sub-DPB determined based on the information indicating the maximum size of the sub-DPB, and a decoded picture of the layer format group is stored in the determined at least one sub-DPB.

11. The multi-layer video decoding apparatus of claim 7, wherein the obtainer obtaining obtains the information indicating the maximum size of the DPB from a video parameter set (VPS) extension region of a raw bytes sequence payload (RBSP) of each network abstraction layer (NAL) from the bitstream comprising high efficiency video coding (HEVC) NAL units.

12. A multi-layer video encoding method comprising:
determining a plurality of layer sets each comprising at least one layer from among a plurality of encoded layers;
determining a maximum size of a decoded picture buffer (DPB) regarding each of the determined plurality of layer sets; and
generating information indicating the maximum size of the DPB regarding each of the determined plurality of layer sets, wherein the generating of the information indicating the maximum size of the DPB regarding each of the determined plurality of layer sets comprises, when the plurality of layer sets each comprises a plurality of temporal sub-layers, generating the information indicating the maximum size of the DPB according to the temporal sub-layers comprised in the each of the plurality of layer sets, wherein the generating of the information indicating the maximum size of the DPB according to the temporal sub-layers comprises, when a number of temporal sub-layers comprised in a layer that comprises most temporal sub-layers from among the at least one layer comprised in each of the layer sets is N and information about N exists in the bitstream, generating the information indicating the maximum size of the DPB according to the temporal sub-layers while increasing an index from 0 to N, and when the information about N does not exist in the bitstream and a number of temporal sub-layers comprised in a layer that comprises most temporal sub-layers from among one or more layers comprised in the multi-layer is M, generating the information indicating the maximum size of the DPB according to the temporal sub-layers while increasing an index from 0 to M.

13. A multi-layer video encoding apparatus comprising:
a decoder configured to generate a plurality of encoded layers by encoding a multi-layer video; and
a bitstream generator configured to determine a plurality of layer sets each comprising at least one layer from among the plurality of encoded layers, determine a maximum size of a decoded picture buffer (DPB) regarding each of the determined plurality of layer sets, and generate information indicating the maximum size of the DPB regarding each of the determined plurality of layer sets, wherein the bitstream generator generates, when the plurality of layer sets each comprises a plurality of temporal sub-layers, the information indicating the maximum size of the DPB according to the temporal sub-layers comprised in the each of the plurality of layer sets, and when a number of temporal sub-layers comprised in a layer that comprises most temporal sub-layers from among the at least one layer comprised in each of the layer sets is N and information about N exists in the bitstream, the information indicating the maximum size of the DPB according to the temporal sub-layers while increasing an index from 0 to N, and when the information about N does not exist in the bitstream and a number of temporal sub-layers comprised in a layer that comprises most temporal sub-layers from among one or more layers comprised in the multi-layer is M, the information indicating the maximum size of the DPB according to the temporal sub-layers while increasing an index from 0 to M.

14. A non-transitory computer-readable recording medium having recorded thereon a program, which when executed by a computer, performs the multi-layer video encoding method of claim 1.

* * * * *